(12) United States Patent
Yoshioka et al.

(10) Patent No.: US 10,626,552 B2
(45) Date of Patent: Apr. 21, 2020

(54) PROCESSING DEVICE, SHEET MANUFACTURING APPARATUS, PROCESSING METHOD, AND MANUFACTURING METHOD OF SHEET

(71) Applicant: SEIKO EPSON CORPORATION, Tokyo (JP)

(72) Inventors: Satomi Yoshioka, Nagano (JP); Masanao Kunugi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 15/959,417

(22) Filed: Apr. 23, 2018

(65) Prior Publication Data

US 2018/0305867 A1 Oct. 25, 2018

(30) Foreign Application Priority Data

Apr. 24, 2017 (JP) ................. 2017-085115
Apr. 24, 2017 (JP) ................. 2017-085116
Apr. 24, 2017 (JP) ................. 2017-085117
Apr. 24, 2017 (JP) ................. 2017-085120

(51) Int. Cl.

| D21B 1/02 | (2006.01) |
| D21B 1/08 | (2006.01) |
| D21D 5/00 | (2006.01) |
| D21F 9/00 | (2006.01) |
| D21B 1/32 | (2006.01) |
| D21C 1/00 | (2006.01) |
| D04H 1/00 | (2006.01) |

(Continued)

(52) U.S. Cl.
CPC ........... *D21B 1/028* (2013.01); *D04H 1/00* (2013.01); *D04H 1/413* (2013.01); *D04H 11/08* (2013.01); *D21B 1/08* (2013.01); *D21B 1/325* (2013.01); *D21C 1/00* (2013.01); *D21C 9/007* (2013.01); *D21D 5/005* (2013.01); *D21F 9/00* (2013.01); *D21H 15/04* (2013.01); *Y02W 30/646* (2015.05)

(58) Field of Classification Search
None
See application file for complete search history.

(56) References Cited

U.S. PATENT DOCUMENTS

| 6,162,113 A * | 12/2000 | Armstrong ............ B24B 53/10 451/39 |
| 2005/0132913 A1* | 6/2005 | Gottling ................ B24C 1/003 101/425 |
| 2016/0068681 A1* | 3/2016 | Ueno .................... D04H 1/587 428/36.4 |

FOREIGN PATENT DOCUMENTS

| EP | 2995708 A1 | 3/2016 |
| JP | 09-138520 A | 5/1997 |
| JP | 2016-124103 A | 7/2016 |

OTHER PUBLICATIONS

The Partial European Search Report for the corresponding European Patent Application No. 18168850.8 dated Jul. 6, 2018.

(Continued)

*Primary Examiner* — Dennis R Cordray
(74) *Attorney, Agent, or Firm* — Global IP Counselors, LLP

(57) ABSTRACT

Provided is a processing device which includes a fluffing section for fluffing fibers contained in a sheet-like material, the fibers being at least near a surface of the sheet-like material, and a particle supplying section for supplying particles having Mohs hardness of 2 to 5 to the fluffed fibers. In addition, in such processing device, the particle supplying section preferably has an ejecting portion for ejecting the particles.

16 Claims, 38 Drawing Sheets

(51) Int. Cl.
*D04H 11/08* (2006.01)
*D04H 1/413* (2012.01)
*D21H 15/04* (2006.01)
*D21C 9/00* (2006.01)

(56) References Cited

OTHER PUBLICATIONS

The Extended European Search Report for the corresponding European Patent Application No. 18168850.8 dated Nov. 30, 2018.

* cited by examiner

PROCESSING DEVICE, SHEET MANUFACTURING APPARATUS, PROCESSING METHOD, AND MANUFACTURING METHOD OF SHEET

BACKGROUND

1. Technical Field

The present invention relates to a processing device, a sheet manufacturing apparatus, a processing method, and a manufacturing method of a sheet.

2. Related Art

In recent years, as environmental awareness has increased, not only reduction in the amount used of paper (recording medium) in the workplace but also reuse of paper in the workplace are required.

As a method of regenerating the recording medium, for example, with respect to a paper on which a curved line has been drawn with a writing tool having a core of graphite such as a pencil or a mechanical pencil, a method of erasing the curved line with an eraser is known (see, for example, JP-A-2016-124103). Then, the paper from which the curved line has been removed can be used again.

However, in the regenerating method described in JP-A-2016-124103, there is a problem that although graphite present on the surface of paper can be erased with an eraser, for example, graphite that has entered deep into the paper in a thickness direction, cannot be sufficiently erased with the eraser.

SUMMARY

An advantage of some aspects of the invention is to provide a processing device, a sheet manufacturing apparatus, a processing method, and a manufacturing method of a sheet, each capable of sufficiently removing alien substances contained in a sheet-like material.

The invention can be realized in the following aspects.

According to an aspect of the invention, there is provided a processing device including: a fluffing section that fluffs fibers contained in a sheet-like material, the fibers being at least near a surface of the sheet-like material; and a particle supplying section that supplies particles having Mohs hardness of 2 to 5 to the fluffed fibers.

In a case where alien substances are contained in the sheet-like material, it is preferable that the alien substances be removed. Therefore, in this configuration, firstly, prior to removing the alien substances, it is possible to fluff the fibers that are at least near a surface of the sheet-like material. Thus, the alien substances existing between the fibers are lifted up, and subsequent removal of the alien substances becomes easy. By removing the alien substances in a state where the fibers are fluffed, the alien substances are sufficiently removed from the sheet-like material.

In the processing device, it is preferable that the particle supplying section have an ejecting portion that ejects the particles.

In this configuration, some of the ejected particles come into contact with the alien substances that are adhered to a defibrated material. Such particles, for example, can adsorb the alien substances so that the alien substances migrate from the fibers, or can collide with the alien substances to peel the alien substances off from the fibers. As a result, it is possible to reliably remove the alien substances from the fibers.

In the processing device, it is preferable that the particles have a function of adsorbing the alien substances contained in the sheet-like material.

In this configuration, the alien substances migrate to the particles by adsorption and are removed from the fibers.

In the processing device, it is preferable that the particles have a function of colliding with the alien substances contained in the sheet-like material to peel the alien substances off from the fibers.

In this configuration, the alien substances are peeled off by collision with the particles and are removed from the fibers.

In the processing device, it is preferable to further include an alien substance-removing section that removes the alien substances together with the particles from the sheet-like material.

In this configuration, for example, the sheet-like material can be reused and regenerated (manufactured) into a sheet as a recording medium.

In the processing device, it is preferable to further include a defibrating section that defibrates the sheet-like material in an aerial manner after the particles are supplied, in which the alien substance-removing section removes the alien substances and the particles before the defibration.

In this configuration, for example, it is possible to visually check whether or not the sheet-like material has been subjected to removal of the alien substances. In a case where the alien substances are insufficiently removed or are not removed, the sheet-like material can be returned to the processing device.

In the processing device, it is preferable to further include a defibrating section that defibrates the sheet-like material in an aerial manner after the particles are supplied, in which the alien substance-removing section removes the alien substances and the particles after the defibration.

In this configuration, even after the defibration, the particles can come into contact with the alien substances, and therefore it is possible to further sufficiently remove the alien substances from the fibers.

In the processing device, it is preferable to further include an alien substance-aggregating section that is disposed between the particle supplying section and the alien substance-removing section and aggregates the alien substances.

In this configuration, it is possible to aggregate the alien substances on the sheet-like material. The aggregated alien substances are easily removed from the sheet-like material by removal of the alien substances.

In the processing device, it is preferable that the particles be formed of a resin-based material.

In this configuration, the particles can sufficiently exert a function as removal particles for removing the alien substances from the fibers. In addition, even in a case where the particles collide with the fibers, it is possible to prevent damages due to such collision from being given to the fibers.

In the processing device, it is preferable that the particles be formed of a plant-based material.

In this configuration, the particles can sufficiently exert a function as removal particles for removing the alien substances from the fibers. In addition, even in a case where the particles collide with the fibers, it is possible to prevent damages due to such collision from being given to the fibers.

According to another aspect of the invention, there is provided a processing device including: a fluffing section that fluffs fibers contained in a sheet-like material, the fibers being at least near a surface of the sheet-like material; and an alien substance-removing section that removes alien substances contained in the sheet-like material by bringing the fluffed fibers into contact with a fabric material formed of a nonwoven fabric or a woven fabric so that the alien substances migrate to the fabric material.

In this configuration, prior to removing the alien substances contained in the sheet-like material, the fibers, that are at least near the surface of the sheet-like material, are fluffed. Thus, the alien substances existing between the fibers are lifted up, and subsequent removal of the alien substances becomes easy. By removing the alien substances in a state where the fibers are fluffed, the alien substances are sufficiently removed from the sheet-like material.

In the processing device, it is preferable that the fluffing section have a brush.

By moving such brush relative to the sheet-like material, it is possible to forcibly raise the lying-down fibers. In this configuration, in the sheet-like material, the fibers become a fluffed state.

In the processing device, it is preferable that the brush have a rotatably-supported cylindrical or columnar core portion, and brush bristles provided on an outer periphery of the core portion.

In this configuration, as the brush rotates, the fibers come into contact with the brush bristles of the brush and are forcibly raised in the sheet-like material. As a result, in the sheet-like material, the fibers become a fluffed state.

In the processing device, it is preferable that the fluffing section have a plurality of claw portions.

In this configuration, the sheet-like material can be scratched, and therefore the fibers are forcibly raised so that, in the sheet-like material, the fibers become a fluffed state.

In the processing device, it is preferable that in the alien substance-removing section, the fabric material be an endless belt.

In this configuration, for example, in a case where the fabric material is cleaned, the fabric material can be continuously used as it is to remove the alien substances.

In the processing device, it is preferable that the alien substance-removing section have a cleaning portion for cleaning the fabric material to which the alien substances have migrated.

In this configuration, the alien substances are removed from the fabric material, and therefore the fabric material is cleaned. The cleaned fabric material can be used again to remove alien substances.

In the processing device, it is preferable to further include an alien substance-aggregating section that is disposed between the fluffing section and the alien substance-removing section and aggregates the alien substances.

In this configuration, it is possible to aggregate the alien substances on the sheet-like material. The aggregated alien substances are easily removed from the sheet-like material by removal of the alien substances.

According to still another aspect of the invention, there is provided a sheet manufacturing apparatus including the processing device.

In this configuration, prior to removing the alien substances contained in the sheet-like material, the fibers, that are at least near the surface of the sheet-like material, are fluffed. Thus, the alien substances existing between the fibers are lifted up, and subsequent removal of the alien substances becomes easy. By removing the alien substances in a state where the fibers are fluffed, the alien substances are sufficiently removed from the sheet-like material. A sheet can be further manufactured from the sheet-like material from which the alien substances have been removed.

According to still another aspect of the invention, there is provided a processing method including: fluffing fibers contained in a sheet-like material, the fibers being at least near the surface of the sheet-like material; and supplying particles having Mohs hardness of 2 to 5 to the fluffed fibers.

In a case where alien substances are contained in the sheet-like material, it is preferable to remove the alien substances. Therefore, in this configuration, firstly, prior to removing the alien substances, it is possible to fluff the fibers that are at least near the surface of the sheet-like material. Thus, the alien substances existing between the fibers are lifted up, and subsequent removal of the alien substances becomes easy. By removing the alien substances in a state where the fibers are fluffed, the alien substances are sufficiently removed from the sheet-like material.

According to still another aspect of the invention, there is provided a manufacturing method of a sheet, including: fluffing fibers contained in a sheet-like material, the fibers being at least near a surface of the sheet-like material; and supplying particles having Mohs hardness of 2 to 5 to the fluffed fibers, in which the sheet is manufactured from the sheet-like material after the particles are supplied.

In a case where alien substances are contained in the sheet-like material, it is preferable to remove the alien substances. Therefore, in this configuration, firstly, prior to removing the alien substances, it is possible to fluff the fibers that are at least near the surface of the sheet-like material. Thus, the alien substances existing between the fibers are lifted up, and subsequent removal of the alien substances becomes easy. By removing the alien substances in a state where the fibers are fluffed, the alien substances are sufficiently removed from the sheet-like material. A sheet can be further manufactured from the sheet-like material from which the alien substances have been removed.

According to still another aspect of the invention, there is provided a processing method including: fluffing fibers contained in a sheet-like material, the fibers being at least near a surface of the sheet-like material; and removing alien substances contained in the sheet-like material by bringing the fluffed fibers into contact with a fabric material formed of a nonwoven fabric or a woven fabric so that the alien substances migrate to the fabric material.

In this configuration, prior to removing the alien substances contained in the sheet-like material, the fibers, that are at least near the surface of the sheet-like material, are fluffed. Thus, the alien substances existing between the fibers are lifted up, and subsequent removal of the alien substances becomes easy. By removing the alien substances in a state where the fibers are fluffed, the alien substances are sufficiently removed from the sheet-like material.

According to still another aspect of the invention, there is provided a manufacturing method of a sheet, including: fluffing fibers contained in a sheet-like material, the fibers being at least near a surface of the sheet-like material; and removing alien substances contained in the sheet-like material by bringing the fluffed fibers into contact with a fabric material formed of a nonwoven fabric or a woven fabric so that the alien substances migrate to the fabric material, in which the sheet is manufactured from the sheet-like material from which the alien substances have been removed.

In this configuration, prior to removing the alien substances contained in the sheet-like material, the fibers, that are at least near the surface of the sheet-like material, are fluffed. Thus, the alien substances existing between the fibers are lifted up, and subsequent removal of the alien substances becomes easy. By removing the alien substances in a state where the fibers are fluffed, the alien substances are sufficiently removed from the sheet-like material. A sheet can be further manufactured from the sheet-like material from which the alien substances have been removed.

According to still another aspect of the invention, there is provided a processing device including: an aggregating section that applies a liquid containing a cationic polymer to a sheet-like material containing fibers so that alien substances contained in the sheet-like material are aggregated; and a removing section that removes aggregates generated by the aggregating section from the sheet-like material.

In this configuration, it is possible to provide the processing device capable of sufficiently removing alien substances contained in the sheet-like material.

In the processing device, it is preferable that the liquid be a solution of the cationic polymer.

In this configuration, it is possible to effectively suppress inadvertent compositional variations in the liquid, and to more precisely control the amount applied of the cationic polymer. In addition, formation of aggregates upon contact with the alien substances is promoted. Further, the cationic polymer can also penetrate more suitably into narrow interstices between the fibers and into interiors of the fibers, and the alien substances existing at these sites can be removed more efficiently.

In the processing device, it is preferable that the cationic polymer contain an amine in a repeating structure thereof.

In this configuration, it is possible to more efficiently remove the alien substances contained in the sheet-like material.

In the processing device, it is preferable that the cationic polymer be represented by Formula (1).

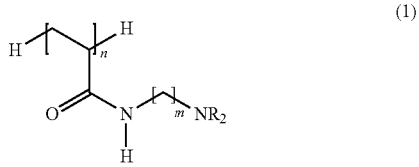

(in Formula (1), n is an integer of 2 or more, m is an integer of 1 to 5, and R is a hydrogen atom or an alkyl group having 1 to 4 carbon atoms)

In this configuration, it is possible to more efficiently remove the alien substances contained in the sheet-like material. In addition, such cationic polymer can be relatively easily synthesized and can be produced at relatively low cost.

In the processing device, it is preferable that a content of the cationic polymer in the liquid be 0.0001% by mass to 50% by mass.

In this configuration, it is possible to more effectively remove the alien substances while suppressing the amount used of the cationic polymer.

In the processing device, it is preferable that the liquid be applied to the sheet-like material by using at least one of a spraying method and a coating method.

In this configuration, it is possible to more effectively remove the alien substances while suppressing the amount used of the cationic polymer (the liquid).

In the processing device, it is preferable that the alien substances be anionic substances.

In this configuration, it is possible to more suitably form aggregates by interaction with the cationic polymer, and it is possible to more suitably perform removal in the removing section.

In the processing device, it is preferable to further include a surface area-increasing processing section that performs a preprocessing for increasing a surface area of the sheet-like material which is before the liquid is applied in the aggregating section.

In this configuration, it is possible to more efficiently remove the alien substances of the sheet-like material.

In the processing device, it is preferable to further include a preliminarily-applying section that preliminarily applies the liquid containing a cationic polymer to the sheet-like material on an upstream side of the surface area-increasing processing section.

In this configuration, it is possible to more efficiently form aggregates. In addition, even in a case where the amount used of the cationic polymer (the liquid), as a whole, is suppressed, it is possible to sufficiently remove the alien substances.

According to still another aspect of the invention, there is provided a processing device including: an aggregating section that applies an ionic substance of a polyvalent metal ion to a sheet-like material containing fibers so that alien substances contained in the sheet-like material are aggregated; and a removing section that removes aggregates generated by the aggregating section from the sheet-like material.

In this configuration, it is possible to provide the processing device capable of sufficiently removing the alien substances contained in the sheet-like material.

In the processing device, it is preferable that the ionic substance have a deliquescence property.

In this configuration, for example, even in a case where the ionic substance is applied to the sheet-like material in a state where it is not mixed with other liquid components, due to moisture contained in the atmosphere, the ionic substance is capable of spontaneously becoming an aqueous solution state, and thus the ionic substance is capable of more efficiently coming into contact with the alien substances and capable of more efficiently weakening binding forces between the fibers and the alien substances, thereby improving an efficiency of forming aggregates.

In the processing device, it is preferable that the ionic substance include at least one of calcium chloride and magnesium chloride.

In this configuration, it is possible to more efficiently remove the alien substances contained in the sheet-like material. In addition, these ionic substances are relatively inexpensive and advantageous in terms of cost.

In the processing device, it is preferable that the ionic substance be applied in a powder state to the sheet-like material.

In this configuration, it is easy to remove aggregates and an excess of the ionic substance after applying the ionic substance to the sheet-like material. In addition, it is possible to omit or simplify a postprocessing (for example, drying process) after applying the ionic substance, and it is possible to further improve a processing rate of the sheet-like material.

In the processing device, it is preferable that the ionic substance be applied to the sheet-like material by using at least one of a spraying method and a coating method.

In this configuration, it is possible to more efficiently remove the alien substances while suppressing the amount used of the ionic substance.

In the processing device, it is preferable that a weight per unit area of the ionic substance to be applied to the sheet-like material be 1 µg/m² to 50 g/m².

In this configuration, it is possible to more efficiently remove the alien substances while suppressing the amount used of the ionic substance.

In the processing device, it is preferable that the alien substances be anionic substances.

In this configuration, it is possible to more suitably form aggregates by interaction with the ionic substance, and it is possible to more suitably perform removal in the removing section.

In the processing device, it is preferable that the alien substances be components of an ink jet ink.

In general, the components of an ink jet ink easily penetrate not only into interstices between the fibers but also into interiors of the fibers, and, in general, it is not easy to remove the component after being applied to a recording medium containing fibers. In this connection, in the invention, by using the liquid containing a cationic polymer or the ionic substance of a polyvalent metal ion, even components of an ink jet ink can be suitably removed from a material containing fibers (recording medium). Therefore, in a case where the alien substances are components of an ink jet ink, effects according to the invention are more remarkably exerted.

In the processing device, it is preferable to further include a surface area-increasing processing section that performs a preprocessing for increasing a surface area of the sheet-like material which is before the ionic substance is applied in the aggregating section.

In this configuration, it is possible to more efficiently remove the alien substances of the sheet-like material.

In the processing device, it is preferable that the surface area-increasing processing section be the fluffing section that fluffs the sheet-like material.

In this configuration, it is possible to efficiently perform a process for increasing a surface area of the sheet-like material in a short time. In addition, by fluffing the sheet-like material, an efficiency of a defibration step performed on a downstream side is improved. In view of this, it is possible to improve a processing rate of the sheet-like material.

In the processing device, it is preferable to further include a preliminarily-applying section that preliminarily applies the ionic substance of a polyvalent metal ion to the sheet-like material on an upstream side of the surface area-increasing processing section.

In this configuration, it is possible to more efficiently form aggregates. In addition, even in a case where the amount used of the ionic substance, as a whole, is suppressed, it is possible to sufficiently remove the alien substances.

In the processing device, it is preferable that the removing section remove the aggregates by bringing the sheet-like material containing the aggregates into contact with a fabric material formed of a nonwoven fabric or a woven fabric, so that the aggregates migrate to the fabric material.

In this configuration, the aggregates can be removed more efficiently. In addition, in a case where an excess of the cationic polymer or an excess of the ionic substance remains, the excess of the cationic polymer or the excess of the ionic substance can be efficiently removed together with the aggregates in the removing section.

According to still another aspect of the invention, there is provided a sheet manufacturing apparatus including the processing device.

In this configuration, it is possible to provide the sheet manufacturing apparatus capable of sufficiently removing the alien substances contained in the sheet-like material.

According to still another aspect of the invention, there is provided a processing method including: aggregating alien substances contained in a sheet-like material containing fibers by applying a liquid containing a cationic polymer to the sheet-like material; and removing aggregates generated by the aggregating from the sheet-like material.

In this configuration, it is possible to provide the processing method capable of sufficiently removing alien substances contained in the sheet-like material.

According to still another aspect of the invention, there is provided a manufacturing method of a sheet, including: aggregating alien substances contained in a sheet-like material containing fibers by applying a liquid containing a cationic polymer to the sheet-like material; and removing aggregates generated by the aggregating from the sheet-like material, in which the sheet is manufactured from the sheet-like material from which the alien substances have been removed.

In this configuration, it is possible to provide the manufacturing method of a sheet capable of sufficiently removing the alien substances contained in the sheet-like material.

According to still another aspect of the invention, there is provided a processing method including: aggregating alien substances contained in a sheet-like material containing fibers by applying an ionic substance of a polyvalent metal ion to the sheet-like material; and removing aggregates generated by the aggregating from the sheet-like material.

In this configuration, it is possible to provide the processing method capable of sufficiently removing alien substances contained in the sheet-like material.

According to still another aspect of the invention, there is provided a manufacturing method of a sheet, including: aggregating alien substances contained in a sheet-like material containing fibers by applying an ionic substance of a polyvalent metal ion to the sheet-like material; and removing aggregates generated by the aggregating from the sheet-like material, in which the sheet is manufactured from the sheet-like material from which the alien substances have been removed.

In this configuration, it is possible to provide the manufacturing method of a sheet capable of sufficiently removing the alien substances contained in the sheet-like material.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
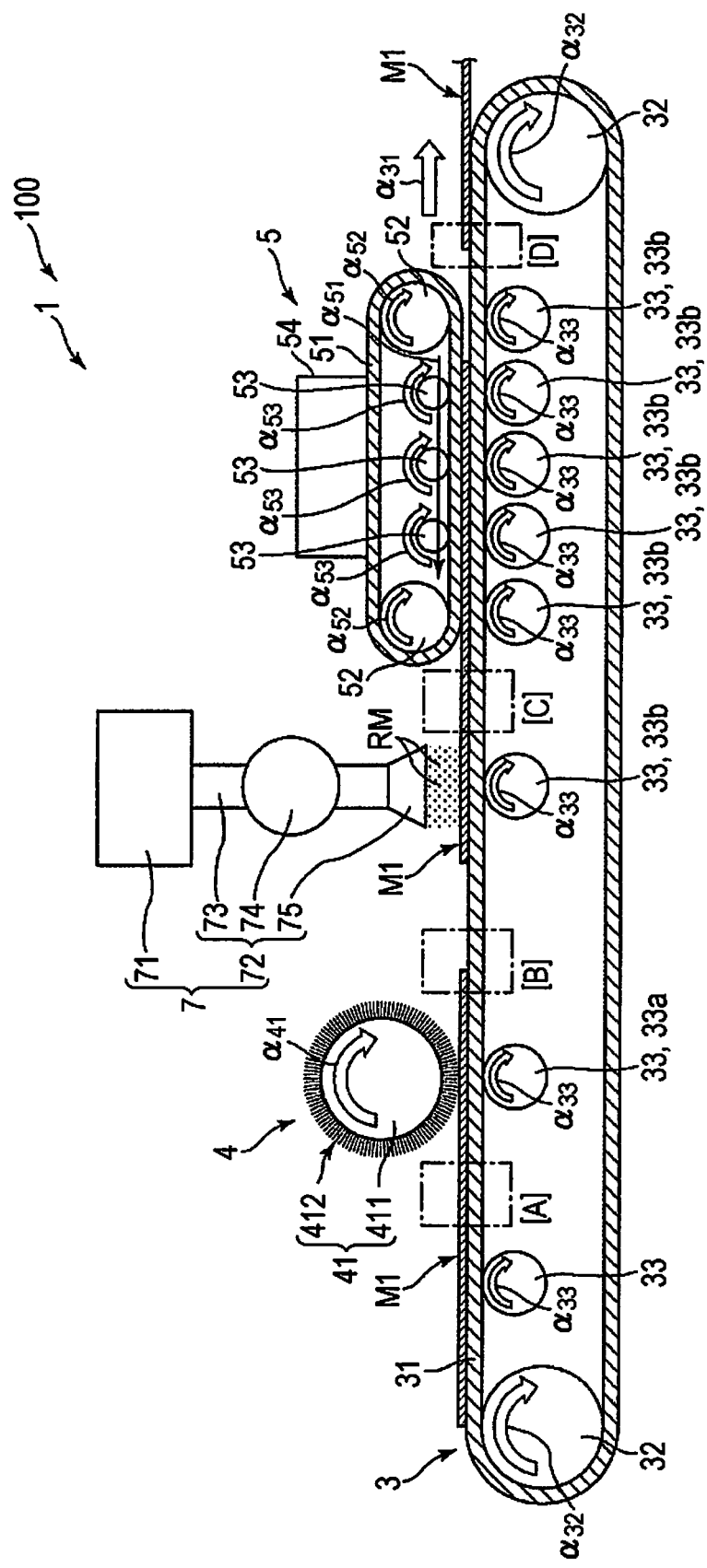
FIG. 1 is a schematic side view showing a configuration of an upstream side (processing device of the invention) of the sheet manufacturing apparatus (first embodiment) of the invention.

Hereinafter, a processing device, a sheet manufacturing apparatus, a processing method, and a manufacturing method of a sheet of the invention will be described in detail based on preferred embodiments shown in the accompanying drawings.

First Embodiment

The processing device 1 of the invention includes a fluffing section 4 that fluffs fibers FB contained in a raw material M1 (sheet-like material), the fibers FB being at least near the surface of the raw material M1, and a particle supplying section 7 that supplies particles RM having Mohs hardness of 2 to 5 to the fluffed fibers FB (in particular, ejects the particles RM and cause them to collide therewith).

Further, the processing method of the invention includes a fluffing step of fluffing the fibers FB contained in the raw material M1 (sheet-like material), the fibers FB being at least near the surface of the raw material M1, and a particle supplying step of supplying particles RM having Mohs hardness of 2 to 5 to the fluffed fibers FB. Such method is executed by the processing device 1.

As described later, in a case where alien substances AS are contained in the raw material M1, it is preferable to remove the alien substances AS. Therefore, according to the invention as described above, firstly, prior to removing the alien substances AS, it is possible to fluff the fibers FB which are at least near the surface of the raw material M1. Thus, the alien substances AS existing between the fibers FB are lifted up, and subsequent removal of the alien substances AS becomes easy. Then, by removing the alien substances AS in a state where the fibers FB are fluffed, the alien substances AS are sufficiently removed from the raw material M1.

That is, the process of the invention is said to be a de-inking process of a waste paper. A de-inking process in the related art is, in general, a process which includes dispersing a waste paper in water, releasing a coloring agent in a mechanical and chemical manner (with surfactants, alkaline chemicals, and the like), and removing a coloring material by a floating method, a screen washing method, or the like. However, in the invention, it is possible to perform de-inking without having to soak a waste paper in water. This is said to be a dry de-inking technique.

The sheet manufacturing apparatus 100 of the invention includes the processing device 1.

Further, the manufacturing method of a sheet of the invention includes a fluffing step of fluffing the fibers FB contained in the raw material M1 (sheet-like material), the fibers FB being at least near the surface of the raw material M1, and a particle supplying step of supplying particles RM having Mohs hardness of 2 to 5 to the fluffed fibers FB, in which a sheet S is manufactured from the raw material M1 (sheet-like material) after the particles RM are supplied. Such method is executed by the sheet manufacturing apparatus 100.

According to the invention as described above, it is possible to further manufacture (regenerate) the sheet S from the raw material M1 from which the alien substances AS have been removed, while enjoying advantages of the above-described processing device 1 (processing method).

Figure 2:
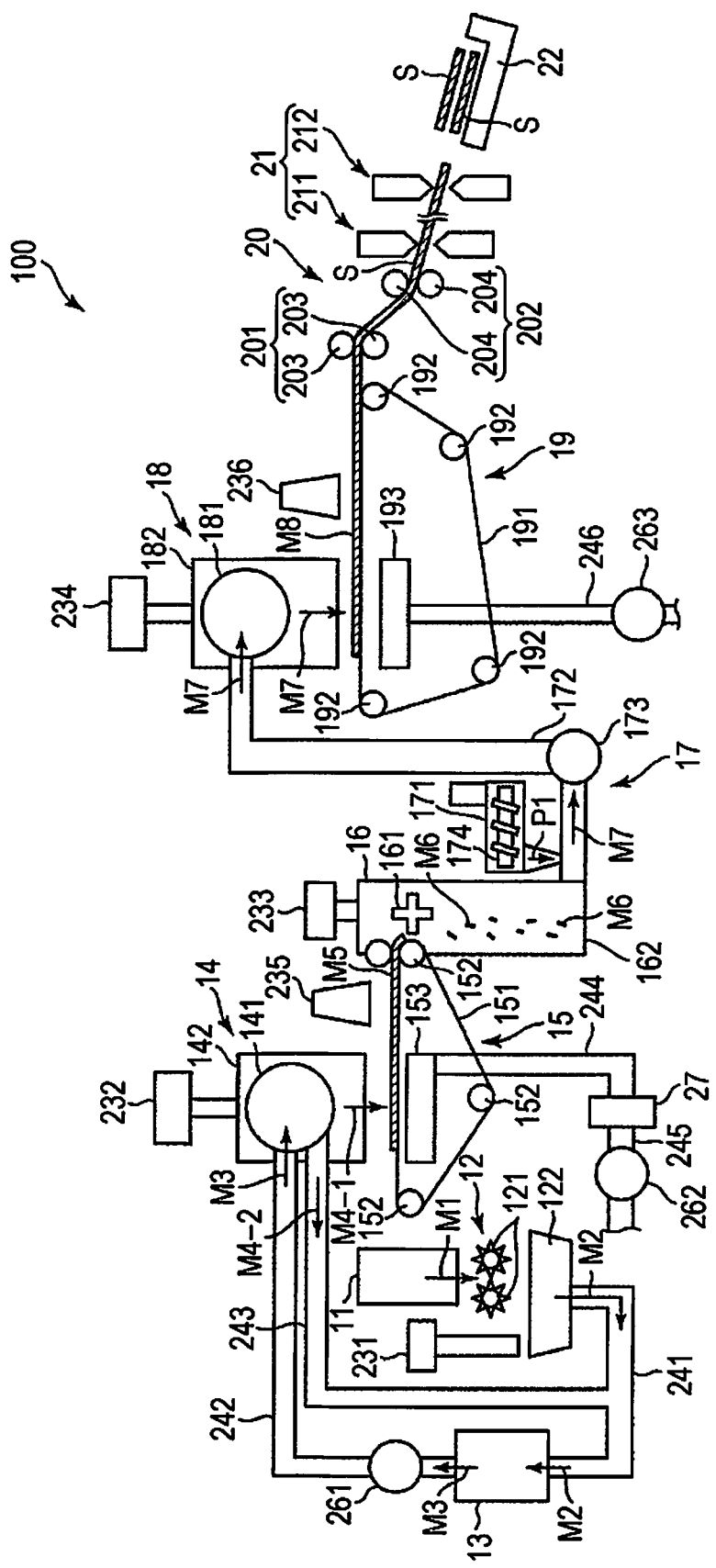
FIG. 2 is a schematic side view showing a configuration on a downstream side of the sheet manufacturing apparatus (first embodiment) of the invention.
Figure 3:
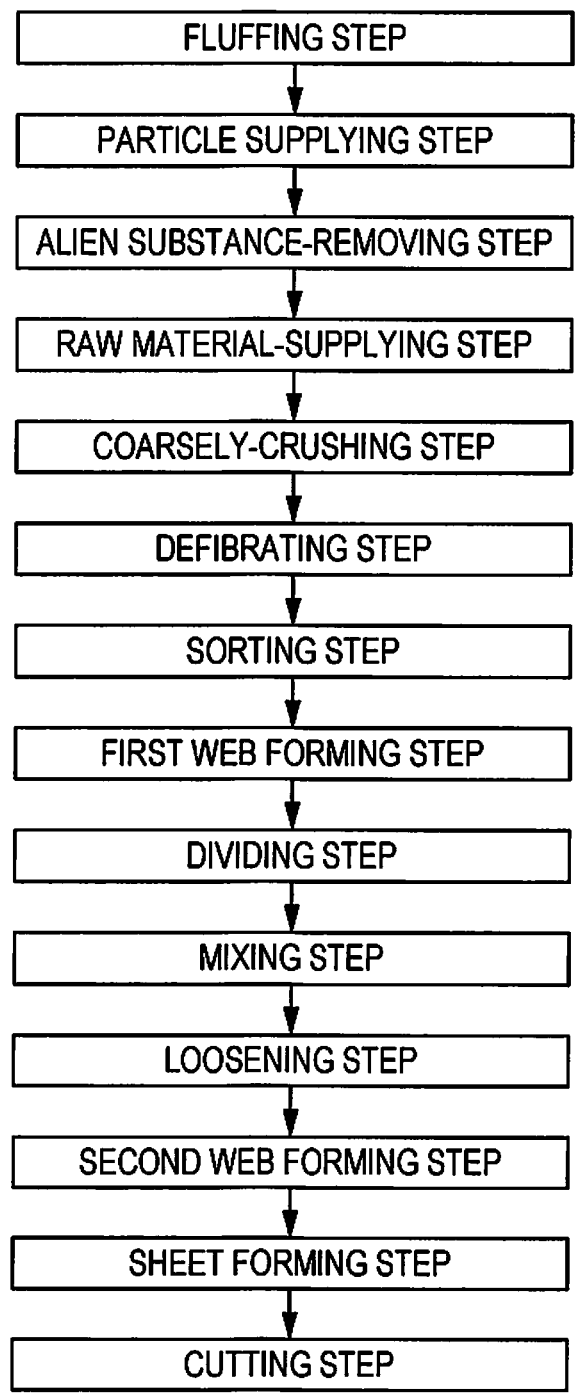
FIG. 3 is a diagram sequentially illustrating steps performed by the sheet manufacturing apparatus (first embodiment) of the invention.
Figure 4:
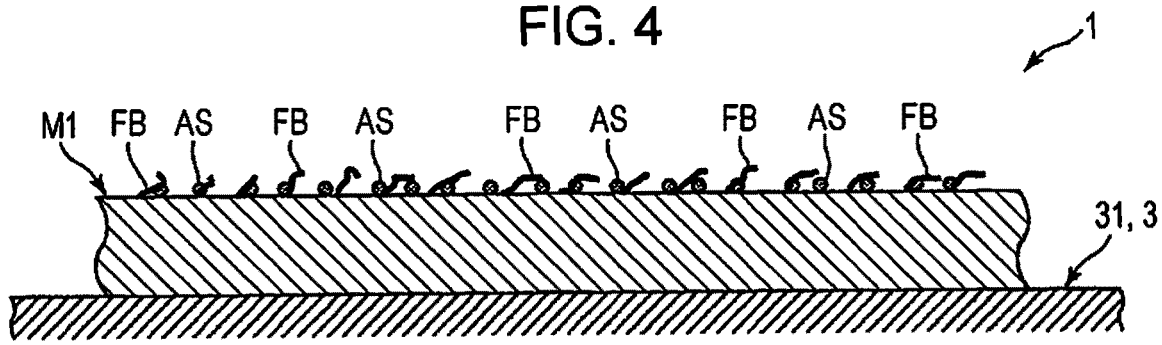
FIG. 4 is an image diagram sequentially showing a state of the sheet-like material processed by the processing device shown in FIG. 1 (enlarged view of a region [A] surrounded by a dot-and-dash line in FIG. 1).
Figure 5:
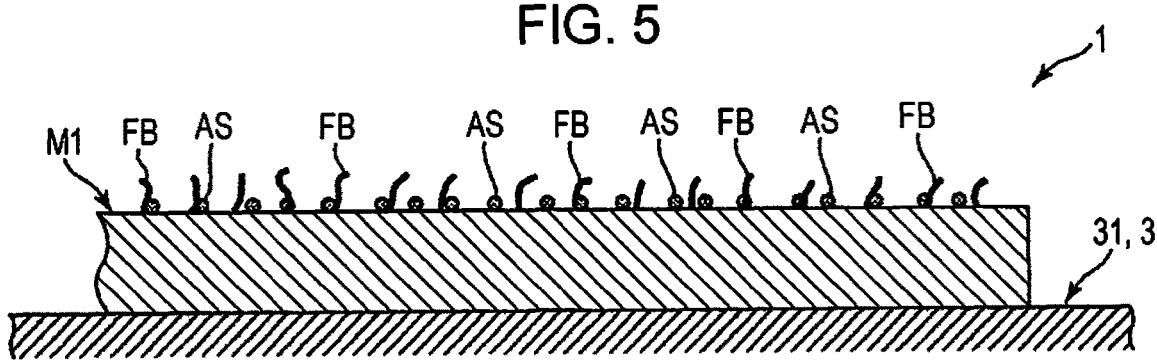
FIG. 5 is an image diagram sequentially showing a state of the sheet-like material processed by the processing device shown in FIG. 1 (enlarged view of a region (B) surrounded by a dot-and-dash line in FIG. 1).
Figure 6:
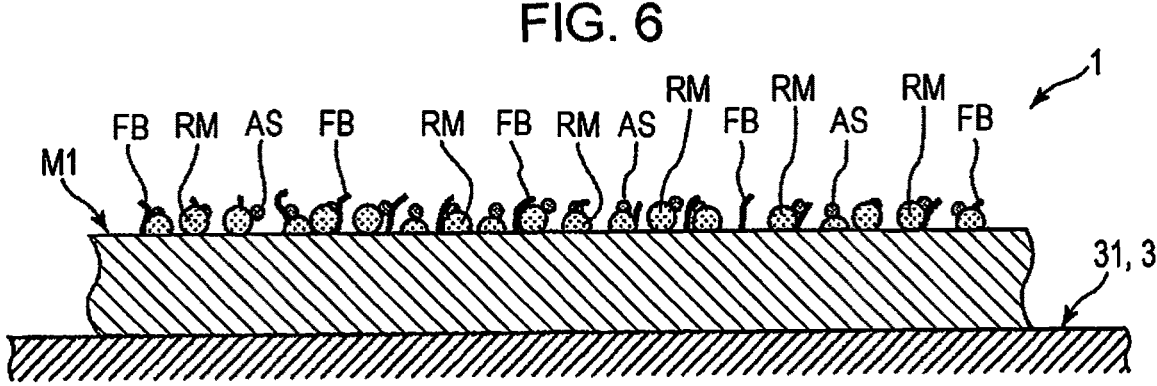
FIG. 6 is an image diagram sequentially showing a state of the sheet-like material processed by the processing device shown in FIG. 1 (enlarged view of a region (C) surrounded by a dot-and-dash line in FIG. 1).
Figure 7:
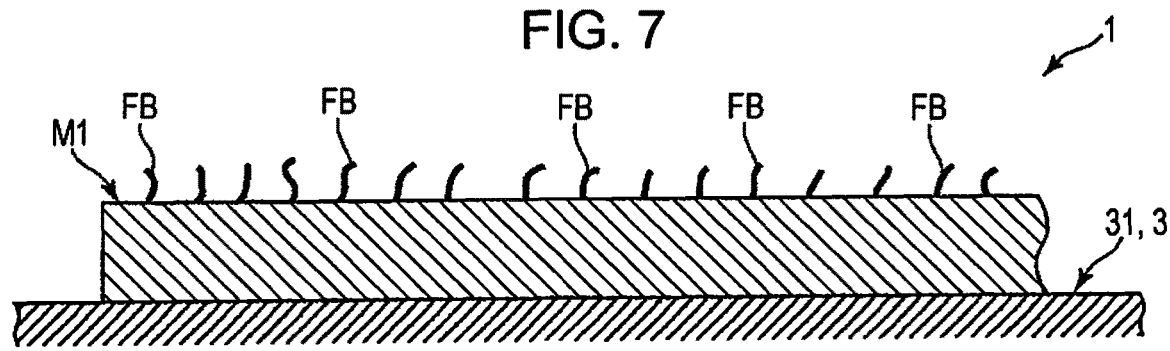
FIG. 7 is an image diagram sequentially showing a state of the sheet-like material processed by the processing device shown in FIG. 1 (enlarged view of a region (D) surrounded by a dot-and-dash line in FIG. 1).

FIG. 1 is a schematic side view showing a configuration of an upstream side (processing device of the invention) of the sheet manufacturing apparatus (first embodiment) of the invention. FIG. 2 is a schematic side view showing a configuration on a downstream side of the sheet manufacturing apparatus (first embodiment) of the invention. FIG. 3 is a diagram sequentially illustrating steps performed by the sheet manufacturing apparatus (first embodiment) of the invention. FIGS. 4 to 7 are image diagrams, each sequentially showing a state of the sheet-like material processed by the processing device shown in FIG. 1 (FIG. 4 is an enlarged view of a region [A] surrounded by a dot-and-dash line in FIG. 1, FIG. 5 is an enlarged view of a region [B] surrounded by a dot-and-dash line in FIG. 1, FIG. 6 is an enlarged view of a region [C] surrounded by a dot-and-dash line in FIG. 1, and FIG. 7 is an enlarged view of a region [D] surrounded by a dot-and-dash line in FIG. 1). Hereinafter, for convenience of description, in FIGS. 1, 2, and 4 to 7 (the same applies to FIGS. 8, 10, 11, 13, and 15), an upper side is referred to as "upper" or "upward", and a lower side is referred to as "lower" or "downward." In addition, in FIGS. 1, 2, and 4 to 7 (the same applies to FIGS. 8 to 11, 13, and 15), a left side is referred to as "left" or "upstream side," and a right side is referred to as "right" or "downstream side."

As shown in FIG. 1, the sheet manufacturing apparatus 100 includes, on an upstream side thereof, the processing device 1. Such processing device 1 includes a transporting section 3, a fluffing section 4, a particle supplying section 7, and an alien substance-removing section 5.

Further, as shown in FIG. 2, the sheet manufacturing apparatus 100 includes, on a downstream side thereof, a raw material-supplying section 11, a coarsely-crushing section 12, a defibrating section 13, a sorting section 14, a first web forming section 15, a subdividing section 16, a mixing section 17, a loosening section 18, a second web forming section 19, a sheet forming section 20, a cutting section 21, and a stocking section 22. In addition, the sheet manufacturing apparatus 100 includes a humidifying section 231, a humidifying section 232, a humidifying section 233, and a humidifying section 234. Further, sites of these sections on the downstream side of the sheet manufacturing apparatus 100 may partially belong to the processing device 1.

Operation of each section of the sheet manufacturing apparatus 100 is controlled by a controlling section (not shown).

As shown in FIG. 3, in the present embodiment, the manufacturing method of a sheet includes a fluffing step, a particle supplying step, an alien substance-removing step, a raw material-supplying step, a coarsely-crushing step, a defibrating step, a sorting step, a first web forming step, a dividing step, a mixing step, a loosening step, a second web forming step, a sheet forming step, and a cutting step. The sheet manufacturing apparatus 100 can sequentially perform these steps. In addition, among these steps, steps (pre-steps) performed by the processing device 1 are the fluffing step, the particle supplying step, and the alien substance-removing step.

Hereinafter, a configuration of each section included in the sheet manufacturing apparatus 100 will be described.

First, a configuration of the downstream side of the sheet manufacturing apparatus 100 will be described, and then a configuration of the upstream side of the sheet manufacturing apparatus 100, that is, the processing device 1 will be described.

The raw material-supplying section 11 is a section that performs the raw material-supplying step (see FIG. 3) of supplying the raw material M1 to the coarsely-crushing section 12. Such raw material M1 is a sheet-like material containing fibers FB (cellulose fibers) (see FIGS. 4 to 7). Such raw material M1, that is, the sheet-like material is one to be subjected to an alien substance-removing process that removes the alien substances AS by the processing device 1. The cellulose fiber may be a fibrous type having, as its main component, cellulose (cellulose in a narrow sense) which is a compound and may contain hemicellulose and lignin, in addition to cellulose (cellulose in a narrow sense).

The coarsely-crushing section 12 is a section that performs the coarsely-crushing step (see FIG. 3) of coarsely crushing the raw material M1, which is supplied from the raw material-supplying section 11, in an aerial manner (in the air (in the atmosphere)). The coarsely-crushing section 12 has a pair of coarsely-crushing blades 121 and a chute (hopper) 122.

The pair of coarsely-crushing blades 121 can be rotated in a direction opposite to each other so that the raw material M1 is coarsely crushed therebetween, that is, cut into coarsely-crushed pieces M2. The coarsely-crushed pieces M2 preferably have a shape and size suitable for a defibrating process in the defibrating section 13, for example, they are preferably a small piece with a side length of 100 mm or less, and more preferably a small piece with a side length of 10 mm to 70 mm.

The chute 122 is disposed downward of the pair of coarsely-crushing blades 121, and has, for example, a funnel shape. Thus, the chute 122 can receive the coarsely-crushed pieces M2 that have been crushed by the coarsely-crushing blades 121 and dropped.

Further, upward of the chute 122, the humidifying section 231 is disposed adjacent to the pair of coarsely-crushing blades 121. The humidifying section 231 humidifies the coarsely-crushed pieces M2 in the chute 122. Such humidifying section 231 is configured as an evaporation type (or warm-air evaporation type) humidifier which has a filter (not shown) containing moisture, and supplies, to the coarsely-crushed pieces M2, humidified air having increased humidity due to passage of air through the filter. By supplying the humidified air to the coarsely-crushed pieces M2, it is possible to prevent the coarsely-crushed pieces M2 from adhering to the chute 122 or the like due to static electricity.

The chute 122 is connected to the defibrating section 13 via a pipe (flow path) 241. The coarsely-crushed pieces M2 collected in the chute 122 pass through the pipe 241 and are transported to the defibrating section 13.

The defibrating section 13 is a section that performs the defibration step (see FIG. 3) of defibrating the coarsely-crushed pieces M2 in an aerial manner, that is, in a dry manner. By the defibrating process in such defibrating section 13, it is possible to generate a defibrated material M3 from the coarsely-crushed pieces M2. Here, "defibrating" means to unravel the coarsely-crushed pieces M2, which are formed by bonding of a plurality of the fibers FB to one another, into each individual fiber. Such unraveled fibers become the defibrated material M3. A shape of the defibrated material M3 is linear or belt-like. In addition, the defibrated materials M3 may exist in a state where they are entangled with one another into a lump, that is, in a state where so-called a "dummy" is formed.

In the present embodiment, for example, the defibrating section 13 is configured as an impeller mill having a rotor that is rotated at high speed and a liner that is positioned on an outer periphery of the rotor. The coarsely-crushed pieces M2 flowing into the defibrating section 13 are interposed between the rotor and the liner, and defibrated.

Further, the defibrating section 13 can generate a flow of air (airflow) from the coarsely-crushing section 12 to the sorting section 14 due to rotation of the rotor. Thus, the coarsely-crushed pieces M2 can be sucked from the pipe 241 to the defibrating section 13. In addition, after the defibrating process, the defibrated material M3 can be delivered to the sorting section 14 via the pipe 242.

A blower 261 is installed midway in the pipe 242. The blower 261 is an airflow generating device that generates an airflow toward the sorting section 14. This promotes delivery of the defibrated material M3 to the sorting section 14.

The sorting section 14 is a section that performs the sorting step (see FIG. 3) of sorting the defibrated material M3 according to a length of the fiber FB. In the sorting section 14, the defibrated material M3 is sorted into a first sorted material M4-1 and a second sorted material M4-2 that is larger than the first sorted material M4-1. The first sorted material M4-1 has a size suitable for the subsequent manufacture of the sheet S. An average length thereof is preferably 1 μm to 100 μm. In addition, an average aspect ratio thereof is preferably less than 3, and more preferably 2 or less. On the other hand, the second sorted material M 4-2 includes, for example, one in which defibration is insufficiently performed, one in which defibrated fibers FB are excessively aggregated, and the like.

The sorting section 14 has a drum portion 141 and a housing portion 142 that houses the drum portion 141.

The drum portion 141 is configured as a cylindrical mesh member and is a sieve that rotates about its central axis. The defibrated material M3 flows into the drum portion 141. As the drum portion 141 rotates, the defibrated material M3 having a size smaller than a mesh opening is selected as the first sorted material M4-1, and the defibrated material M3 having a size larger than the mesh opening is selected as the second sorted material M4-2.

The first sorted material M4-1 drops from the drum portion 141.

On the other hand, the second sorted material M4-2 is delivered to a pipe (flow path) 243 connected to the drum portion 141. The pipe 243 is connected to the pipe 241 on the opposite side (downstream side) to the drum portion 141. The second sorted material M4-2 having passed through the pipe 243 joins the coarsely-crushed pieces M2 in the pipe 241 and flows into the defibrating section 13 together with the coarsely-crushed pieces M2. Thus, the second sorted material M4-2 is returned to the defibrating section 13 and is subjected to the defibrating process together with the coarsely-crushed pieces M2.

Further, from the drum portion 141, the first sorted material M4-1 drops while dispersing in the air and heads toward the first web forming section (separating section) 15 positioned downward of the drum portion 141. The first web forming section 15 is a section that performs the first web forming step (see FIG. 3) of forming a first web M5 from the first sorted material M4-1. The first web forming section 15 has a mesh belt (separating belt) 151, three stretching rollers 152, and a suction portion (suction mechanism) 153.

The mesh belt 151 is an endless belt, and the first sorted material M4-1 is accumulated thereon. Such mesh belt 151 is looped around the three stretching rollers 152. Due to rotational drive of the stretching rollers 152, the first sorted material M4-1 on the mesh belt 151 is transported to a downstream side.

The first sorted material M4-1 has a size larger than the mesh opening of the mesh belt 151. Thus, passage of the first sorted material M4-1 through the mesh belt 151 is regulated, and therefore the first sorted material M4-1 can be accumulated on the mesh belt 151. In addition, since the first sorted material M4-1 is transported to the downstream side together with the mesh belt 151 while being accumulated on the mesh belt 151, it is formed as a first layered web M5.

Further, for example, dust, dirt, or the like may be mixed in the first sorted material M4-1. The dust or dirt may be incorporated together the raw material M1, for example, in a case where the raw material M1 is supplied from the raw material-supplying section 11 to the coarsely-crushing section 12. Such dust or dirt is smaller than the mesh opening of the mesh belt 151. Thus, the dust or dirt passes through the mesh belt 151 and further drops downward.

The suction portion 153 can suck air from downward of the mesh belt 151. Thus, the dust or dust having passed through the mesh belt 151 can be sucked together with air.

Further, the suction portion 153 is connected to a collecting portion 27 via a pipe (flow path) 244. The dust or dirt sucked by the suction portion 153 is collected in the collecting portion 27.

A pipe (flow path) 245 is further connected to the collecting portion 27. In addition, a blower 262 is installed midway in the pipe 245. Due to operation of such blower 262, a suction force can be generated in the suction portion 153. Thus, formation of the first web M5 on the mesh belt 151 is promoted. Such first web M5 is one in which the dust or dirt has been removed. In addition, the dust or dirt passes through the pipe 244 due to operation of the blower 262 to reach the collecting portion 27.

The housing portion 142 is connected to the humidifying section 232. The humidifying section 232 is configured as an evaporation type humidifier similar to the humidifying section 231. Thus, humidified air is supplied into the housing portion 142. Such humidified air can also humidify the first sorted material M4-1, and therefore it is possible to prevent the first sorted material M4-1 from adhering to an inner wall of the housing portion 142 due to an electrostatic force.

On a downstream side of the sorting section 14, the humidifying section 235 is disposed. The humidifying section 235 is configured as an ultrasonic type humidifier which sprays water. Thus, moisture can be supplied to the first web M5, and therefore a moisture content of the first web M5 is adjusted. Such adjustment can prevent the first web M5 from being adsorbed to the mesh belt 151 due to an electrostatic force. Accordingly, the first web M5 is easily peeled off from the mesh belt 151 at a position where the mesh belt 151 is folded back by the stretching roller 152.

On a downstream side of the humidifying section 235, the subdividing section 16 is disposed. The subdividing section 16 is a section that performs the dividing step (see FIG. 3) of dividing the first web M5 which has been peeled off from the mesh belt 151. The subdividing section 16 has a rotatably-supported propeller 161 and a housing portion 162 for housing the propeller 161. The first web M5 is caught by the rotating propeller 161, so that the first web M5 can be divided. The divided first web M5 becomes a subdivided body M6. In addition, the subdivided body M6 descends within the housing portion 162.

The housing portion 162 is connected to the humidifying portion 233. The humidifying section 233 is configured as an evaporation type humidifier similar to the humidifying section 231. Thus, humidified air is supplied into the housing portion 162. Such humidified air can also prevent the subdivided body M6 from adhering to inner walls of the propeller 161 and the housing portion 162 due to an electrostatic force.

On a downstream side of the subdividing section 16, the mixing section 17 is disposed. The mixing section 17 is a section that performs the mixing step (see FIG. 3) of mixing the subdivided body M6 and a resin P1. Such mixing section 17 includes a resin supplying portion 171, a pipe (flow path) 172, and a blower 173.

The pipe 172 connects the housing portion 162 of the subdividing section 16 with the housing portion 182 of the loosening section 18, and is a flow path through which a mixture M7 of the subdivided body M6 and the resin P1 passes.

The resin supplying portion 171 is connected midway to the pipe 172. The resin supplying portion 171 has a screw feeder 174. Due to rotational drive of such screw feeder 174, it is possible to supply the resin P1 as powders or particles to the pipe 172. The resin P1 supplied to the pipe 172 is mixed with the subdivided body M6 to form the mixture M7.

The resin P1 causes the fibers FB to be bonded to one another in a subsequent step. As the resin P1, for example, a thermoplastic resin, a curable resin, or the like can be used, and the thermoplastic resin is preferably used. Examples of the thermoplastic resin include polyolefins such as AS resin, ABS resin, polyethylene, polypropylene, and ethylene-vinyl acetate copolymer (EVA); modified polyolefins; acrylic resins such as polymethyl methacrylate; polyesters such as polyvinyl chloride, polystyrene, polyethylene terephthalate, and polybutylene terephthalate; polyamides (nylons) such as nylon 6, nylon 46, nylon 66, nylon 610, nylon 612, nylon 11, nylon 12, nylon 6-12, and nylon 6-66; polyphenylene ether; polyacetal; polyether; polyphenylene oxide; polyether ether ketone; polycarbonate; polyphenylene sulfide; thermoplastic polyimide; polyether imide; liquid crystal polymers such as aromatic polyester; and various thermoplastic elastomers based on styrene, polyolefin, polyvinyl chloride, polyurethane, polyester, polyamide, polybutadiene, trans-polyisoprene, fluoro rubber, chlorinated polyethylene, or the like, and one type or two or more types selected therefrom can be used in combination. Preferably, as the thermoplastic resin, a polyester or one containing the same is used.

In addition to the resin P1, those supplied from the resin supplying portion 171 may contain, for example, a coloring agent for coloring the fibers FB, an aggregation inhibitor for suppressing aggregation of the fibers FB and aggregation of the resin P1, a flame retardant for making the fibers FB or the like less susceptible to burning, and the like.

Further, the blower 173 is installed on a downstream side of the resin supplying portion 171 midway in the pipe 172. The blower 173 can generate an airflow towards the loosening section 18. Such airflow can agitate the subdivided body M6 and the resin P1 in the pipe 172. Thus, the mixture M7 can flow into the loosening section 18 in a state where the subdivided body M6 and the resin P1 are uniformly dispersed. In addition, the subdivided body M6 in the mixture M7 is loosened in the process of passing through an inside of the pipe 172, and becomes a finer fibrous type.

The loosening section 18 is a section that performs the loosening step (see FIG. 3) of loosening the mutually entangled fibers FB in the mixture M7. The loosening section 18 has a drum portion 181 and a housing portion 182 for housing the drum portion 181.

The drum portion 181 is configured as a cylindrical mesh member and is a sieve that rotates about its central axis. The mixture M7 flows into such drum portion 181. As the drum portion 181 rotates, the fibers FB or the like having a size smaller than the mesh opening in the mixture M7 can pass through the drum portion 181. At that time, the mixture M7 is loosened.

Further, the mixture M7 loosened in the drum portion 181 drops while dispersing in the air and heads toward the second web forming section 19 positioned downward of the drum portion 181. The second web forming section 19 is a section that performs the second web forming step (see FIG. 3) of forming the second web M8 from the mixture M7. The second web forming section 19 has a mesh belt (separating belt) 191, stretching rollers 192, and a suction portion (suction mechanism) 193.

The mesh belt 191 is an endless belt, and the mixture M7 is accumulated thereon. Such mesh belt 191 is looped around the four stretching rollers 192. Due to rotational drive of the stretching rollers 192, the mixture M7 on the mesh belt 191 is transported to a downstream side.

Further, most of the mixture M7 on the mesh belt 191 has a size larger than the mesh opening of the mesh belt 191. Thus, passage of the mixture M7 through the mesh belt 191 is regulated, and therefore the mixture M7 can be accumulated on the mesh belt 191. In addition, since the mixture M7 is transported to the downstream side together with the mesh belt 191 while being accumulated on the mesh belt 191, it is formed as a second layered web M8.

The suction portion 193 can suck air from downward of the mesh belt 191. Thus, the mixture M7 can be sucked onto the mesh belt 191, and therefore accumulation of the mixture M7 on the mesh belt 191 is promoted.

A pipe (flow path) 246 is connected to the suction portion 193. In addition, a blower 263 is installed midway in such pipe 246. Due to operation of such blower 263, a suction force can be generated in the suction portion 193.

The housing portion 182 is connected to the humidifying section 234. The humidifying section 234 is configured as an evaporation type humidifier similar to the humidifying section 231. Thus, humidified air is supplied into the housing portion 182. Such humidified air can humidify an inside of the housing portion 182, and therefore can prevent the mixture M7 from adhering to an inner wall of the housing portion 182 due to an electrostatic force.

On a downstream side of the loosening portion 18, the humidifying section 236 is disposed. The humidifying section 236 is configured as an ultrasonic type humidifier similar to the humidifying section 235. Thus, moisture can be supplied to the second web M8, and therefore a moisture content of the second web M8 is adjusted. Such adjustment can prevent the second web M8 from being adsorbed to the mesh belt 191 due to an electrostatic force. Accordingly, the second web M8 is easily peeled off from the mesh belt 191 at a position where the mesh belt 191 is folded back by the stretching roller 192.

On a downstream side of the second web forming section 19, the sheet forming section 20 is disposed. The sheet forming section 20 is a section that performs the sheet forming step (see FIG. 3) of forming a sheet S from the second web M8. Such sheet forming section 20 includes a pressurizing portion 201 and a heating portion 202.

The pressurizing portion 201 has a pair of calender rollers 203, and the second web M8 can be pressurized therebetween without being heated. Thus, a density of the second web M8 is increased. Such second web M8 is transported toward the heating portion 202. One of the pair of calendar rollers 203 is a main driving roller driven by operation of a motor (not shown), and the other is a driven roller.

The heating portion 202 has a pair of heating rollers 204, and the second web M8 can be pressurized therebetween while being heated. By being heated and pressurized in such a manner, the resin P1 melts in the second web M8, and the fibers FB are bonded to one another through such molten resin P1. Thus, the sheet S is formed. Such sheet S is transported toward the cutting section 21. One of the pair of heating rollers 204 is a main driving roller driven by operation of a motor (not shown), and the other is a driven roller.

On a downstream side of the sheet forming section 20, the cutting section 21 is disposed. The cutting section 21 is a section that performs the cutting step (see FIG. 3) of cutting the sheet S. Such cutting section 21 includes a first cutter 211 and a second cutter 212.

The first cutter 211 cuts the sheet S in a direction intersecting with a transporting direction of the sheet S.

The second cutter 212 cuts the sheet S in a direction parallel to the transporting direction of the sheet S on a downstream side of the first cutter 211.

By cutting with the first cutter 211 and the second cutter 212 as described above, the sheet S having a desired size can be obtained. Such sheet S is further transported to the downstream side and stored in the stocking section 22.

Meanwhile, in the present embodiment, the raw material M1 to be regenerated as the sheet S is a waste paper that has been printed and used. For this reason, the raw material M1 (fibers FB) before being introduced into the raw material-supplying section 11 is a material to which coloring materials such as black or color toners, various types of inks, various type of dyes, or pigments, dust, dirt, and the like have been adhered. Hereinafter, these adhered substances are collectively referred to as "alien substances AS". In a case where the sheet S is regenerated, it is preferable that the alien substances AS be removed as much as possible. Thus, the sheet S becomes a high-quality sheet from which the alien substances AS, that can be impurities during regeneration, have been removed.

Therefore, the sheet manufacturing apparatus 100 is configured so that the alien substances AS can be removed from the raw material M1 by the processing device 1 disposed on an upstream side of the sheet manufacturing apparatus 100. Hereinafter, the processing device 1 will be described. In particular, in a case where the alien substances AS are toners, removal efficiency of the alien substances AS by the processing device 1 is improved.

As shown in FIG. 1, the processing device 1 includes the transporting section 3, the fluffing section 4, the particle supplying section 7, and the alien substance-removing section 5. The processing device 1 is preferably installed in or connected to the raw material-supplying section 11.

The transporting section 3 transports the raw material M1 toward the downstream side. The transporting section 3 has a glue belt 31, two stretching rollers 32, and a multiplicity of idle rollers 33.

The glue belt 31 is an endless belt of which a surface is adhesive. Due to such adhesive force, the raw material M1 is fixed on the glue belt 31, and therefore the fluffing step in the fluffing section 4, the particle supplying step in the particle supplying section 7, and the alien substance-removing step in the alien substance-removing section 5 are stably performed. In addition, a plurality of the raw materials M1 can be mounted on the glue belt 31. Meanwhile, orientations (postures) of these raw materials M1 on the glue belt 31 may or may not be aligned.

The two stretching rollers 32 are disposed apart from each other on the upstream side and the downstream side, and the glue belt 31 is looped therearound. One stretching roller 32 of the two stretching rollers 32 is a driving roller which is connected to a motor (not shown) and rotates in a direction of an arrow $\alpha_{32}$ by driving of such motor. In addition, the other stretching roller 32 is a driven roller which rotates in the direction of the arrow $\alpha_{32}$ in the same manner as the driving roller, as a rotational force from the driving roller is transmitted via the glue belt 31. Meanwhile, due to rotation of each stretching roller 32, the raw material M1 on the glue belt 31 is transported in a transporting direction $\alpha_{31}$.

Further, in the transporting section 3, a transporting speed of the raw material M1 can vary by adjusting a rotation number of the driving roller.

The multiplicity of idle rollers 33 are disposed apart between the two stretching rollers 32. Along with the driving of the glue belt 31, each of the idle rollers 33 can rotate in a direction of an arrow $\alpha_{33}$ which is the same direction as the rotation direction of the stretching roller 32. Due to such idle rollers 33, deflection of the glue belt 31 can be prevented, and therefore the raw material M1 can be stably transported.

In the configuration shown in FIG. 1, the transporting section 3 is configured to have a belt-transported configuration. However, the invention is not limited thereto, and for example, the transporting section 3 may have a configuration where the raw material M1 is transported while being held on a stage by adsorption due to a negative pressure, that is, a platen.

As shown in FIG. 1, at an upper side of the glue belt 31, the fluffing section 4 is disposed. The fluffing section 4 is a section that performs the fluffing step (see FIG. 3) of fluffing the fibers FB contained in the raw material M1 (sheet-like material), the fibers FB being at least near the surface of the raw material M1.

Here, "fluffing" will be described.

The fibers FB contained in the raw material M1 are in a state of sleeping, that is, a lying-down state, as shown in FIG. 4, until the fluffing step is performed. In the state shown in FIG. 4, the fibers FB lye down in the same direction, that is, on the right side in FIG. 4, but some of the fibers FB may lye down in mutually different directions. By going through the fluffing step, the fibers FB that are at least near the surface are raised, that is, made to stand, as shown in FIG. 5, as compared with the state shown in FIG. 4. This is called "fluffing". As shown in FIG. 7, a standing state of the fibers FB is maintained until at least the alien substance-removing step is performed.

Further, the alien substances AS have penetrated between the fibers FB. For example, in a case where the alien substances AS are toners, the alien substances AS may have penetrated to about a ¼ to ⅓ depth of the thickness of the raw material M1.

As shown in FIG. 1, the fluffing section 4 has a brush 41. Such brush 41 has the rotatably-supported cylindrical or columnar core portion 411, and the brush bristles 412 provided on an outer peripheral portion of the core portion 411.

The core portion 411 is connected to a motor (not shown) and can be rotated together with the brush bristles 412 in a direction of an arrow $\alpha_{41}$ by driving of such motor. A rotating shaft 413 of the brush 41 is installed in a direction substantially orthogonal with respect to the transporting direction $\alpha_{31}$ of the raw material M1. However, the invention is not limited thereto, and the rotating shaft 413 may be installed in a direction inclined at a predetermined angle (for example, 5 degrees to 45 degrees) with respect to the orthogonal direction.

The brush bristles 412 are implanted over the entire periphery of the outer peripheral portion of the core portion 411. The brush bristles 412 are, for example, formed of a flexible resin material such as polyamide or polyester. In addition, tips of the brush bristles 412 may be sharp or may be rounded.

As the brush 41 rotates in the direction of the arrow $\alpha_{41}$, in the raw material M1 passing right under the brush 41, the fibers FB come into contact with the brush bristles 412 of the brush 41 and are forcefully pushed back to a direction opposite to the transporting direction $\alpha_{31}$, that is, the upstream side. Thus, in the raw material M1, the fibers FB becomes a fluffed state, that is, the fibers FB change from the state shown in FIG. 4 to the state shown in FIG. 5. Due to such a state, the alien substances AS can be lifted up as much as possible from the fibers FB, and therefore the alien substances AS are easily removed in the alien substance-removing section 5.

The brush 41 is configured to rotate in the direction of the arrow $\alpha_{41}$ in the present embodiment. However, the invention is not limited thereto, and, for example, the brush 41 may be configured to rotate in a direction opposite to the direction of the arrow $\alpha_{41}$, or it may be configured to alternately perform the rotation in the $\alpha_{41}$ direction and in a direction opposite to the $\alpha_{41}$ direction in a periodic manner. Furthermore, the brush 41 may be configured to move (reciprocate) also toward a direction of its rotating shaft 413 as it rotates.

Further, although the brush 41 is configured to rotate in the present embodiment, the invention is not limited thereto, and the brush 41 may, for example, be configured to move in a direction opposite to the transporting direction $\alpha_{31}$ or in the same direction as the transporting direction $\alpha_{31}$.

Further, downward of the brush 41, one of the idle rollers 33 is positioned along the glue belt 31 (such idle roller 33 is hereinafter referred to as "idle roller 33a"). Due to such idle roller 33a, the brush 41 can be pressed against the raw material M1 from an upper side, and therefore the brush bristles 412 and the fibers FB sufficiently come into contact with each other. Thus, the fibers FB can be fluffed without excess or deficiency.

As shown in FIG. 1, at an upper side of the glue belt 31, the particle supplying section 7 is disposed on a downstream side of the fluffing section 4. The particle supplying section 7 is a section that performs the particle supplying step (see FIG. 3) of supplying the particles RM having Mohs hardness of 2 to 5 to the fluffed fibers FB by ejecting the particles RM and causing them to collide with the fluffed fibers FB.

The particles RM supplied from such particle supplying section 7 have a function of adsorbing the alien substances AS contained in the raw material M1 (sheet-like material). As shown in FIG. 6, as the particles RM exert such adsorption function, the alien substances AS migrate to the particles RM and are reliably removed from the fibers FB. As such, the particles RM are removal particles for removing alien substances AS from the fibers FB. In particular, in a case where the alien substances AS are toners, the particles RM are preferable due to their high function as removal particles.

Further, the particles RM are ejected from the particle supplying section 7 and supplied. Depending on an ejection speed and a size of the particle diameter, the particles RM have a function of colliding with the alien substances AS contained in the raw material M1 (sheet-like material) to peel the alien substances AS off from the fibers FB. This also allows the alien substances AS to be reliably removed from the fibers FB as shown in FIG. 6.

The particle supplying section 7 has a reservoir portion 71. The reservoir portion 71 is a tank that stores the particles RM. In a case where such reservoir portion 71 is empty of the particles RM, the reservoir portion 71 is exchanged for a new one in which the particles RM are sufficiently stored.

Further, the particle supplying section 7 has an ejecting portion 72 for ejecting the particles RM toward the raw material M1. The ejecting portion 72 is configured to have a pipe 73, a blower 74, and a nozzle 75.

The pipe 73 is connected to the reservoir portion 71. The particles RM can pass through an inside of the pipe 73 from the reservoir portion 71 toward the nozzle 75.

The blower 74 is installed midway in a longitudinal direction of the pipe 73. The blower 74 can generate an airflow toward the raw material M1 positioned downward of the nozzle 75. Thus, the particles RM pass through the pipe 73 and are ejected from the nozzle 75. Some of the ejected particles RM come into contact with the alien substances AS adhered to the fibers FB. The particles RM in contact with the alien substances AS can adsorb the alien substances AS and cause them to migrate from the fibers FB, or can collide with the alien substances AS and cause them to be peeled off from the fibers FB. Thus, it is possible to reliably remove the alien substances AS from the fibers FB. Meanwhile, among the particles RM ejected from the nozzle 75, in addition to those in contact with the alien substances AS, there may be some which are not in contact with the alien substances AS.

As the particles RM suitable for removing the alien substances AS, those having a surface of Mohs hardness of 2 to 5 can be used, and those having Mohs hardness of 2 to 4 are preferably used. Thus, adsorption (peeling) and removing ability of the alien substances AS are effectively exerted. In a case where the Mohs hardness of the particles RM is less than the lower limit value, for example, the adsorption and removal ability of the alien substances AS from the fiber FB may be insufficient, depending on the conditions such as the type and amount of the alien substances AS. In addition, in a case where the Mohs hardness of the alien substances AS exceeds the upper limit value, for example, damages due to collision may be given to the fibers FB. Such particles RM are not particularly limited, and examples thereof include the following.

The particles RM are preferably formed of, for example, a resin-based material. The resin-based material is not particularly limited, and examples thereof include the following various thermoplastic resins and various thermosetting resins. By appropriately selecting such material, the above-mentioned Mohs hardness can be easily obtained.

Examples of the thermoplastic resin include polyolefins such as polyethylene, polypropylene, and ethylene-vinyl acetate copolymer; modified polyolefins; polyamides (for example, nylon 6, nylon 46, nylon 66, nylon 610, nylon 612, nylon 11, nylon 12, nylon 6-12, and nylon 6-66); thermoplastic polyimide; liquid crystal polymers such as aromatic polyester; polyphenylene oxide; polyphenylene sulfide, polycarbonate; polymethyl methacrylate, polyether; polyether ether ketone, polyether imide; polyacetal; various thermoplastic elastomers based on styrene, polyolefin, polyvinyl chloride, polyurethane, polyester, polyamide, polybutadiene, trans-polyisoprene, fluoro rubber, chlorinated polyethylene, or the like; and copolymers, blends, polymer alloys, and the like containing these as main constituents, and one type or two or more types thereof can be used in a mixture. Among these, polyamide and polycarbonate are particularly preferably used.

Examples of the thermosetting resin include an epoxy resin, a phenol resin, a urea resin, a melamine resin, a polyester (unsaturated polyester) resin, a polyimide resin, a silicone resin, and a polyurethane resin, and one type or two or more types thereof can be used in a mixture. Among these, a urea resin and a melamine resin are particularly preferably used.

By using such resin-based material, the particles RM can sufficiently exert the function (adsorption (peeling) and removing ability of the alien substances AS) as the above-described removal particles. In addition, even in a case where the particles RM collide with the fibers FB, it is possible to prevent the damages due to such collision from being given to the fibers FB. Further, even in a case where the particles RM remain in steps on a downstream side of the particle supplying step, it is possible to prevent a quality of the sheet S to be manufactured from deteriorating.

In a case where the particles RM are formed of a resin-based material, an average particle diameter of the particles RM is preferably in a range of 150 μm to 1,500 μm, and more preferably in a range of 180 μm to 1,200 μm. In addition, it is preferable that the adsorption (peeling) and removing ability of the alien substances AS be high.

Further, it is preferable that in addition to the resin-based material, the particles RM be formed of, for example, a plant-based material. The plant-based material is not particularly limited, and examples thereof include a crushed outer shell of a plant seed and a crushed outer shell of a plant fruit.

As the plant seed, for example, a seed of walnut, peach, apricot, or the like can be used.

As the plant fruit, dried corn kernel, dried wheat endosperm, or the like can be used.

By using such plant-based material, similar to the resin-based material, the particles RM can sufficiently exert the function (adsorption (peeling) and removing ability of the alien substances AS) as the above-mentioned removal particles. In addition, even in a case where the particles RM collide with the fibers FB, it is possible to prevent the damages due to such collision from being given to the fibers FB.

In a case where the particles RM are formed of the plant-based material, an average particle diameter of the particles RM is preferably in a range of 60 μm to 5,500 μm, and more preferably in a range of 100 μm to 5,000 μm. In addition, it is preferable that the adsorption (peeling) and removing ability of the alien substances AS be high.

Further, the particles RM may have a structure having a core (central portion) and a shell (surface layer portion covering the central portion). In this case, for example, as a material of the shell, one having a Mohs hardness lower than that of a material of the core can be used. Examples thereof include one in which a core formed of a plant-based material is covered with a shell formed of a resin material (in particular, a thermoplastic resin).

Further, the particles RM may be, for example, a porous body or may have minute irregularities.

Further, the speed (ejection speed) of the particles RM to be ejected is appropriately set, for example, depending on a constituent material and a particle diameter of the particles RM.

The sheet manufacturing apparatus 100 (processing device 1) includes the alien substance-removing section 5 for removing the alien substances AS together with the particles RM from the raw material M1 (sheet-like material). As shown in FIG. 1, the alien substance-removing section 5 is disposed at an upper side of the glue belt 31 and on a downstream side of the particle supplying section 7. Such alien substance-removing section 5 is a section that performs the alien substance-removing step (see FIG. 3) of removing the alien substances AS by bringing the fluffed fibers FB into contact with a fabric material 51 formed of a nonwoven fabric or a woven fabric and causing the alien substances AS to migrate to the fabric material 51 together with the particles RM. The alien substance-removing section 5 has the fabric material 51, two stretching rollers 52, a multiplicity of idle rollers 53, and a cleaning portion 54.

Although not shown in the drawings, it is also possible to have a configuration where a pressing pressure (pressing force) of the brush 41 against the raw material M1 is adjustable. An example of such a configuration is to have an adjusting portion that moves the rotating shaft 413 of the brush 41 in a vertical direction in FIG. 1. Thus, it is possible to more properly perform fluffing depending on a state of the raw material M1.

The fabric material 51 is formed of a nonwoven fabric or a woven fabric. Thus, the fabric material 51 can entangle with the alien substances AS, together with the particles RM, and take them out of the raw material M1. In addition, in the alien substance-removing section 5, the fabric material 51 is an endless belt. Accordingly, for example, in a case where the fabric material 51 is cleaned by the cleaning portion 54, the fabric material 51 can be continuously used as it is to remove the alien substances AS.

The two stretching rollers 52 are disposed apart from each other on the upstream side and the downstream side, and the fabric material 51 is looped therearound. One stretching roller 52 of the two stretching rollers 52 is a driving roller which is connected to a motor (not shown) and rotates in a direction of the arrow $\alpha_{52}$ by driving of such motor. In addition, the other stretching roller 52 is a driven roller which rotates in the direction of the arrow $\alpha_{52}$ similarly to the driving roller as a rotational force from the driving roller is transmitted via the fabric material 51. By the rotation of each stretching roller 52, the fabric material 51 is driven on the glue belt 31 in a direction of an arrow $\alpha_{51}$ which is a direction opposite to the transporting direction $\alpha_{31}$. Thus, the fabric material 51 can cause the alien substances AS together with the particles RM to migrate from the raw material M1, that is, adhere to and wipe off them. As a result, the alien substances AS and the particles RM are sufficiently removed, and a state as shown in FIG. 7 is obtained.

Further, in the alien substance-removing section 5, a driving speed of the fabric material 51 in the direction of the arrow $\alpha_{51}$ can vary by adjusting a rotation number of the driving roller.

The multiplicity of idle rollers 53 are disposed at equal intervals between the two stretching rollers 52. Along with driving of the fabric material 51, each of the idle rollers 53 can rotate in a direction of an arrow $\alpha_{53}$ which is the same direction as the rotation direction of the stretching roller 52.

Further, downward of the fabric material 51, a plurality of idle rollers 33 are positioned along the glue belt 31 (hereinafter these idle rollers 33 will be referred to as "idle rollers 33b"). The fabric material 51 can be pressed against the raw material M1 between these idle rollers 33b and the idle rollers 53. Thus, the fabric material 51, the alien substances AS, and the particles RM sufficiently come into contact with one another, and therefore the alien substances AS and the particles RM are sufficiently removed.

In addition, in a configuration shown in FIG. 1, the fabric material 51 is driven in the direction of the arrow $\alpha_{51}$ which is a direction opposite to the transporting direction $\alpha_{31}$. However, the invention is not limited thereto, and the fabric material 51 may, for example, be driven in the same direction as the transporting direction $\alpha_{31}$. In this case, it is preferable that there be a difference between a driving speed of the fabric material 51 and a transporting speed of the raw material M1.

The alien substance-removing section 5 has a cleaning portion 54 for cleaning the fabric material 51 to which the alien substances AS have migrated. The cleaning portion 54 is disposed upward of the fabric material 51 and is configured to suck the alien substances AS and the particles RM, which are adhered to the fabric material 51. Thus, the alien substances AS and the particles RM are removed from the fabric material 51, and therefore the fabric material 51 is cleaned. The cleaned fabric material 51 is again used to remove the alien substances AS.

As described above, the sheet manufacturing apparatus 100 (processing device 1) includes the defibrating section 13 that defibrates the coarsely-crushed pieces M2 in an aerial manner, the coarsely-crushed pieces M2 having been obtained via sequential steps from the raw material M1 (sheet-like material) after the particles RM are supplied. In the present embodiment, the alien substance-removing section 5 is disposed on an upstream side of the defibrating section 13. Accordingly, the alien substance-removing section 5 can remove the alien substances AS and the particles RM before defibration of the coarsely-crushed pieces M2. Thus, for example, it is possible to visually check whether or not the raw material M1 has been subjected to removal of the alien substances AS before the raw material M1 is introduced into the raw material-supplying section 11. In a case where the alien substances AS is sufficiently removed, the raw material M1 can be introduced into the raw material-supplying section 11, and in a case where the alien substances AS are insufficiently removed or are not removed, the raw material M1 can be returned to the processing device 1.

With the processing device 1 having the above-described configuration, the raw material M1 becomes a state where the alien substances AS are removed as much as possible before being introduced into the raw material-supplying section 11. Thus, the sheet S to be regenerated from the raw material M1 is a high quality sheet, in which the alien substances AS that may be impurities are removed.

Second Embodiment

Figure 8:
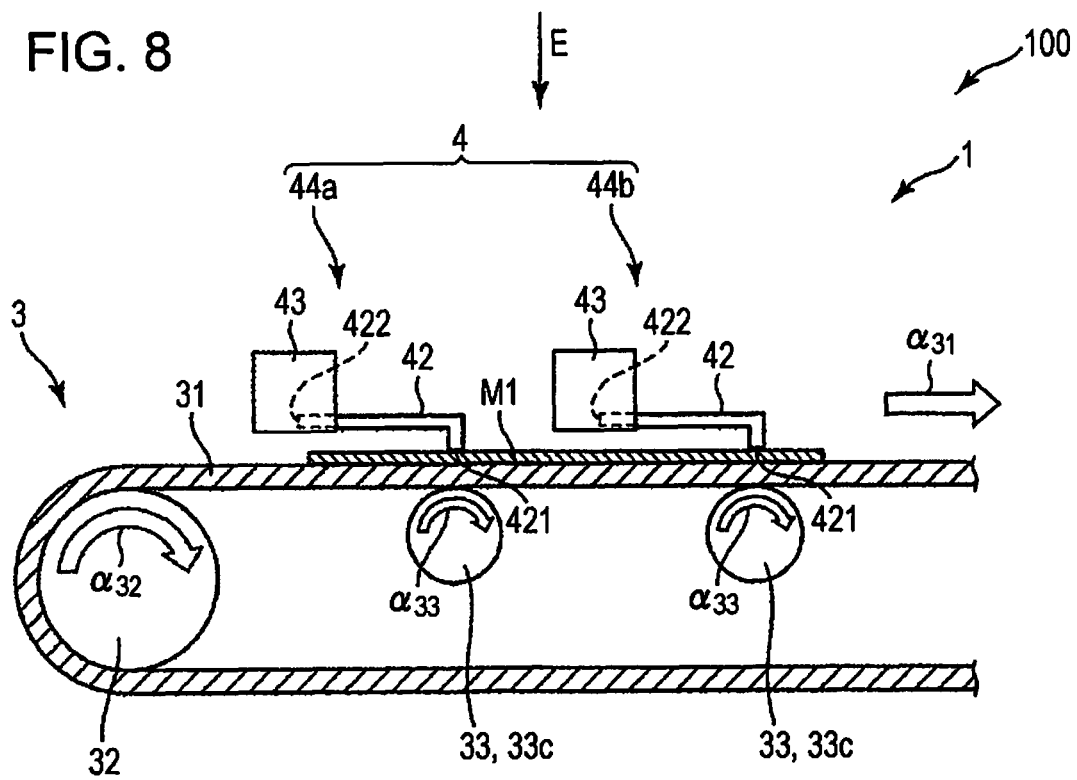
FIG. 8 is a schematic side view showing a configuration of an upstream side (processing device of the invention) of the sheet manufacturing apparatus (second embodiment) of the invention.
Figure 9:
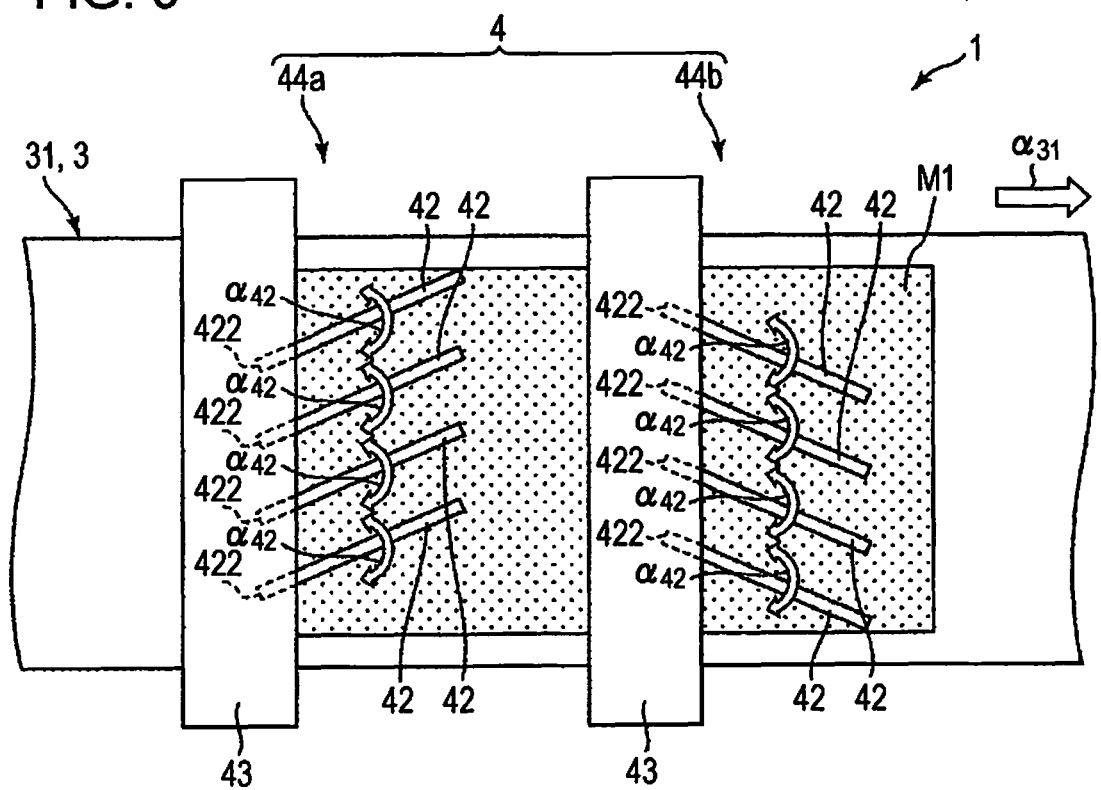
FIG. 9 is a view (plan view) seen in the direction of an arrow E in FIG. 8.

FIG. 8 is a schematic side view showing a configuration of an upstream side (processing device of the invention) of the sheet manufacturing apparatus (second embodiment) of the invention. FIG. 9 is a view (plan view) seen in a direction of an arrow E in FIG. 8.

Hereinafter, the second embodiment of the processing device, the sheet manufacturing apparatus, the processing method, and the manufacturing method of a sheet of the invention will be described with reference to these drawings. However, descriptions will be made on the differences from the above-described embodiment and descriptions will be omitted for the similar matters.

The present embodiment is the same as the first embodiment except that a configuration of the fluffing section is different.

As shown in FIGS. 8 and 9, in the present embodiment, the fluffing section 4 has, for example, four (plural) hook-shape claw portions 42 and rotary supporting portions 43 that rotatably support these claw portions 42. Here, the "hook-shape" means a shape in which at a position midway in a longitudinal direction of a longitudinal member (claw portion 42) (any position between a base end part 422 and a sharp end 421), the member is bent or curved. The number of the claw portions 42 is not limited to four, and may be, for example, two, three, or five or more. In addition, the claw portion 42 is not limited to the hook-shape, and may be a linear shape.

The four claw portions 42 are disposed along a width direction of the glue belt 31. Each claw portion 42 is formed of a hard resinous or metallic linear body, and its sharp end 421 faces downward. The raw material M1 passing right under the sharp end 421 of each claw portion 42 is scratched by the sharp end 421 and the fibers FB are forcibly pushed back in a direction opposite to the transporting direction $\alpha_{31}$, that is, an upstream side. Thus, the raw material M1 becomes a state where the fibers FB are fluffed.

Further, downward of the sharp end 421 of the claw portion 42, one of the idle rollers 33 is positioned along the glue belt 31 (hereinafter such idle roller 33 is referred to as "idle roller 33c"). By such idle roller 33c, the sharp end 421 of each claw portion 42 can be pressed against the raw material M1 from an upper side, and therefore scratching by the sharp end 421 is sufficiently performed. Thus, the fibers FB can be fluffed without excess or deficiency.

The rotary supporting portion 43 can rotate the base end part 422 of the four claw portions 42 all together in a direction of an arrow $\alpha_{42}$.

Further, in the present embodiment, the four claw portions 42 and the rotary supporting portions 43 are unitized, and a first unit 44a on an upstream side and a second unit 44b on a downstream side are disposed. A rotation direction of each claw portion 42 in the first unit 44a and a rotation direction of each claw portion 42 in the second unit 44b are opposite to each other. For example, in a case where each claw portion 42 of the first unit 44a is rotated counterclockwise in FIG. 9, each claw portion 42 of the second unit 44b is rotated clockwise in FIG. 9. Due to such rotation, the raw material M1 can be scratched uniformly by the claw portions 42, and therefore the fibers FB can be fluffed over the entire raw material M1.

Third Embodiment

Figure 10:
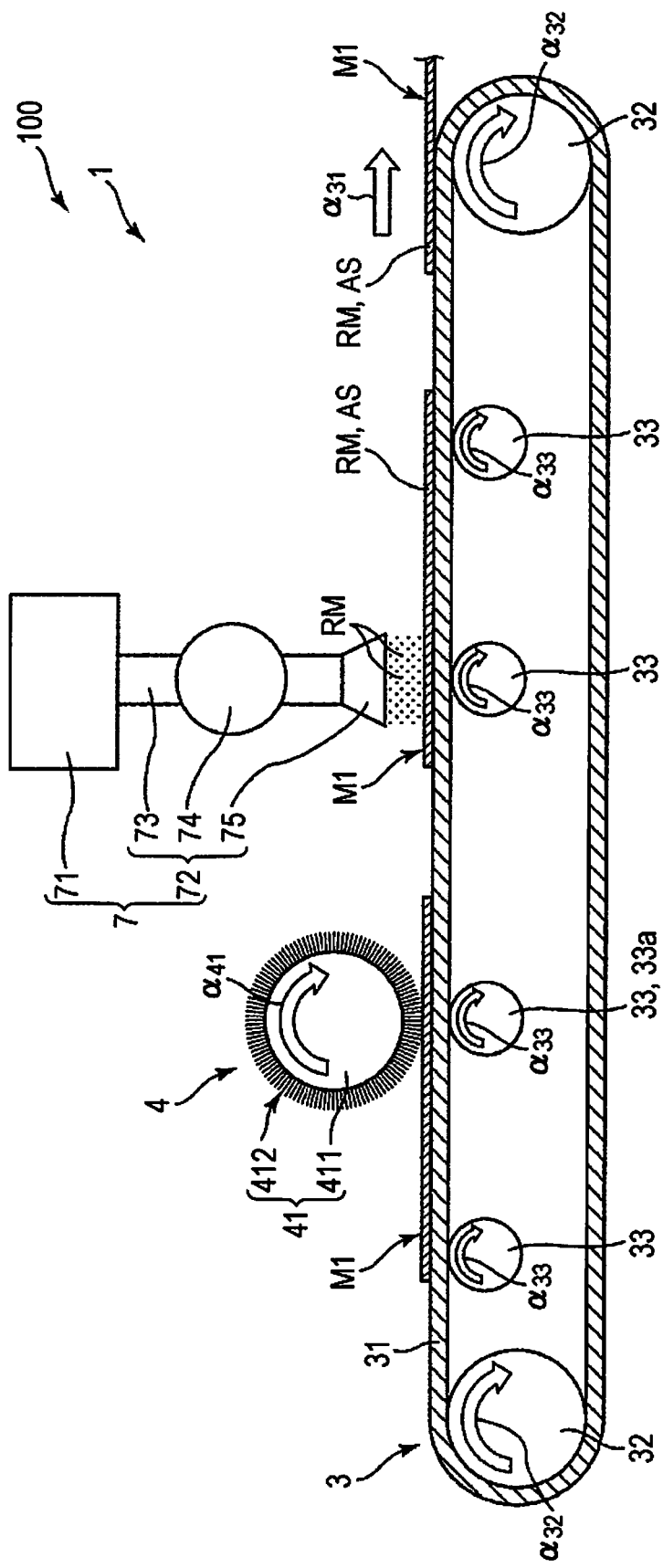
FIG. 10 is a schematic side view showing a configuration of an upstream side (processing device of the invention) of the sheet manufacturing apparatus (third embodiment) of the invention.
Figure 11:
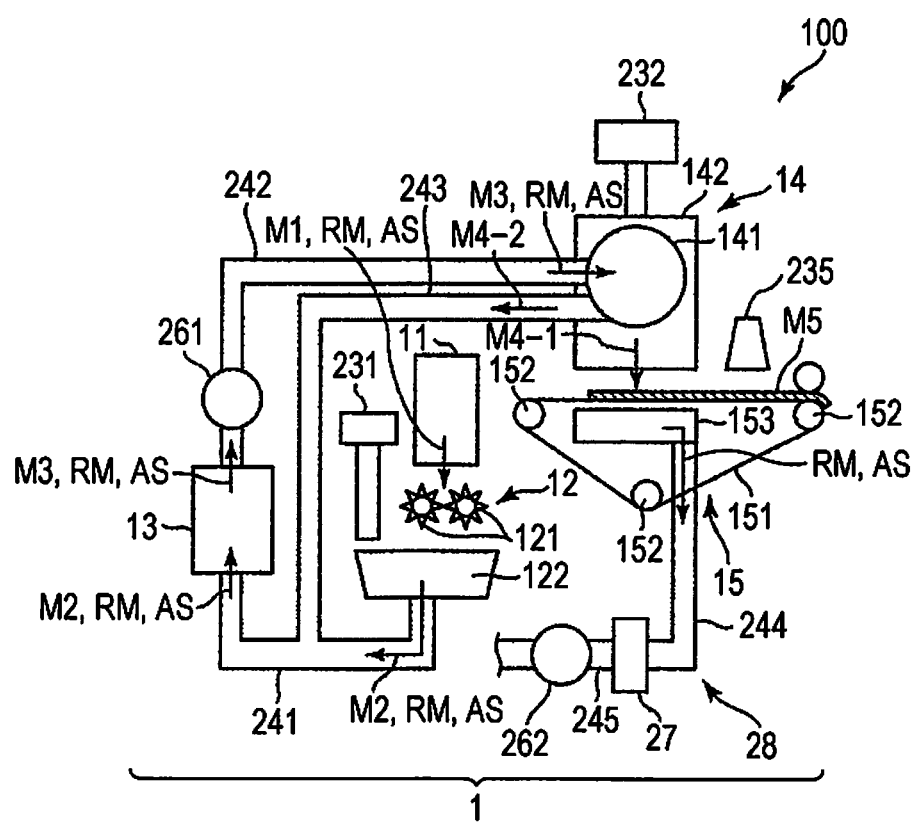
FIG. 11 is a schematic side view showing a configuration of a downstream side (processing device of the invention) of the sheet manufacturing apparatus (third embodiment) of the invention.
Figure 12:
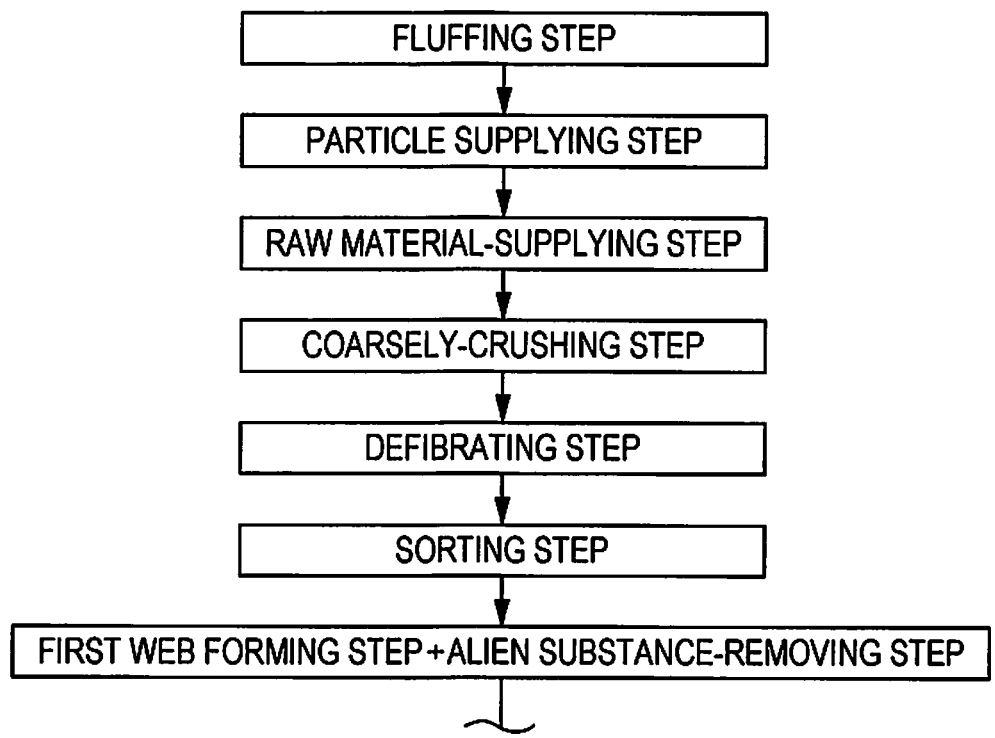
FIG. 12 is a diagram sequentially illustrating steps performed by the sheet manufacturing apparatus (third embodiment) of the invention.

FIG. 10 is a schematic side view showing a configuration of an upstream side (processing device of the invention) of the sheet manufacturing apparatus (third embodiment) of the invention. FIG. 11 is a schematic side view showing a configuration of a downstream side (processing device of the invention) of the sheet manufacturing apparatus (third embodiment) of the invention. FIG. 12 is a diagram sequentially illustrating steps performed by the sheet manufacturing apparatus (third embodiment) of the invention.

Hereinafter, the third embodiment of the processing device, the sheet manufacturing apparatus, the processing method, and the manufacturing method of a sheet of the invention will be described with reference to these drawings. However, descriptions will be made on the differences from the above-described embodiment and descriptions will be omitted for the similar matters.

The present embodiment is the same as the first embodiment except that a timing of performing the alien substance-removing step is different.

In the processing device 1 of the present embodiment, as shown in FIG. 10, the alien substance-removing section 5 is omitted from the glue belt 31, and, instead, as shown in FIG. 11, an alien substance-removing section 28 is provided. In addition, as shown in FIG. 12, in the present embodiment, a particle removing step is also performed while performing the first web forming step.

As described above, the sheet manufacturing apparatus 100 (processing device 1) includes the defibrating section 13 that defibrates the coarsely-crushed pieces M2 in an aerial manner, the coarsely-crushed pieces M2 having been obtained via sequential steps from the raw material M1 (sheet-like material) after the particles RM are supplied. In a configuration shown in FIG. 11, the alien substance-removing section 28 is configured to have a first web forming section 15, a collecting portion 27, a pipe 244, a pipe 245, and a blower 262. Accordingly, the alien substance-removing section 28 is disposed on a downstream side of the defibrating portion 13, and can remove the alien substances AS and the particles RM after the defibration. Thus, even after the defibration, the particles RM can come into contact with the alien substances AS, and therefore it is possible to further sufficiently remove the alien substances AS from the fibers FB.

As shown in FIG. 10, the particles RM and the alien substances AS still remain on the raw material M1 after passing through the particle supplying section 7. Meanwhile, as shown in FIG. 11, the raw material M1 is introduced into the raw material-supplying section 11 in a state where the particles RM and the alien substances AS remain, and then sequentially becomes the coarsely-crushed pieces M2 and the defibrated material M3.

Upward of the first web forming section 15, as described above, the defibrated material M3 is sorted into the first sorted material M4-1 and the second sorted material M4-2 by the sorting section 14. In such first sorted material M4-1, particles RM which have adsorbed the alien substances AS and particles RM which have peeled off the alien substances AS are mixed. The first sorted material M4-1 (fibers FB)

drops onto the mesh belt 151 of the first web forming section 15 together with these particles RM and alien substances AS.

The alien substance-removing section 28 separates and removes the alien substances AS together with the particles RM by utilizing a difference in size (particle diameter) between the first sorted material M4-1 (fibers FB) and the alien substances AS. That is, the alien substance-removing section 28 includes the mesh belt 151 (net-like body) of which a mesh opening has a size such that passage of the alien substances AS and the particles RM (including the particles RM alone and the particles RM which have adsorbed the alien substances AS) are allowed but passage of the first sorted material M4-1 is regulated. Thus, as shown in FIG. 11, the first sorted material M4-1 is stored on the mesh belt 151 and is formed as the first web M5. On the other hand, the alien substances AS and the particles RM pass through the mesh belt 151 by a suction force at the suction portion 153, then sequentially go through the suction portion 153 and the tube 244, and are collected in the collecting portion 27. Thus, the first web M5 is one from which the alien substances AS and the particles RM have been removed. Such first web M5 is transported to a subsequent step, and finally becomes the sheet S.

Fourth Embodiment

Figure 13:
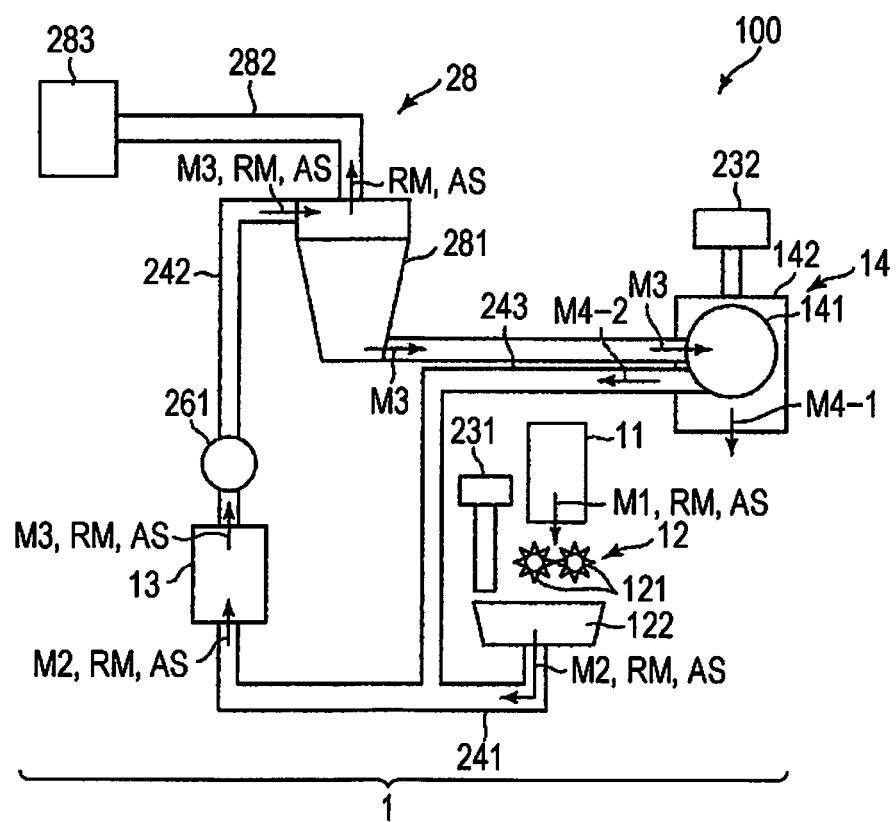
FIG. 13 is a schematic side view showing a configuration of a downstream side (processing device of the invention) of the sheet manufacturing apparatus (fourth embodiment) of the invention.
Figure 14:
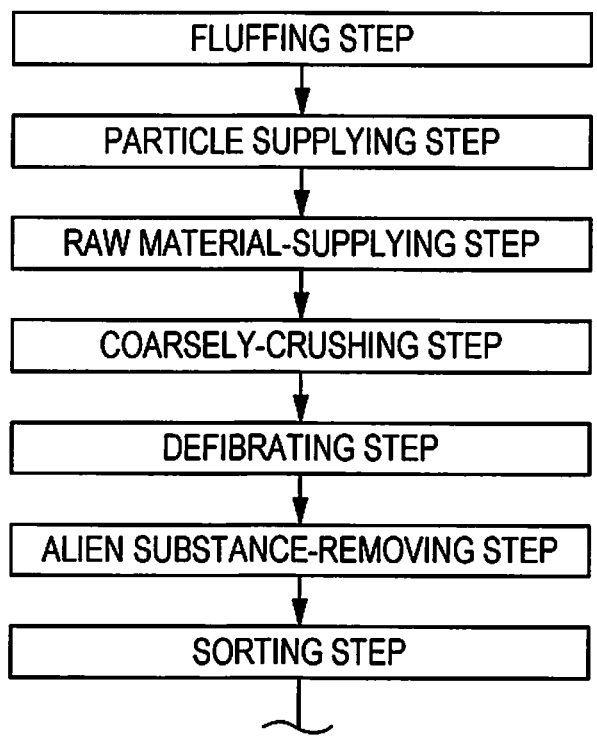
FIG. 14 is a diagram sequentially illustrating steps performed by the sheet manufacturing apparatus (fourth embodiment) of the invention.

FIG. 13 is a schematic side view showing a configuration of a downstream side (processing device of the invention) of the sheet manufacturing apparatus (fourth embodiment) of the invention. FIG. 14 is a diagram sequentially illustrating steps performed by the sheet manufacturing apparatus (fourth embodiment) of the invention.

Hereinafter, the fourth embodiment of the processing device, the sheet manufacturing apparatus, the processing method, and the manufacturing method of a sheet of the invention will be described with reference to these drawings. However, descriptions will be made on the differences from the above-described embodiment and descriptions will be omitted for the similar matters.

The present embodiment is the same as the third embodiment except that a configuration where the alien substances are removed and a timing of performing the alien substance-removing step are different.

As shown in FIG. 13, in the present embodiment, the alien substance-removing section 28 is disposed midway in the pipe 242 and on a downstream side of the blower 261. Thus, the particle removing step in the alien substance-removing section 28 is performed after the defibration step (see FIG. 14).

The alien substance-removing section 28 separates and removes the alien substances AS together with the particles RM by utilizing a difference in gravity between the defibrated material M3 (fibers FB) and the alien substances AS. That is, the alien substance-removing section 28 is configured to remove the alien substances AS and the particles RM (including the particles RM alone and the particles RM which have adsorbed the alien substances AS) by centrifugation, and includes a centrifuging portion 281, a pipe 282, and a collecting portion 283. The centrifuging portion 281 and the collecting portion 283 are connected via the pipe 282.

The centrifuging portion 281 is disposed midway in the pipe 242 and connected thereto. The defibrated material M3, the alien substances AS, and the particles RM, which have passed through the pipe 242, collectively flow into the centrifuging portion 281. Then, by centrifugation in the centrifuging portion 281, these are divided into the defibrated material M3 which further flows down the pipe 242 toward the sorting section 14, and the alien substances AS and the particles RM which are directed to the pipe 282. The alien substances AS and the particles RM which are directed to the pipe 282 pass through the pipe 282 and are collected in the collecting portion 283.

Even with such alien substance-removing section 28, it is possible to reliably remove the alien substances AS together with the particles RM from the defibrated material M3.

Fifth Embodiment

Figure 15:
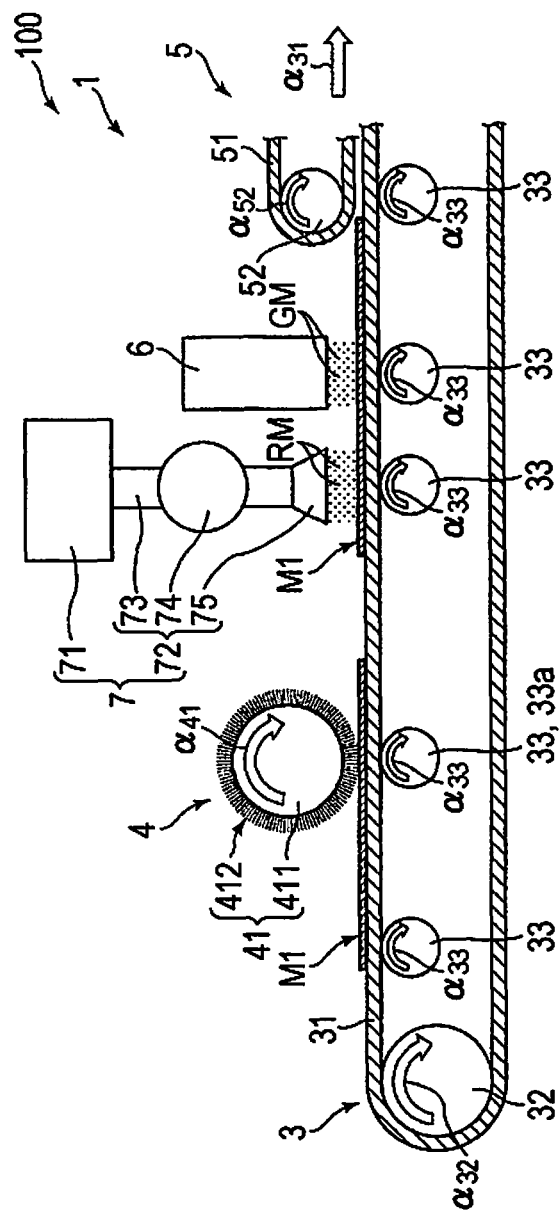
FIG. 15 is a schematic side view showing a configuration of an upstream side (processing device of the invention) of the sheet manufacturing apparatus (fifth embodiment) of the invention.
Figure 16:
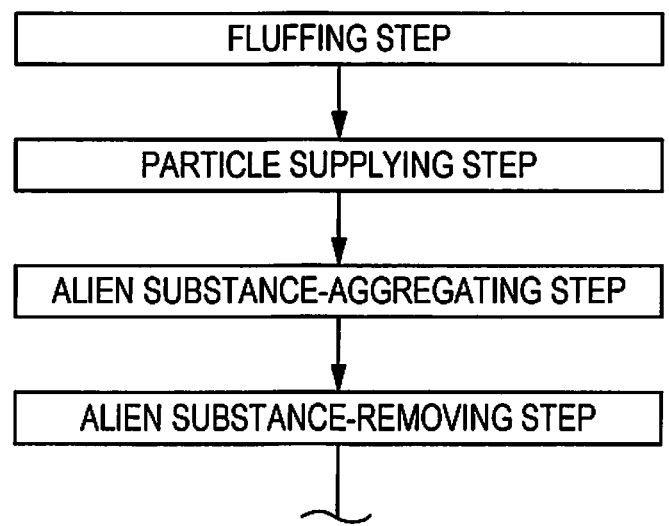
FIG. 16 is a diagram sequentially illustrating steps performed by the sheet manufacturing apparatus (fifth embodiment) of the invention.

FIG. 15 is a schematic side view showing a configuration of an upstream side (processing device of the invention) of the sheet manufacturing apparatus (fifth embodiment) of the invention. FIG. 16 is a diagram sequentially illustrating steps performed by the sheet manufacturing apparatus (fifth embodiment) of the invention.

Hereinafter, the fifth embodiment of the processing device, the sheet manufacturing apparatus, the processing method, and the manufacturing method of a sheet of the invention will be described with reference to these drawings. However, descriptions will be made on the differences from the above-described embodiment and descriptions will be omitted for the similar matters.

The present embodiment is the same as the first embodiment except that the alien substance-aggregating section is provided.

As shown in FIG. 15, in the present embodiment, the processing device 1 includes the alien substance-aggregating section (aggregating section) 6 that is disposed between the particle supplying section 7 and the alien substance-removing section 5, and aggregates the alien substances AS. An alien substance-aggregating step performed by such alien substance-aggregating section 6 is performed between the particle supplying step and the alien substance-removing step (see FIG. 16).

The alien substance-aggregating section 6 is disposed at an upper side of the glue belt 31, and is capable of supplying an aggregating material GM from upward to the raw material M1 by, for example, spraying. Thus, the alien substances AS can be aggregated on the raw material M1. The aggregated alien substances AS have a size that can be easily removed in the alien substance-removing step. Accordingly, the aggregated alien substances AS are easily removed from the raw material M1 by operation of the alien substance-removing section 5.

The aggregating material GM is not particularly limited and examples thereof include ionic substances, and those containing a polyvalent metal ion such as calcium chloride or magnesium, and cationic polymers are preferably included. In addition, it is preferable that these be, for example, in a liquid state.

Further, in the alien substance-removing section 5, an excess of the aggregating material GM is also removed together with the alien substances AS.

Sixth Embodiment

Figure 17:
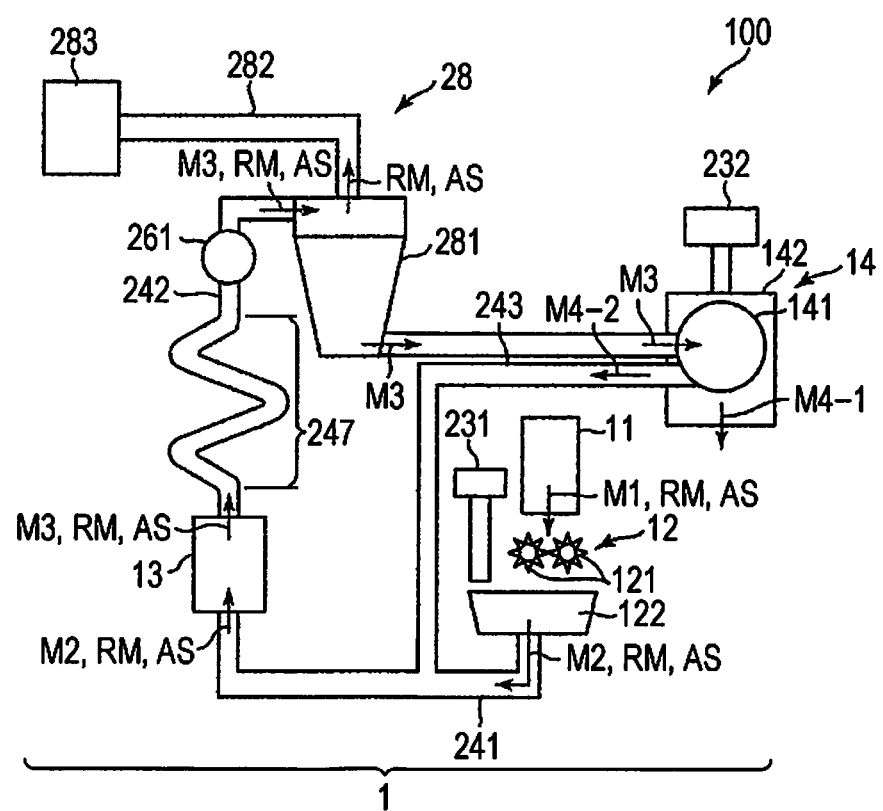
FIG. 17 is a schematic side view showing an upstream side of a sixth embodiment of the sheet manufacturing apparatus (including the processing device of the invention) of the invention.

FIG. 17 is a schematic side view showing an upstream side of a sixth embodiment of the sheet manufacturing apparatus (including the processing device of the invention) of the invention.

Hereinafter, the sixth embodiment of the processing device, the sheet manufacturing apparatus, the processing method, and the manufacturing method of a sheet of the invention will be described with reference to these drawings.

However, descriptions will be made on the differences from the above-described embodiment and descriptions will be omitted for the similar matters.

The present embodiment is the same as the fourth embodiment except that the shape of a tube connected to a downstream side of the defibrating portion is different.

As shown in FIG. 17, in the present embodiment, a meandering portion 247, in which meandering is made, is formed in the pipe 242 at a site of an upstream side of the blower 261. Thus, in a case of passing through the meandering portion 247, the particles RM have an increased opportunity of colliding with the alien substances AS, and therefore adsorption of the alien substances AS is promoted.

Furthermore, due to an action of the blower 261, the particles RM have an increased speed of passing through the tube 242. Thus, there is an increased opportunity of collision between the particles RM and the defibrated material M3, and as a result, the particles RM also come into contact with the alien substances AS adhered to the defibrated material M3, thereby promoting adsorption of the alien substances AS.

The particles RM which have adsorbed the alien substances AS are removed in the alien substance-removing section 28.

Seventh Embodiment

The processing device 1 of the invention includes the fluffing section 4 for fluffing the fibers FB contained in the raw material M1 (sheet-like material), the fibers FB being at least near the surface of the raw material M1, and the alien substance-removing section (removing section) 5 that removes the alien substances AS contained in the raw material M1 (sheet-like material) by bringing the fluffed fibers FB into contact with the fabric material 51 formed of a nonwoven fabric or a woven fabric and causing the alien substances AS to migrate to the fabric material 51.

Further, the processing method of the invention includes the fluffing step of fluffing the fibers FB contained in the raw material M1 (sheet-like material), the fibers FB being at least near the surface of the raw material M1, and the alien substance-removing step of removing the alien substances AS contained in the raw material M1 (sheet-like material) by bringing the fluffed fibers FB into contact with the fabric material 51 formed of a nonwoven fabric or a woven fabric and causing the alien substances AS to migrate to the fabric material 51. Such method is executed by the processing device 1.

According to the invention as described above, as described later, prior to removing the alien substances AS contained in the raw material M1, the fibers FB that are at least near the surface of the raw material M1 are fluffed. Thus, the alien substances AS existing between the fibers FB are lifted up, and subsequent removal of the alien substances AS becomes easy. Then, by removing the alien substances AS in a state where the fibers FB are fluffed, the alien substances AS are sufficiently removed from the raw material M1.

That is, the process of the invention is said to be a de-inking process of a waste paper. A de-inking process in the related art is, in general, a process which includes dispersing a waste paper in water, releasing a coloring agent in a mechanical and chemical manner (with surfactants, alkaline chemicals, and the like), and removing a coloring material by a floating method, a screen washing method, or the like. However, in the invention, it is possible to perform de-inking without having to soak a waste paper in water. This is said to be a dry de-inking technique.

The sheet manufacturing apparatus 100 of the invention includes the processing device 1.

In addition, the manufacturing method of a sheet includes the fluffing step of fluffing the fibers FB contained in the raw material M1 (sheet-like material), the fibers FB being at least near the surface of the raw material M1, and the alien substance-removing step of removing the alien substances AS contained in the raw material M1 (sheet-like material) by bringing the fluffed fibers FB into contact with the fabric material 51 formed of a nonwoven fabric or a woven fabric and causing the alien substances AS to migrate to the fabric material 51, in which a sheet S is manufactured from the raw material M1 from which the alien substances AS have been removed. Such method is executed by the sheet manufacturing apparatus 100.

According to the invention as described above, it is possible to further manufacture (regenerate) the sheet S from the raw material M1 from which the alien substances AS have been removed, while enjoying advantages of the above-described processing device 1 (processing method).

Figure 18:
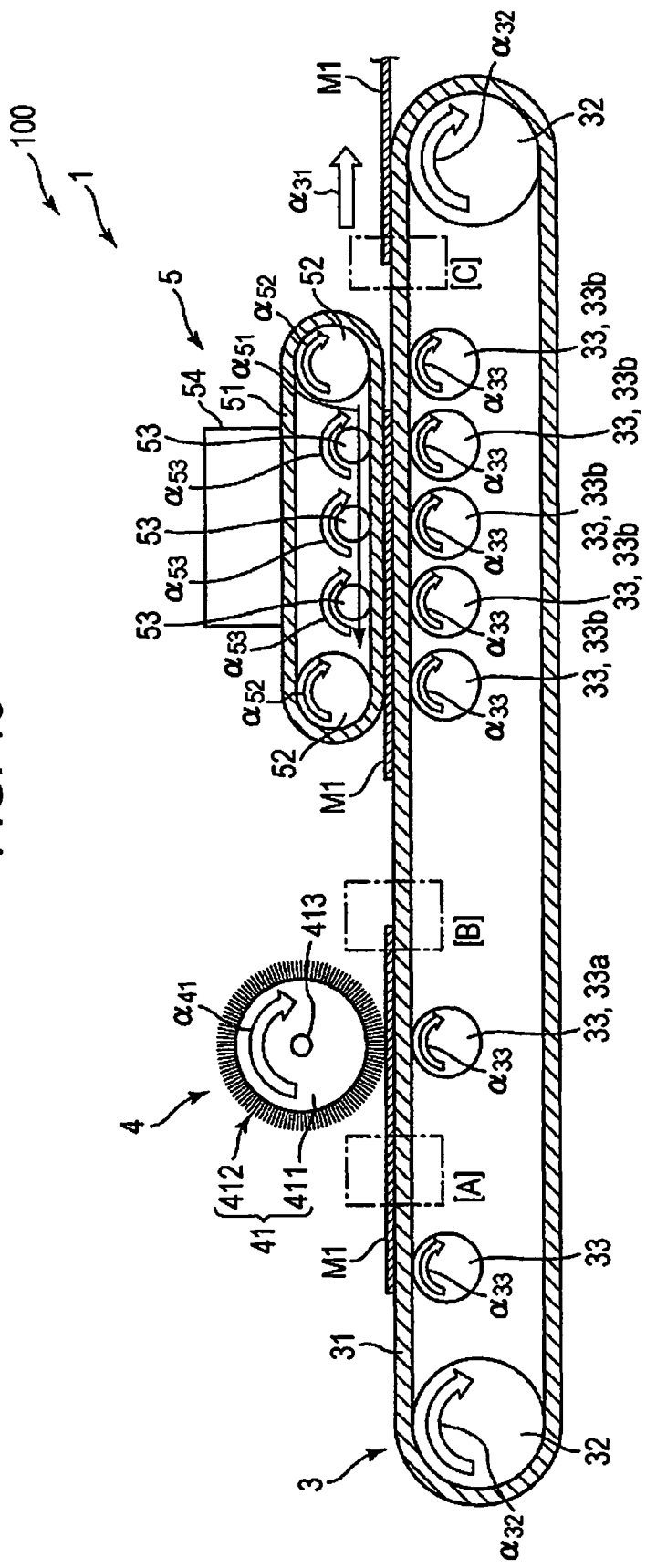
FIG. 18 is a schematic side view showing a configuration of an upstream side (processing device of the invention) of the sheet manufacturing apparatus (seventh embodiment) of the invention.
Figure 19:
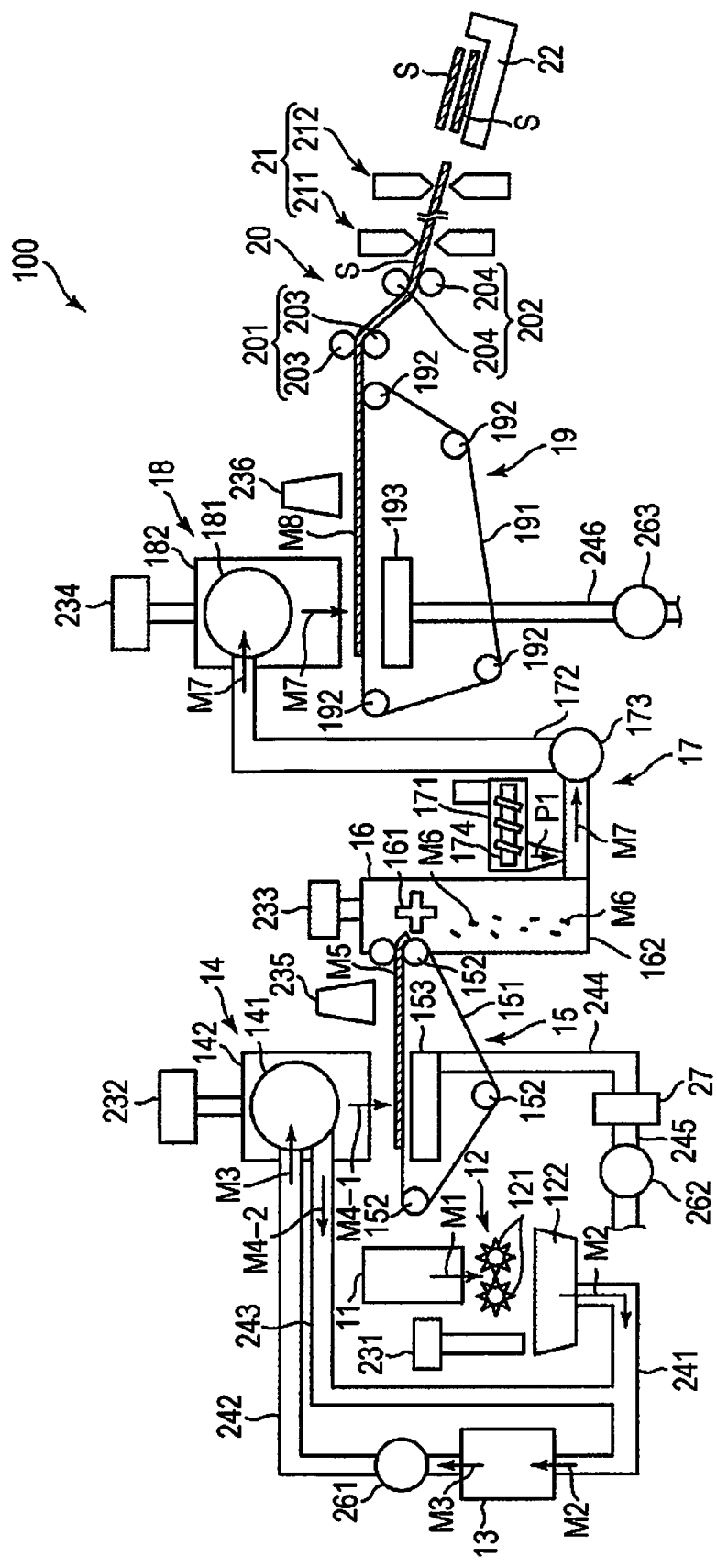
FIG. 19 is a schematic side view showing a configuration on a downstream side of the sheet manufacturing apparatus (seventh embodiment) of the invention.
Figure 20:
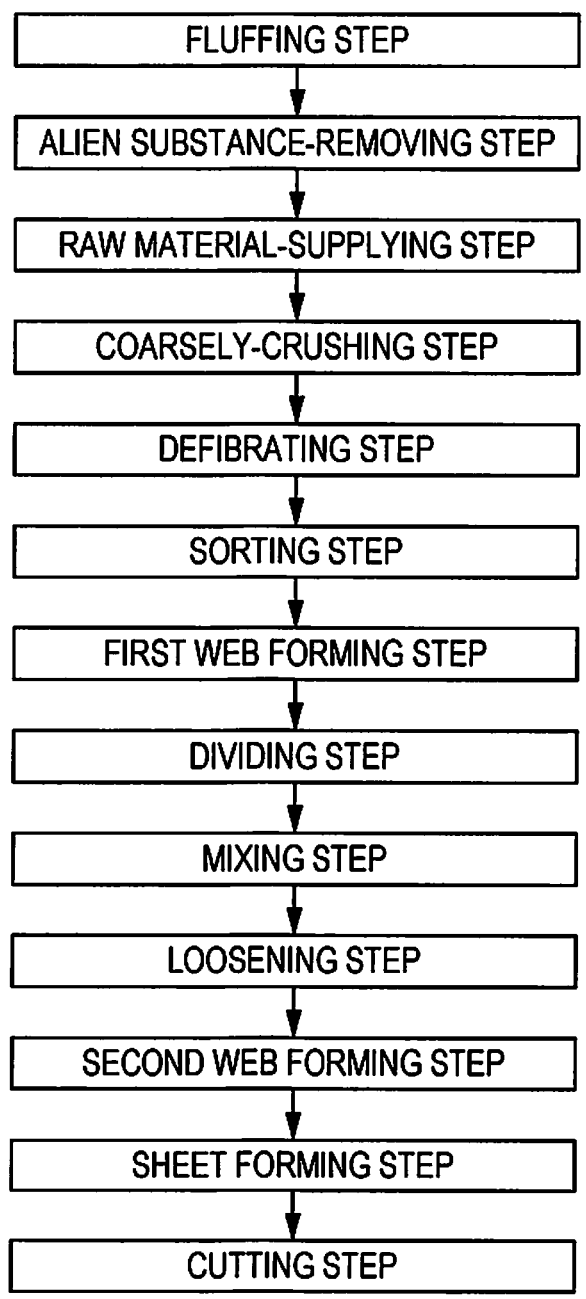
FIG. 20 is a diagram sequentially illustrating steps performed by the sheet manufacturing apparatus (seventh embodiment) of the invention.
Figure 21:
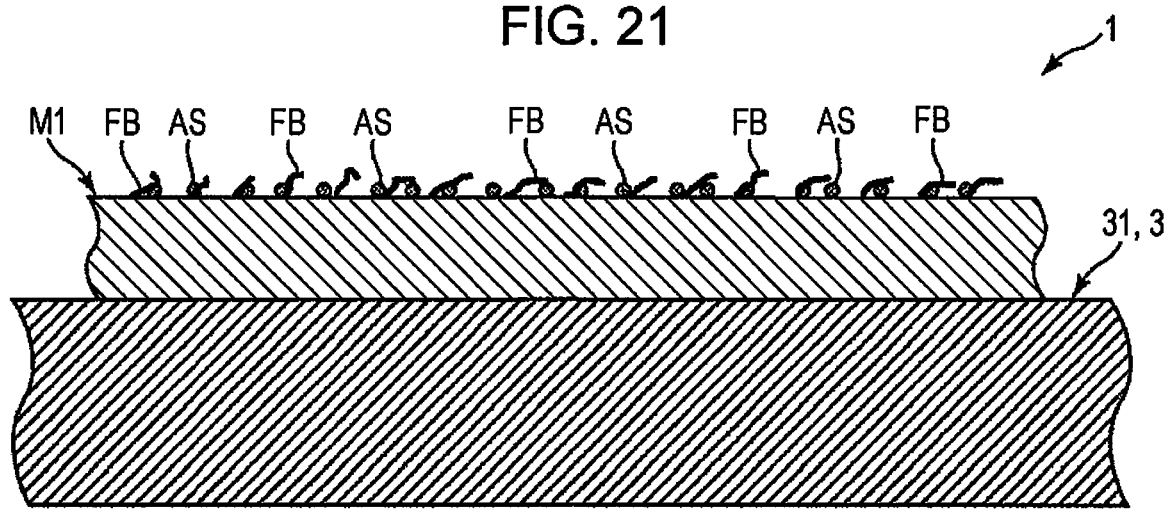
FIG. 21 is an image diagram sequentially showing a state of the sheet-like material processed by the processing device shown in FIG. 18 (enlarged view of a region [A] surrounded by a dot-and-dash line in FIG. 18).
Figure 22:
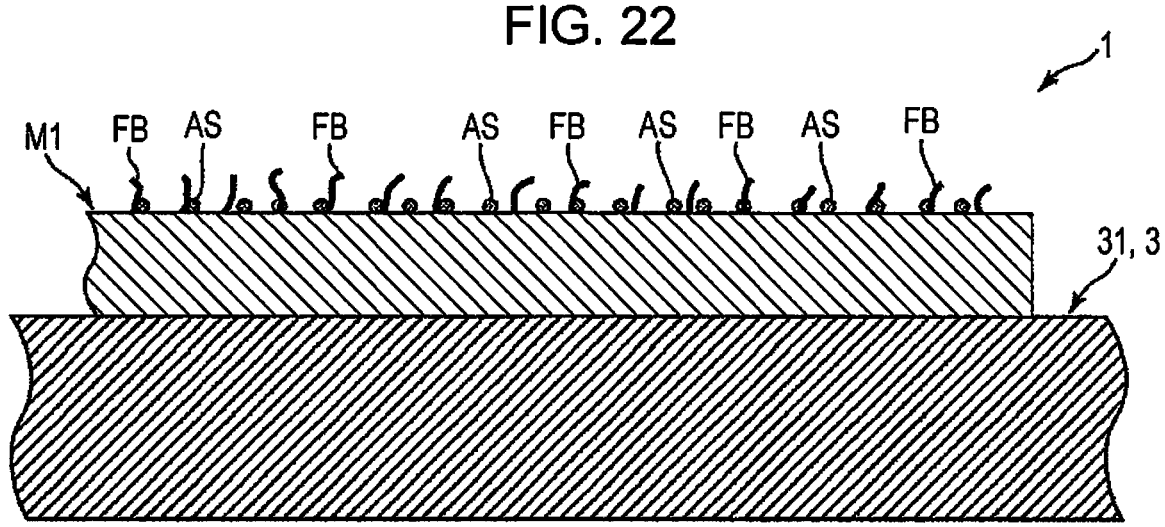
FIG. 22 is an image diagram sequentially showing a state of the sheet-like material processed by the processing device shown in FIG. 18 (enlarged view of a region [B] surrounded by a dot-and-dash line in FIG. 18).
Figure 23:
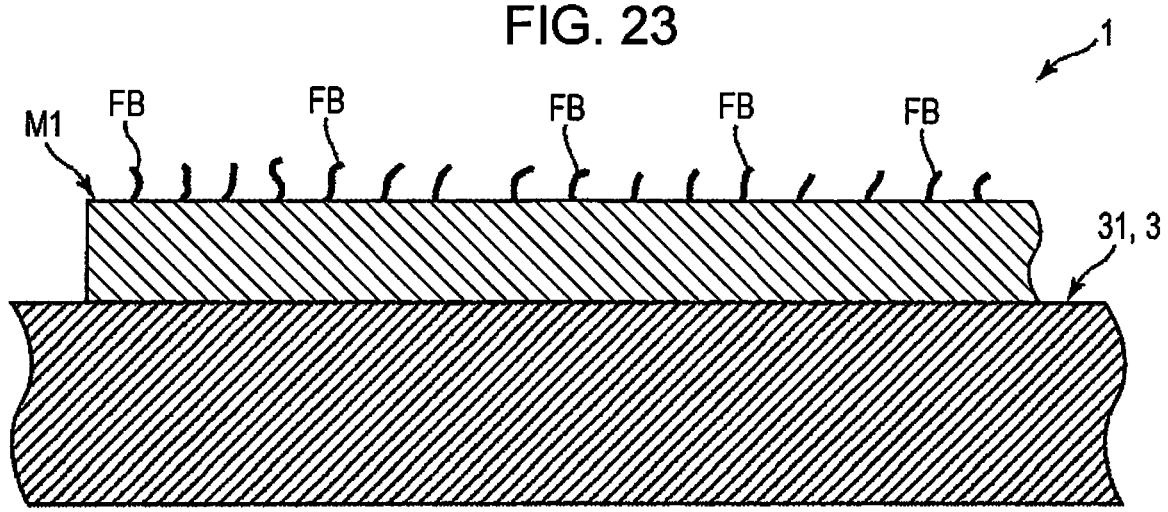
FIG. 23 is an image diagram sequentially showing a state of the sheet-like material processed by the processing device shown in FIG. 18 (enlarged view of a region [C] surrounded by a dot-and-dash line in FIG. 18).

FIG. 18 is a schematic side view showing a configuration of an upstream side (processing device of the invention) of the sheet manufacturing apparatus (seventh embodiment) of the invention. FIG. 19 is a schematic side view showing a configuration on a downstream side of the sheet manufacturing apparatus (seventh embodiment) of the invention. FIG. 20 is a diagram sequentially illustrating steps performed by the sheet manufacturing apparatus (seventh embodiment) of the invention. FIGS. 21 to 23 are image diagrams, each sequentially showing a state of the sheet-like material processed by the processing device shown in FIG. 18 (FIG. 21 is an enlarged view of a region [A] surrounded by a dot-and-dash line in FIG. 18; FIG. 22 is an enlarged view of a region [B] surrounded by a dot-and-dash line in FIG. 18; and FIG. 23 is an enlarged view of a region [C] surrounded by a dot-and-dash line in FIG. 18). Hereinafter, for convenience of description, in FIGS. 18, 19, and 21 to 23 (the same applies to FIGS. 24 and 26), an upper side may be referred to as "upper" or "upward"; a lower side may be referred to as "lower" or "downward"; a left side may be referred to as "left" or "upstream side"; and a right side may be referred to as "right" or "downstream side."

As shown in FIG. 18, the sheet manufacturing apparatus 100 includes the processing device 1 on an upstream side thereof. Such processing device 1 includes the transporting section 3, the fluffing section 4, and the alien substance-removing section 5.

Further, as shown in FIG. 19, the sheet manufacturing apparatus 100 includes, on a downstream side thereof, the raw material-supplying section 11, the coarsely-crushing section 12, the defibrating section 13, the sorting section 14, the first web forming section 15, the subdividing section 16, the mixing section 17, the loosening section 18, the second web forming section 19, the sheet forming section 20, the cutting section 21, and the stocking section 22. In addition, the sheet manufacturing apparatus 100 includes the humidifying section 231, the humidifying section 232, the humidifying section 233, and the humidifying section 234.

Operation of each section of the sheet manufacturing apparatus 100 is controlled by a controlling section (not shown).

As shown in FIG. 20, in the present embodiment, the manufacturing method of a sheet includes the fluffing step, the alien substance-removing step, the raw material-supplying step, the coarsely-crushing step, the defibrating step, the sorting step, the first web forming step, the dividing step, the mixing step, the loosening step, the second web forming step, the sheet forming step, and the cutting step. The sheet manufacturing apparatus 100 can sequentially perform these steps. In addition, among these steps, steps (pre-steps) performed by the processing device 1 are the fluffing step and the alien substance-removing step.

Hereinafter, a configuration of each section included in the sheet manufacturing apparatus 100 will be described.

First, a configuration of the downstream side of the sheet manufacturing apparatus 100 will be described, and then a configuration of the upstream side of the sheet manufacturing apparatus 100, that is, the processing device 1 will be described.

The raw material-supplying section 11 is a section that performs the raw material-supplying step (see FIG. 20) of supplying the raw material M1 to the coarsely-crushing section 12. Such raw material M1 is a sheet-like material containing fibers FB (cellulose fibers) (see FIGS. 21 to 23). Such raw material M1, that is, the sheet-like material is one to be subjected to an alien substance-removing process that removes the alien substances AS by the processing device 1. The cellulose fiber may be a fibrous type having, as its main component, cellulose (cellulose in a narrow sense) which is a compound and may contain hemicellulose and lignin, in addition to cellulose (cellulose in a narrow sense).

The coarsely-crushing section 12 is a section that performs the coarsely-crushing step (see FIG. 20) of coarsely crushing the raw material M1, which is supplied from the raw material-supplying section 11, in an aerial manner (in the air). The coarsely-crushing section 12 has the pair of coarsely-crushing blades 121 and the chute (hopper) 122.

The pair of coarsely-crushing blades 121 can be rotated in a direction opposite to each other so that the raw material M1 is coarsely crushed therebetween, that is, cut into coarsely-crushed pieces M2. The coarsely-crushed pieces M2 preferably have a shape and size suitable for a defibrating process in the defibrating section 13, for example, they are preferably a small piece with a side length of 100 mm or less, and more preferably a small piece with a side length of 10 mm to 70 mm.

The chute 122 is disposed downward of the pair of coarsely-crushing blades 121, and has, for example, a funnel shape. Thus, the chute 122 can receive the coarsely-crushed pieces M2 that have been crushed by the coarsely-crushing blades 121 and dropped.

Further, upward of the chute 122, the humidifying section 231 is disposed adjacent to the pair of coarsely-crushing blades 121. The humidifying section 231 humidifies the coarsely-crushed pieces M2 in the chute 122. Such humidifying section 231 is configured as an evaporation type (or warm-air evaporation type) humidifier which has a filter (not shown) containing moisture, and supplies, to the coarsely-crushed pieces M2, humidified air having increased humidity due to passage of air through the filter. By supplying the humidified air to the coarsely-crushed pieces M2, it is possible to prevent the coarsely-crushed pieces M2 from adhering to the chute 122 or the like due to static electricity.

The chute 122 is connected to the defibrating section 13 via a pipe (flow path) 241. The coarsely-crushed pieces M2 collected in the chute 122 pass through the pipe 241 and are transported to the defibrating section 13.

The defibrating section 13 is a section that performs the defibration step (see FIG. 20) of defibrating the coarsely-crushed pieces M2 in an aerial manner (in the air). By the defibrating process in such defibrating section 13, it is possible to generate a defibrated material M3 from the coarsely-crushed pieces M2. Here, "defibrating" means to unravel the coarsely-crushed pieces M2, which are formed by bonding of a plurality of the fibers FB to one another, into each individual fiber. Such unraveled fibers become the defibrated material M3. A shape of the defibrated material M3 is linear or belt-like. In addition, the defibrated materials M3 may exist in a state where they are entangled with one another into a lump, that is, in a state where so-called a "dummy" is formed.

In the present embodiment, for example, the defibrating section 13 is configured as an impeller mill having a rotor that is rotated at high speed and a liner that is positioned on an outer periphery of the rotor. The coarsely-crushed pieces M2 flowing into the defibrating section 13 are interposed between the rotor and the liner, and defibrated.

Further, the defibrating section 13 can generate a flow of air (airflow) from the coarsely-crushing section 12 to the sorting section 14 due to rotation of the rotor. Thus, the coarsely-crushed pieces M2 can be sucked from the pipe 241 to the defibrating section 13. In addition, after the defibrating process, the defibrated material M3 can be delivered to the sorting section 14 via the pipe 242.

The blower 261 is installed midway in the pipe 242. The blower 261 is an airflow generating device that generates an airflow toward the sorting section 14. This promotes delivery of the defibrated material M3 to the sorting section 14.

The sorting section 14 is a section that performs the sorting step (see FIG. 20) of sorting the defibrated material M3 according to a length of the fiber FB. In the sorting section 14, the defibrated material M3 is sorted into a first sorted material M4-1 and a second sorted material M4-2 that is larger than the first sorted material M4-1. The first sorted material M4-1 has a size suitable for the subsequent manufacture of the sheet S. An average length thereof is preferably 1 μm to 100 μm. In addition, an average aspect ratio thereof is preferably less than 3, and more preferably 2 or less. On the other hand, the second sorted material M 4-2 includes, for example, one in which defibration is insufficiently performed, one in which defibrated fibers FB are excessively aggregated, and the like.

The sorting section 14 has the drum portion 141 and the housing portion 142 that houses the drum portion 141.

The drum portion 141 is configured as a cylindrical mesh member and is a sieve that rotates about its central axis. The defibrated material M3 flows into such drum portion 141. As the drum portion 141 rotates, the defibrated material M3 having a size smaller than a mesh opening is selected as the first sorted material M4-1, and the defibrated material M3 having a size larger than the mesh opening is selected as the second sorted material M4-2.

The first sorted material M4-1 drops from the drum portion 141.

On the other hand, the second sorted material M4-2 is delivered to the pipe (flow path) 243 connected to the drum portion 141. The pipe 243 is connected to the pipe 241 on the opposite side (downstream side) to the drum portion 141. The second sorted material M4-2 having passed through such pipe 243 joins the coarsely-crushed pieces M2 in the pipe 241 and flows into the defibrating section 13 together with the coarsely-crushed pieces M2. Thus, the second sorted material M4-2 is returned to the defibrating section 13 and is subjected to the defibrating process together with the coarsely-crushed pieces M2.

Further, from the drum portion, the first sorted material M4-1 141 falls while dispersing in the air and heads toward the first web forming section (separating section) 15 positioned downward of the drum portion 141. The first web forming section 15 is a section that performs the first web forming step (see FIG. 20) of forming the first web M5 from the first sorted material M4-1. The first web forming section 15 has the mesh belt (separating belt) 151, three stretching rollers 152, and a suction portion (suction mechanism) 153.

The mesh belt 151 is an endless belt, and the first sorted material M4-1 is accumulated thereon. Such mesh belt 151 is looped around the three stretching rollers 152. Due to rotational drive of the stretching rollers 152, the first sorted material M4-1 on the mesh belt 151 is transported to a downstream side.

The first sorted material M4-1 has a size larger than the mesh opening of the mesh belt 151. Thus, passage of the first sorted material M4-1 through the mesh belt 151 is regulated, and therefore the first sorted material M4-1 can be accumulated on the mesh belt 151. In addition, since the first sorted material M4-1 is transported to the downstream side together with the mesh belt 151 while being accumulated on the mesh belt 151, it is formed as a first layered web M5.

Further, for example, dust, dirt, or the like may be mixed in the first sorted material M4-1. The dust or dirt may be incorporated together the raw material M1, for example, in a case where the raw material M1 is supplied from the raw material-supplying section 11 to the coarsely-crushing section 12. Such dust or dirt is smaller than the mesh opening of the mesh belt 151. Thus, the dust or dirt passes through the mesh belt 151 and further drops downward.

The suction portion 153 can suck air from downward of the mesh belt 151. Thus, the dust or dust having passed through the mesh belt 151 can be sucked together with air.

Further, the suction portion 153 is connected to the collecting portion 27 via the pipe (flow path) 244. The dust or dirt sucked by the suction portion 153 is collected in the collecting portion 27.

The pipe (flow path) 245 is further connected to the collecting portion 27. In addition, the blower 262 is installed midway in the pipe 245. Due to operation of such blower 262, a suction force can be generated in the suction portion 153. Thus, formation of the first web M5 on the mesh belt 151 is promoted. Such first web M5 is one in which the dust or dirt has been removed. In addition, the dust or dirt passes through the pipe 244 due to operation of the blower 262 to reach the collecting portion 27.

The housing portion 142 is connected to the humidifying section 232. The humidifying section 232 is configured as an evaporation type humidifier similar to the humidifying section 231. Thus, humidified air is supplied into the housing portion 142. Such humidified air can also humidify the first sorted material M4-1, and therefore it is possible to prevent the first sorted material M4-1 from adhering to an inner wall of the housing portion 142 due to an electrostatic force.

On a downstream side of the sorting section 14, the humidifying section 235 is disposed. The humidifying section 235 is configured as an ultrasonic type humidifier which sprays water. Thus, moisture can be supplied to the first web M5, and therefore a moisture content of the first web M5 is adjusted. Such adjustment can prevent the first web M5 from being adsorbed to the mesh belt 151 due to an electrostatic force. Accordingly, the first web M5 is easily peeled off from the mesh belt 151 at a position where the mesh belt 151 is folded back by the stretching roller 152.

On a downstream side of the humidifying section 235, the subdividing section 16 is disposed. The subdividing section 16 is a section that performs the dividing step (see FIG. 20) of dividing the first web M5 which has been peeled off from the mesh belt 151. The subdividing section 16 has a rotatably-supported propeller 161 and a housing portion 162 for housing the propeller 161. The first web M5 is caught by the rotating propeller 161, so that the first web M5 can be divided. The divided first web M5 becomes a subdivided body M6. In addition, the subdivided body M6 descends within the housing portion 162.

The housing portion 162 is connected to the humidifying portion 233. The humidifying section 233 is configured as an evaporation type humidifier similar to the humidifying section 231. Thus, humidified air is supplied into the housing portion 162. Such humidified air can also prevent the subdivided body M6 from adhering to inner walls of the propeller 161 and the housing portion 162 due to an electrostatic force.

On a downstream side of the subdividing section 16, the mixing section 17 is disposed. The mixing section 17 is a section that performs the mixing step (see FIG. 20) of mixing the subdivided body M6 and a resin P1. Such mixing section 17 includes the resin supplying portion 171, the pipe (flow path) 172, and the blower 173.

The pipe 172 connects the housing portion 162 of the subdividing section 16 with the housing portion 182 of the loosening section 18, and is a flow path through which the mixture M7 of the subdivided body M6 and the resin P1 passes.

The resin supplying portion 171 is connected midway to the pipe 172. The resin supplying portion 171 has the screw feeder 174. Due to rotational drive of such screw feeder 174, it is possible to supply the resin P1 as powders or particles to the pipe 172. The resin P1 supplied to the pipe 172 is mixed with the subdivided body M6 to form the mixture M7.

The resin P1 causes the fibers FB to be bonded to one another in a subsequent step. As the resin P1, for example, a thermoplastic resin, a curable resin, or the like can be used, and the thermoplastic resin is preferably used. Examples of the thermoplastic resin include polyolefins such as AS resin, ABS resin, polyethylene, polypropylene, and ethylene-vinyl acetate copolymer (EVA); modified polyolefins; acrylic resins such as polymethyl methacrylate; polyesters such as polyvinyl chloride, polystyrene, polyethylene terephthalate, and polybutylene terephthalate; polyamides (nylons) such as nylon 6, nylon 46, nylon 66, nylon 610, nylon 612, nylon 11, nylon 12, nylon 6-12, and nylon 6-66; polyphenylene ether; polyacetal; polyether; polyphenylene oxide; polyether ether ketone; polycarbonate; polyphenylene sulfide; thermoplastic polyimide; polyether imide; liquid crystal polymers such as aromatic polyester; and various thermoplastic elastomers based on styrene, polyolefin, polyvinyl chloride, polyurethane, polyester, polyamide, polybutadiene, trans-polyisoprene, fluoro rubber, chlorinated polyethylene, or the like, and one type or two or more types selected therefrom can be used in combination. Preferably, as the thermoplastic resin, a polyester or one containing the same is used.

In addition to the resin P1, those supplied from the resin supplying portion 171 may contain, for example, a coloring agent for coloring the fibers FB, an aggregation inhibitor for suppressing aggregation of the fibers FB and aggregation of the resin P1, a flame retardant for making the fibers FB or the like less susceptible to burning, and the like.

Further, the blower 173 is installed on a downstream side of the resin supplying portion 171 midway in the pipe 172. The blower 173 can generate an airflow towards the loosening section 18. Such airflow can agitate the subdivided body M6 and the resin P1 in the pipe 172. Thus, the mixture M7 can flow into the loosening section 18 in a state where the subdivided body M6 and the resin P1 are uniformly dispersed. In addition, the subdivided body M6 in the mixture M7 is loosened in the process of passing through an inside of the pipe 172, and becomes a finer fibrous type.

The loosening section 18 is a section that performs the loosening step (see FIG. 20) of loosening the mutually entangled fibers FB in the mixture M7. The loosening section 18 has the drum portion 181 and the housing portion 182 for housing the drum portion 181.

The drum portion 181 is configured as a cylindrical mesh member and is a sieve that rotates about its central axis. The mixture M7 flows into such drum portion 181. As the drum portion 181 rotates, the fibers FB or the like having a size smaller than the mesh opening in the mixture M7 can pass through the drum portion 181. At that time, the mixture M7 is loosened.

Further, the mixture M7 loosened in the drum portion 181 drops while dispersing in the air and heads toward the second web forming section 19 positioned downward of the drum portion 181. The second web forming section 19 is a section that performs the second web forming step (see FIG. 20) of forming the second web M8 from the mixture M7. The second web forming section 19 has the mesh belt (separating belt) 191, the stretching rollers 192, and the suction portion (suction mechanism) 193.

The mesh belt 191 is an endless belt, and the mixture M7 is accumulated thereon. Such mesh belt 191 is looped around the four stretching rollers 192. Due to rotational drive of the stretching rollers 192, the mixture M7 on the mesh belt 191 is transported to a downstream side.

Further, most of the mixture M7 on the mesh belt 191 has a size larger than the mesh opening of the mesh belt 191. Thus, passage of the mixture M7 through the mesh belt 191 is regulated, and therefore the mixture M7 can be accumulated on the mesh belt 191. In addition, since the mixture M7 is transported to the downstream side together with the mesh belt 191 while being accumulated on the mesh belt 191, it is formed as a second layered web M8.

The suction portion 193 can suck air from downward of the mesh belt 191. Thus, the mixture M7 can be sucked onto the mesh belt 191, and therefore accumulation of the mixture M7 on the mesh belt 191 is promoted.

The pipe (flow path) 246 is connected to the suction portion 193. In addition, the blower 263 is installed midway in such pipe 246. Due to operation of such blower 263, a suction force can be generated in the suction portion 193.

The housing portion 182 is connected to the humidifying section 234. The humidifying section 234 is configured as an evaporation type humidifier similar to the humidifying section 231. Thus, humidified air is supplied into the housing portion 182. Such humidified air can humidify an inside of the housing portion 182, and therefore can prevent the mixture M7 from adhering to an inner wall of the housing portion 182 due to an electrostatic force.

On a downstream side of the loosening portion 18, the humidifying section 236 is disposed. The humidifying section 236 is configured as an ultrasonic type humidifier similar to the humidifying section 235. Thus, moisture can be supplied to the second web M8, and therefore a moisture content of the second web M8 is adjusted. Such adjustment can prevent the second web M8 from being adsorbed to the mesh belt 191 due to an electrostatic force. Accordingly, the second web M8 is easily peeled off from the mesh belt 191 at a position where the mesh belt 191 is folded back by the stretching roller 192.

On a downstream side of the second web forming section 19, the sheet forming section 20 is disposed. The sheet forming section 20 is a section that performs the sheet forming step (see FIG. 20) of forming a sheet S from the second web M8. Such sheet forming section 20 includes the pressurizing portion 201 and the heating portion 202.

The pressurizing portion 201 has a pair of calender rollers 203, and the second web M8 can be pressurized therebetween without being heated. Thus, a density of the second web M8 is increased. Such second web M8 is transported toward the heating portion 202. One of the pair of calendar rollers 203 is a main driving roller driven by operation of a motor (not shown), and the other is a driven roller.

The heating portion 202 has a pair of heating rollers 204, and the second web M8 can be pressurized therebetween while being heated. By being heated and pressurized in such a manner, the resin P1 melts in the second web M8, and the fibers FB are bonded to one another through such molten resin P1. Thus, the sheet S is formed. Such sheet S is transported toward the cutting section 21. One of the pair of heating rollers 204 is a main driving roller driven by operation of a motor (not shown), and the other is a driven roller.

On a downstream side of the sheet forming section 20, the cutting section 21 is disposed. The cutting section 21 is a section that performs the cutting step (see FIG. 20) of cutting the sheet S. Such cutting section 21 includes the first cutter 211 and the second cutter 212.

The first cutter 211 cuts the sheet S in a direction intersecting with a transporting direction of the sheet S.

The second cutter 212 cuts the sheet S in a direction parallel to the transporting direction of the sheet S on a downstream side of the first cutter 211.

By cutting with the first cutter 211 and the second cutter 212 as described above, the sheet S having a desired size can be obtained. Such sheet S is further transported to the downstream side and stored in the stocking section 22.

Meanwhile, in the present embodiment, the raw material M1 to be regenerated as the sheet S is a waste paper that has been printed and used. For this reason, the raw material M1 (fibers FB) before being introduced into the raw material-supplying section 11 is a material to which coloring materials such as black or color toners, various types of inks, various type of dyes, or pigments, dust, dirt, and the like have been adhered. Hereinafter, these adhered substances are collectively referred to as "alien substances AS". In a case where the sheet S is regenerated, it is preferable that the alien substances AS be removed as much as possible. Thus, the sheet S becomes a high-quality sheet from which the alien substances AS, that can be impurities during regeneration, have been removed.

Therefore, the sheet manufacturing apparatus 100 is configured so that the alien substances AS can be removed from the raw material M1 by the processing device 1 disposed on an upstream side of the sheet manufacturing apparatus 100. Hereinafter, the processing device 1 will be described. In particular, in a case where the alien substances AS are toners, removal efficiency of the alien substances AS by the processing device 1 is improved.

As shown in FIG. 18, the processing device 1 includes the transporting section 3, the fluffing section 4, and the alien substance-removing section 5.

The transporting section 3 transports the raw material M1 toward the downstream side. The transporting section 3 has the glue belt 31, the two stretching rollers 32, and a multiplicity of the idle rollers 33.

The glue belt 31 is an endless belt of which a surface is adhesive. Due to such adhesive force, the raw material M1 is fixed on the glue belt 31, and therefore the fluffing step in the fluffing section 4 and the alien substance-removing step in the alien substance-removing section 5 are stably performed. In addition, a plurality of the raw materials M1 can be mounted on the glue belt 31. Meanwhile, orientations (postures) of these raw materials M1 on the glue belt 31 may or may not be aligned.

The two stretching rollers 32 are disposed apart from each other on the upstream side and the downstream side, and the glue belt 31 is looped therearound. One stretching roller 32 of the two stretching rollers 32 is a driving roller which is connected to a motor (not shown) and rotates in the direction of the arrow $\alpha_{32}$ by driving of such motor. In addition, the other stretching roller 32 is a driven roller which rotates in the direction of the arrow $\alpha_{32}$ in the same manner as the driving roller, as a rotational force from the driving roller is transmitted via the glue belt 31. Meanwhile, due to rotation of each stretching roller 32, the raw material M1 on the glue belt 31 is transported in the transporting direction $\alpha_{31}$.

Further, in the transporting section 3, a transporting speed of the raw material M1 can vary by adjusting a rotation number of the driving roller.

The multiplicity of idle rollers 33 are disposed apart between the two stretching rollers 32. Along with the driving of the glue belt 31, each of the idle rollers 33 can rotate in the direction of the arrow $\alpha_{33}$ which is the same direction as the rotation direction of the stretching roller 32. Due to such idle rollers 33, deflection of the glue belt 31 can be prevented, and therefore the raw material M1 can be stably transported.

In the configuration shown in FIG. 18, the transporting section 3 is configured to have a belt-transported configuration. However, the invention is not limited thereto, and for example, the transporting section 3 may have a configuration where the raw material M1 is transported while being held on a stage by adsorption due to a negative pressure, that is, a platen.

As shown in FIG. 18, at an upper side of the glue belt 31, the fluffing section 4 is disposed. The fluffing section 4 is a section that performs the fluffing step (see FIG. 20) of fluffing the fibers FB contained in the raw material M1 (sheet-like material), the fibers FB being at least near the surface of the raw material M1.

Here, "fluffing" will be described.

The fibers FB contained in the raw material M1 are in a state of sleeping, that is, a lying-down state, as shown in FIG. 21, until the fluffing step is performed. In the state shown in FIG. 21, the fibers FB lye down in the same direction, that is, on the right side in FIG. 21, but some of the fibers FB may lye down in mutually different directions. By going through the fluffing step, the fibers FB that are at least near the surface are raised, that is, made to stand, as shown in FIG. 22, as compared with the state shown in FIG. 21. This is called "fluffing". As shown in FIG. 23, a standing state of the fibers FB is maintained until at least the alien substance-removing step is performed.

Further, the alien substances AS have penetrated between the fibers FB. For example, in a case where the alien substances AS are toners, the alien substances AS may have penetrated to about a ¼ to ⅓ depth of the thickness of the raw material M1.

As shown in FIG. 18, the fluffing section 4 has the brush 41. Such brush 41 has the rotatably-supported cylindrical or columnar core portion 411, and the brush bristles 412 provided on an outer peripheral portion of the core portion 411.

The core portion 411 is connected to a motor (not shown) and can be rotated together with the brush bristles 412 in the direction of the arrow ma by driving of such motor. The rotating shaft 413 of the brush 41 is installed in a direction substantially orthogonal with respect to the transporting direction $\alpha_{31}$ of the raw material M1. However, the invention is not limited thereto, and the rotating shaft 413 may be installed in a direction inclined at a predetermined angle (for example, 5 degrees to 45 degrees) with respect to the orthogonal direction.

The brush bristles 412 are implanted over the entire periphery of the outer peripheral portion of the core portion 411. The brush bristles 412 are, for example, formed of a flexible resin material (particularly a thermoplastic resin) such as polyolefin, polyamide or polyester. In addition, the brush bristles 412 can have the same composition as the resin P1. Thus, for example, even in a case where the brush bristles 412 fall out and are mixed with the fibers FB until a subsequent step, such brush bristles 412 can be used for bonding of the fibers FB to one another similarly to the resin P1. In addition, the tips of the brush bristles 412 may be sharp or may be rounded.

As the brush 41 rotates in the direction of the arrow $\alpha_{41}$, in the raw material M1 passing right under the brush 41, the fibers FB come into contact with the brush bristles 412 of the brush 41 and are forcefully pushed back to a direction opposite to the transporting direction $\alpha_{31}$, that is, the upstream side. Thus, in the raw material M1, the fibers FB becomes a fluffed state, that is, the fibers FB change from the state shown in FIG. 21 to the state shown in FIG. 22. Due to such a state, the alien substances AS contained in the raw material M1 can be lifted up as much as possible from the fibers FB, and therefore the fibers FB are easily removed in the alien substance-removing section 5.

The brush 41 is configured to rotate in the direction of the arrow $\alpha_{41}$ in the present embodiment. However, the invention is not limited thereto, and, for example, the brush 41 may be configured to rotate in a direction opposite to the direction of the arrow $\alpha_{41}$, or it may be configured to alternately perform the rotation in the $\alpha_{41}$ direction and in a direction opposite to the $\alpha_{41}$ direction in a periodic manner. Furthermore, the brush 41 may be configured to move (reciprocate) also toward a direction of its rotating shaft 413 as it rotates.

Further, although the brush 41 is configured to rotate in the present embodiment, the invention is not limited thereto, and the brush 41 may, for example, be configured to move in a direction opposite to the transporting direction $\alpha_{31}$ or in the same direction as the transporting direction $\alpha_{31}$.

Further, downward of the brush 41, one of the idle rollers 33 is positioned along the glue belt 31 (such idle roller 33 is hereinafter referred to as "idle roller 33a"). Due to such idle roller 33a, the brush 41 can be more reliably pressed against the raw material M1 from an upper side, and therefore the brush bristles 412 and the fibers FB sufficiently come into contact with each other. Thus, the fibers FB can be fluffed without excess or deficiency.

As shown in FIG. 18, at an upper side of the glue belt 31, the alien substance-removing section 5 is disposed on a downstream side of the fluffing section 4. The alien substance-removing section 5 is a section that performs the alien substance-removing step (see FIG. 20) that removes the alien substances AS contained in the raw material M1 (sheet-like material) by bringing the fluffed fibers FB into contact with the fabric material 51 formed of a nonwoven fabric or a woven fabric and causing the alien substances AS to migrate to the fabric material 51. The alien substance-removing section 5 has the fabric material 51, the two stretching rollers 52, a multiplicity of the idle rollers 53, and the cleaning portion 54.

Although not shown in the drawings, it is also possible to have a configuration where a pressing pressure (pressing force) of the brush 41 against the raw material M1 is adjustable. An example of such a configuration is to have an adjusting portion that moves the rotating shaft 413 of the brush 41 in a vertical direction in FIG. 18. Thus, it is possible to more properly perform fluffing depending on a state of the raw material M1 (for example, a thickness of the raw material M1 and a content of the alien substances AS).

The fabric material 51 is formed of a nonwoven fabric or a woven fabric. Thus, the fabric material 51 can entangle with the alien substances AS and take them out of the raw material M1. In addition, in the alien substance-removing section 5, the fabric material 51 is an endless belt. Accordingly, for example, in a case where the fabric material 51 is cleaned by the cleaning portion 54, the fabric material 51 can be continuously used as it is to remove the alien substances AS.

The two stretching rollers 52 are disposed apart from each other on the upstream side and the downstream side, and the fabric material 51 is looped therearound. One stretching roller 52 of the two stretching rollers 52 is a driving roller which is connected to a motor (not shown) and rotates in a direction of the arrow $\alpha_{52}$ by driving of such motor. In addition, the other stretching roller 52 is a driven roller which rotates in the direction of the arrow $\alpha_{52}$ similarly to the driving roller as a rotational force from the driving roller is transmitted via the fabric material 51. By the rotation of each stretching roller 52, the fabric material 51 is driven on the glue belt 31 in a direction of an arrow $\alpha_{51}$ which is a direction opposite to the transporting direction $\alpha_{31}$. Thus, the fabric material 51 can cause the alien substances AS to migrate from the raw material M1, that is, adhere to and wipe off them. As a result, the alien substances AS are sufficiently removed, and a state as shown in FIG. 23 is obtained.

Further, in the alien substance-removing section 5, a driving speed of the fabric material 51 in the direction of the arrow $\alpha_{51}$ can vary by adjusting a rotation number of the driving roller.

A multiplicity of the idle rollers 53 are disposed at equal intervals between the two stretching rollers 52. Along with driving of the fabric material 51, each of the idle rollers 53 can rotate in the direction of the arrow $\alpha_{s3}$ which is the same direction as the rotation direction of the stretching roller 52.

Further, downward of the fabric material 51, a plurality of the idle rollers 33 are positioned along the glue belt 31 (hereinafter these idle rollers 33 will be referred to as "idle rollers 33*b*"). The fabric material 51 can be pressed against the raw material M1 between these idle rollers 33*b* and the idle rollers 53. Thus, the fabric material 51 and the alien substances AS sufficiently come into contact with each other, and therefore the alien substances AS are sufficiently removed.

In addition, in a configuration shown in FIG. 18, the fabric material 51 is driven in the direction of the arrow $\alpha_{51}$ which is a direction opposite to the transporting direction $\alpha_{31}$. However, the invention is not limited thereto, and the fabric material 51 may, for example, be driven in the same direction as the transporting direction $\alpha_{31}$. In this case, it is preferable that there be a difference between a driving speed of the fabric material 51 and a transporting speed of the raw material M1.

The alien substance-removing section 5 has the cleaning portion 54 for cleaning the fabric material 51 to which the alien substances AS have migrated. The cleaning portion 54 is disposed upward of the fabric material 51 and is configured to suck the alien substances AS which are adhered to the fabric material 51. Thus, the alien substances AS are removed from the fabric material 51, and therefore the fabric material 51 is cleaned. The cleaned fabric material 51 is again used to remove the alien substances AS.

Eighth Embodiment

Figure 24:
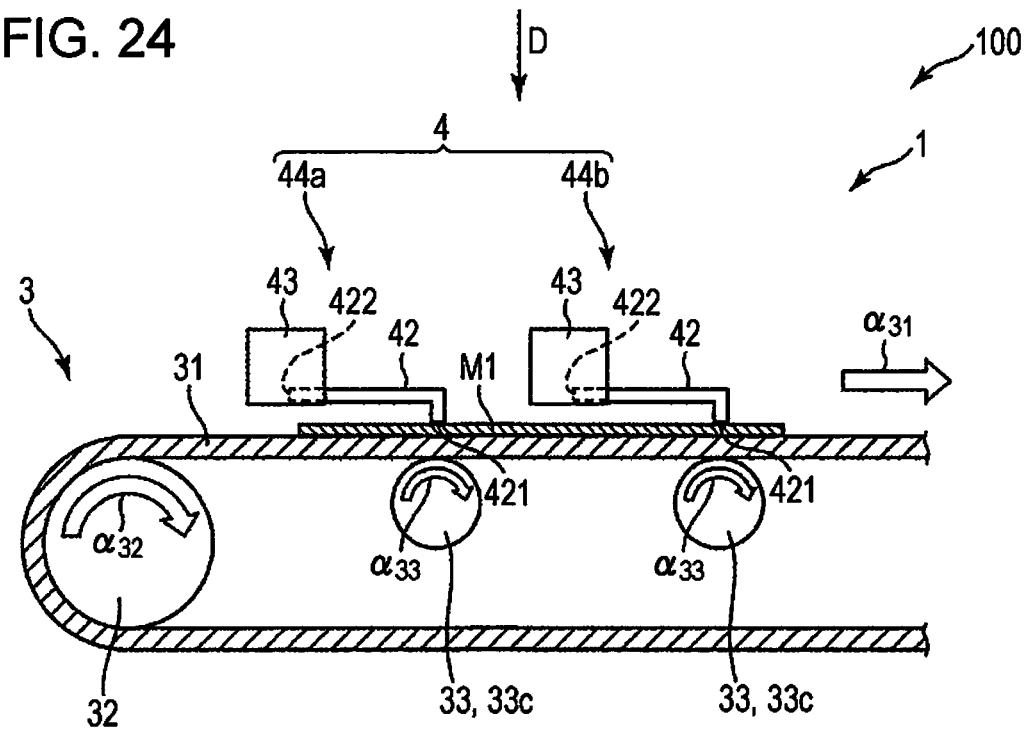
FIG. 24 is a schematic side view showing a configuration of an upstream side (processing device of the invention) of the sheet manufacturing apparatus (eighth embodiment) of the invention.
Figure 25:
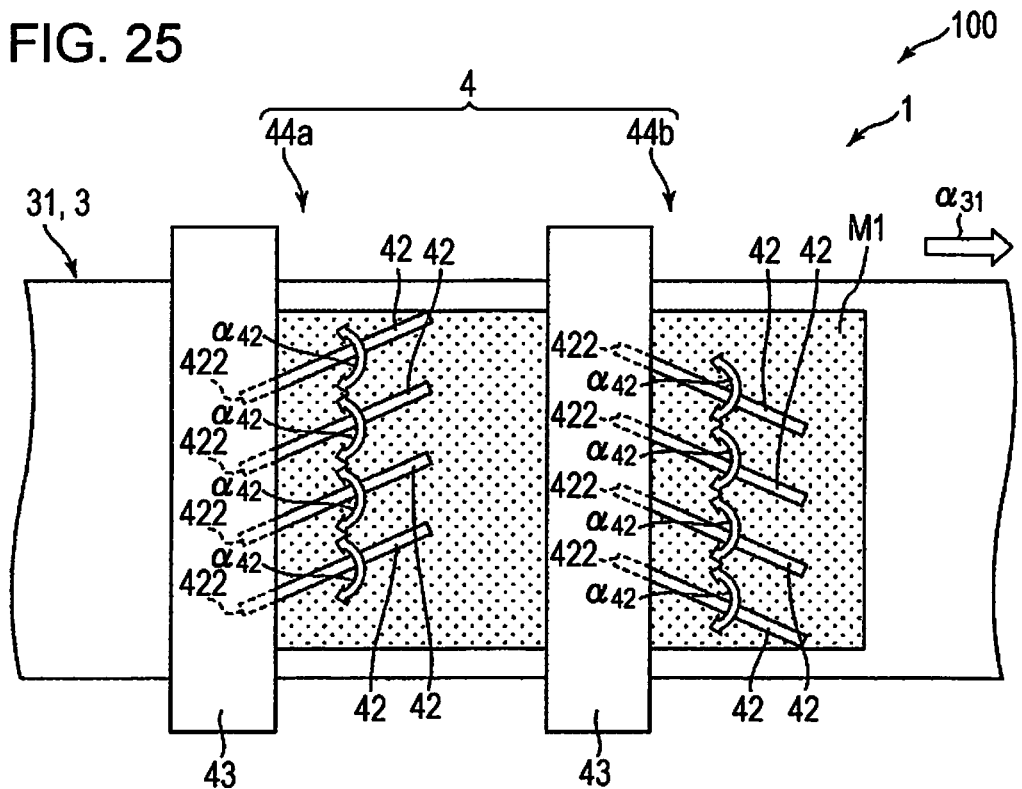
FIG. 25 is a view (plan view) as seen in the direction of an arrow D in FIG. 24.

FIG. 24 is a schematic side view showing a configuration of an upstream side (processing device of the invention) of the sheet manufacturing apparatus (eighth embodiment) of the invention. FIG. 25 is a view (plan view) as seen in a direction of an arrow D in FIG. 24.

Hereinafter, the eighth embodiment of the processing device, the sheet manufacturing apparatus, the processing method, and the manufacturing method of a sheet of the invention will be described with reference to these drawings. However, descriptions will be made on the differences from the above-described embodiment and descriptions will be omitted for the similar matters.

The present embodiment is the same as the seventh embodiment except that a configuration of the fluffing section is different.

As shown in FIGS. 24 and 25, in the present embodiment, the fluffing section 4 has the four (plural) hook-shape claw portions 42 and the rotary supporting portions 43 that rotatably support these claw portions 42. Here, the "hook-shape" means a shape in which at a position midway in a longitudinal direction of a longitudinal member (claw portion 42) (any position between the base end part 422 and the sharp end 421), the member is bent or curved. The number of the claw portions 42 is not limited to four, and may be, for example, two, three, or five or more. In addition, the claw portion 42 is not limited to the hook-shape, and may be a linear shape.

The four claw portions 42 are disposed along a width direction of the glue belt 31. Each claw portion 42 is formed of a hard resinous or metallic linear body, and its sharp end 421 faces downward. The raw material M1 passing right under the sharp end 421 of each claw portion 42 is scratched by the sharp end 421 and the fibers FB are forcibly pushed back in a direction opposite to the transporting direction $\alpha_{31}$, that is, an upstream side. Thus, the raw material M1 becomes a state where the fibers FB are fluffed.

It is also possible to have a configuration where the pressing force of the sharp end 421 of each claw portion 42 against the raw material M1 is adjustable. Thus, it is possible to more properly perform fluffing depending on a state of the raw material M1.

Further, downward of the sharp end 421 of the claw portion 42, one of the idle rollers 33 is positioned along the glue belt 31 (hereinafter such idle roller 33 is referred to as "idle roller 33*c*"). By such idle roller 33*c*, the sharp end 421 of each claw portion 42 can be pressed against the raw material M1 from an upper side, and therefore scratching by the sharp end 421 is sufficiently performed. Thus, the fibers FB can be fluffed without excess or deficiency.

The rotary supporting portion 43 can rotate the base end part (root part) 422 of the four claw portions 42 all together in a direction of an arrow $\alpha_{42}$.

Further, in the present embodiment, the four claw portions 42 and the rotary supporting portions 43 are unitized, and a first unit 44*a* on an upstream side and a second unit 44*b* on a downstream side are disposed. A rotation direction of each claw portion 42 in the first unit 44*a* and a rotation direction of each claw portion 42 in the second unit 44*b* are opposite to each other. For example, in a case where each claw portion 42 of the first unit 44a is rotated counterclockwise in FIG. 25, each claw portion 42 of the second unit 44b is rotated clockwise in FIG. 25. Due to such rotation, the raw material M1 can be scratched uniformly by the claw portions 42, and therefore the fibers FB can be fluffed over the entire raw material M1.

Ninth Embodiment

Figure 26:
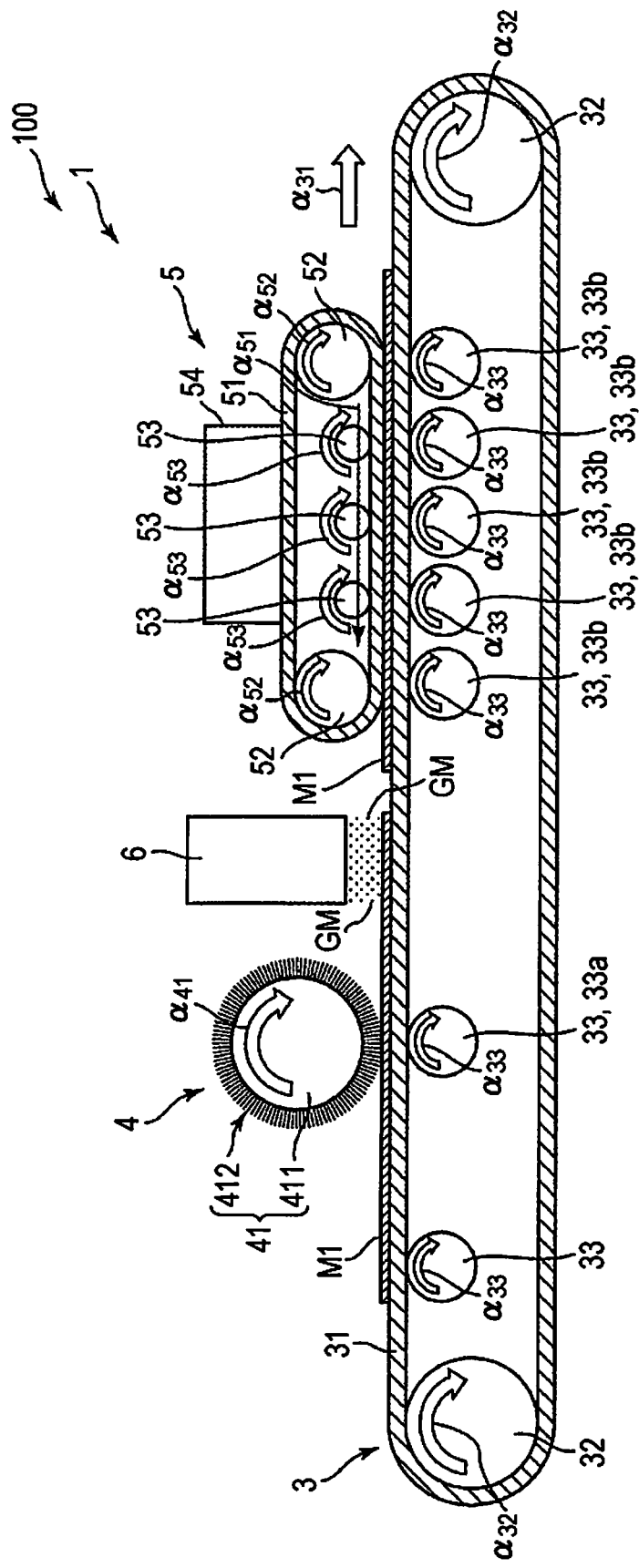
FIG. 26 is a schematic side view showing a configuration of an upstream side (processing device of the invention) of the sheet manufacturing apparatus (ninth embodiment) of the invention.
Figure 27:
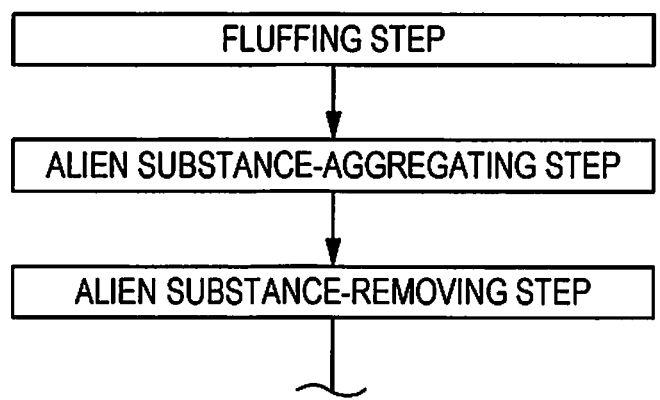
FIG. 27 is a diagram sequentially illustrating steps performed by the sheet manufacturing apparatus (ninth embodiment) of the invention.

FIG. 26 is a schematic side view showing a configuration of an upstream side (processing device of the invention) of the sheet manufacturing apparatus (ninth embodiment) of the invention. FIG. 27 is a diagram sequentially illustrating steps performed by the sheet manufacturing apparatus (ninth embodiment) of the invention.

Hereinafter, the ninth embodiment of the processing device, the sheet manufacturing apparatus, the processing method, and the manufacturing method of a sheet of the invention will be described with reference to these drawings. However, descriptions will be made on the differences from the above-described embodiment and descriptions will be omitted for the similar matters.

The present embodiment is the same as the seventh embodiment except that the alien substance-aggregating section is provided.

As shown in FIG. 26, in the present embodiment, the processing device 1 includes the alien substance-aggregating section (aggregating section) 6 that is disposed between the fluffing section 4 and the alien substance-removing section 5, and aggregates the alien substances AS. The alien substance-aggregating step performed by such alien substance-aggregating section 6 is performed between the fluffing step and the alien substance-removing step.

The alien substance-aggregating section 6 is disposed at an upper side of the glue belt 31, and is capable of supplying an aggregating material GM from upward to the raw material M1 by, for example, spraying. Thus, the alien substances AS can be aggregated on the raw material M1. The aggregated alien substances AS have a size that can be easily removed in the alien substance-removing step. Accordingly, the aggregated alien substances AS are easily removed from the raw material M1 by operation of the alien substance-removing section 5. It is needless to say that in the alien substance-removing section 5, the alien substances AS which are not aggregated are also removed. In addition, in the alien substance-removing section 5, an excess of the aggregating material GM is removed together with the alien substances AS. With a configuration having the alien substance-aggregating section 6 having such a configuration, an effect that a removal rate of the alien substances AS is improved is exhibited.

The aggregating material GM is not particularly limited and examples thereof include ionic substances, and those containing a polyvalent metal ion such as calcium chloride or magnesium, and cationic polymers are preferably included. In addition, it is preferable that these be, for example, in a liquid state.

Tenth Embodiment

The processing device 1 of the invention includes the aggregating section (alien substance-aggregating section) 6 that aggregates the alien substances AS, which are contained in the sheet-like material (raw material) M1 containing the fibers FB, by applying the liquid (aggregating material) CP containing a cationic polymer to the sheet-like material, and the removing section (alien substance-removing section) 5 that removes aggregates AG generated by the aggregating section 6 from the sheet-like material M1.

Further, the processing method of the invention includes the aggregating step of aggregating the alien substances AS, which are contained in the sheet-like material (raw material) M1 containing the fibers FB, by applying the liquid CP containing a cationic polymer to the sheet-like material, and the removing step of removing aggregates AG generated by the aggregating step from the sheet-like material M1. Such method is executed by the processing device 1.

According to the invention as described above, as described later, prior to removing the alien substances AS contained in the sheet-like material M1, the alien substances AS contained in the sheet-like material M1 are brought into contact with the cationic polymer to form the aggregates AG. Such aggregates AG are relatively large and are easily removed. Therefore, this makes it easy to remove the alien substances AS from the sheet-like material M1, and the alien substances AS can be sufficiently removed from the sheet-like material M1. In particular, it is possible to suitably remove the alien substances AS which have penetrated into narrow interstices between the fibers FB and into interiors of the fibers FB.

That is, the process according to the invention is said to be a de-inking process of a waste paper. A de-inking process in the related art is, in general, a process which includes dispersing a waste paper in water, releasing a coloring agent in a mechanical and chemical manner (with surfactants, alkaline chemicals, and the like), and removing a coloring material by a floating method, a screen washing method, or the like. However, in the invention, it is possible to perform de-inking without having to soak a waste paper in water. This is said to be a dry de-inking technique.

The sheet manufacturing apparatus 100 of the invention includes the processing device 1.

In addition, the manufacturing method of a sheet of the invention includes the aggregating step of aggregating the alien substances AS, which are contained in the sheet-like material (raw material) M1 containing the fibers FB, by applying the liquid CP (aggregating material) containing a cationic polymer to the sheet-like material, and the removing step of removing the aggregates AG generated by the aggregating step from the sheet-like material M1, in which the sheet S is manufactured from the sheet-like material M1 from which the alien substances AS have been removed. Such method is executed by the sheet manufacturing apparatus 100.

According to the invention as described above, it is possible to further manufacture (regenerate) the sheet S from the sheet-like material M1 from which the alien substances AS have been removed, while enjoying advantages of the above-described processing device 1 (processing method).

Figure 28:
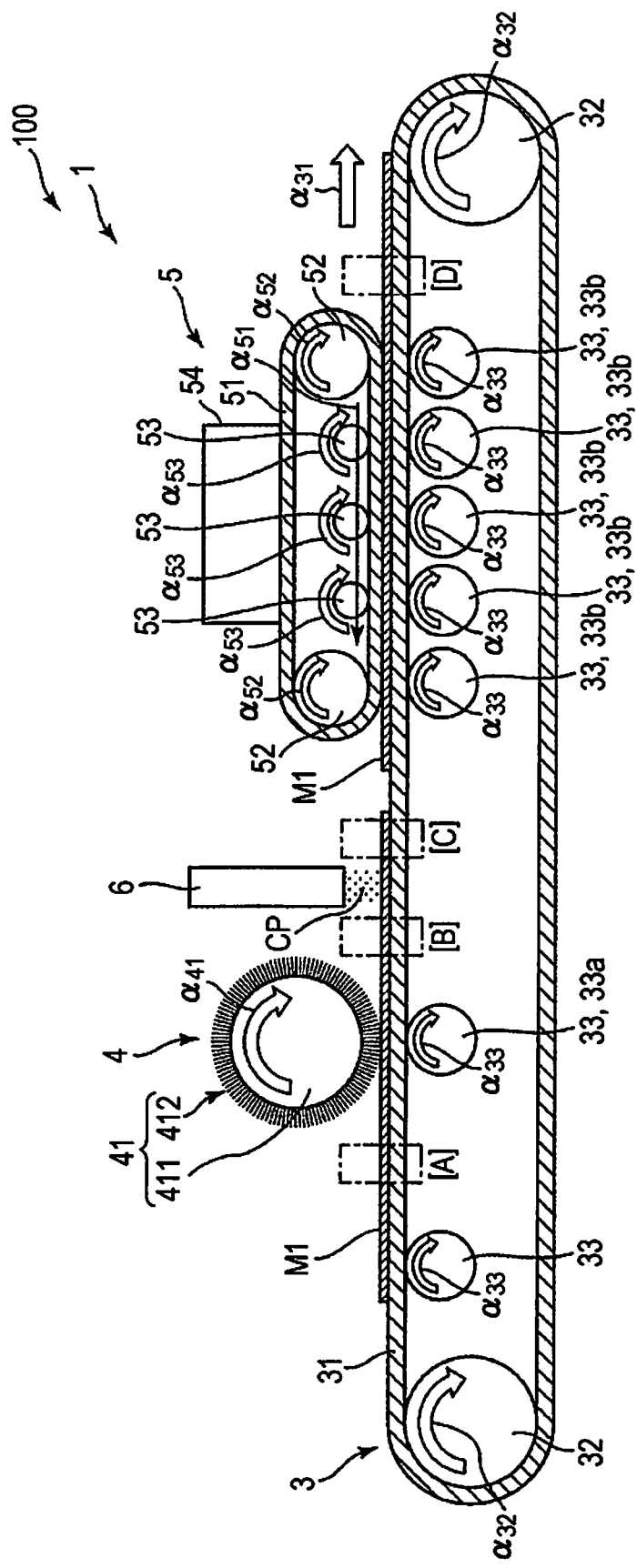
FIG. 28 is a schematic side view showing a configuration of an upstream side (processing device of the invention) of the sheet manufacturing apparatus (tenth embodiment) of the invention.
Figure 29:
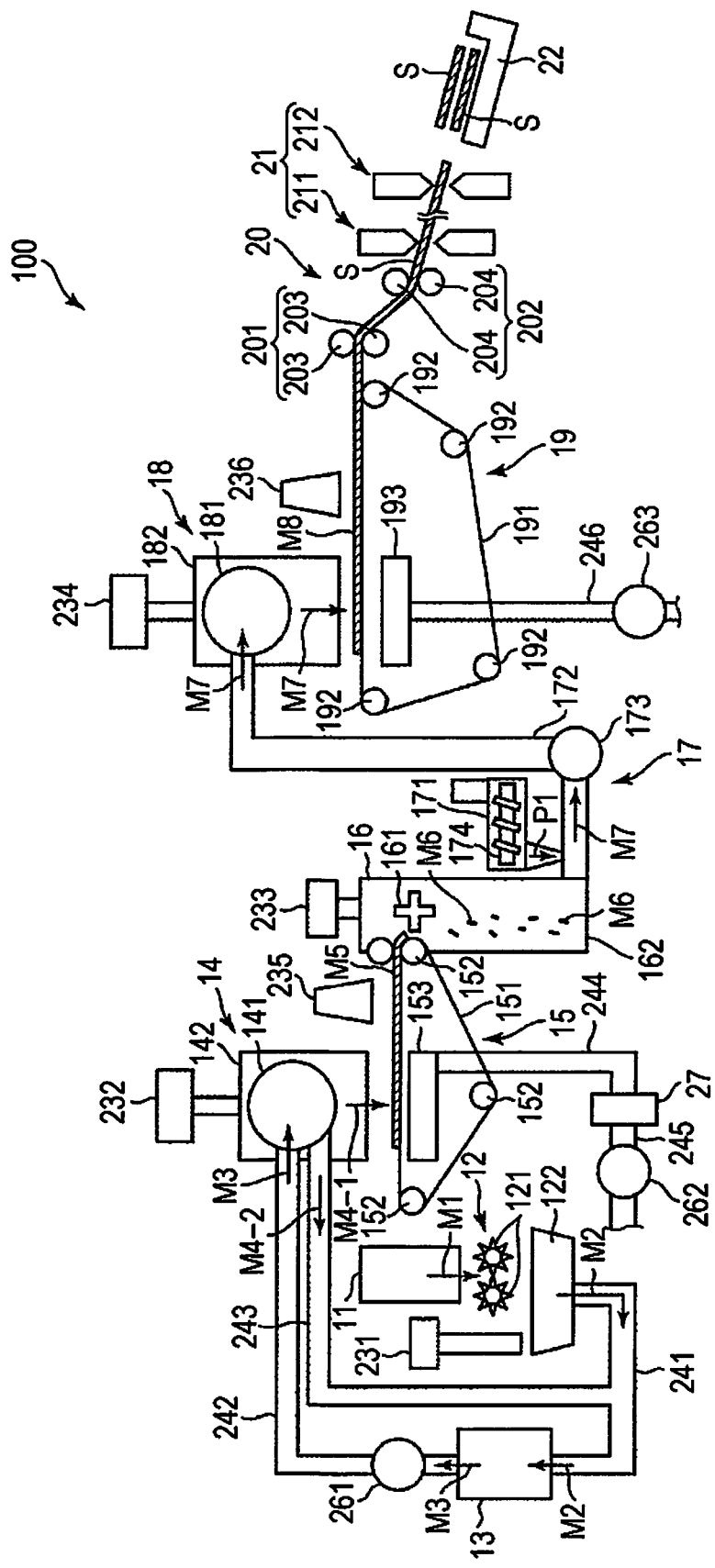
FIG. 29 is a schematic side view showing a configuration on a downstream side of the sheet manufacturing apparatus (tenth embodiment) of the invention.
Figure 30:
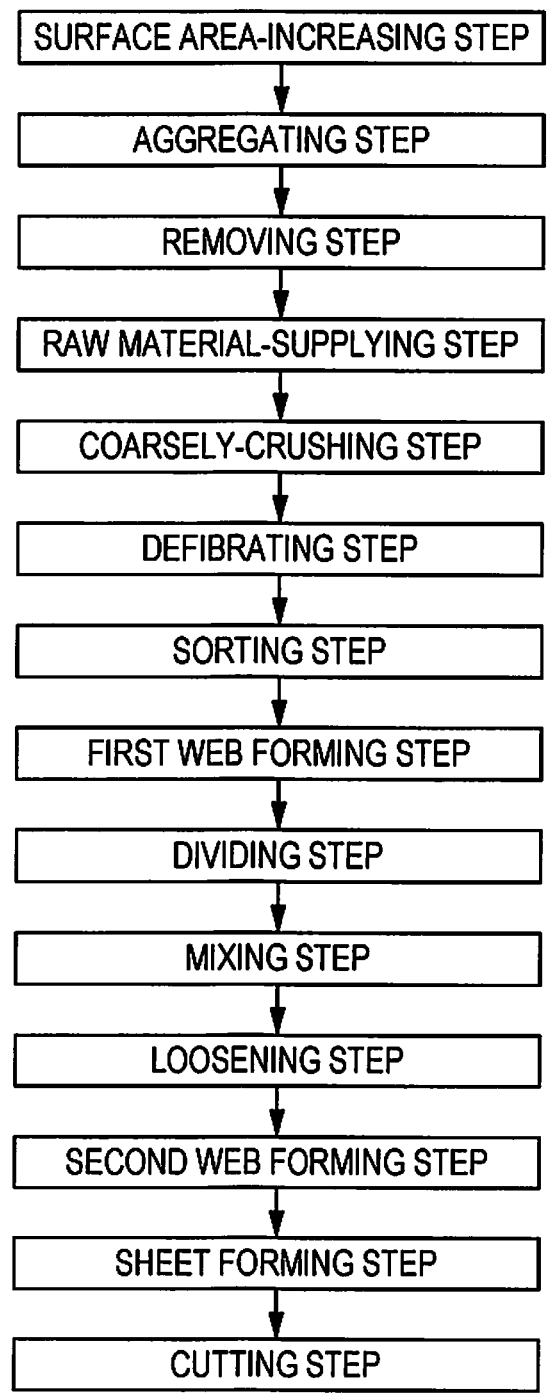
FIG. 30 is a diagram sequentially illustrating steps performed by the sheet manufacturing apparatus (tenth embodiment) of the invention.
Figure 31:
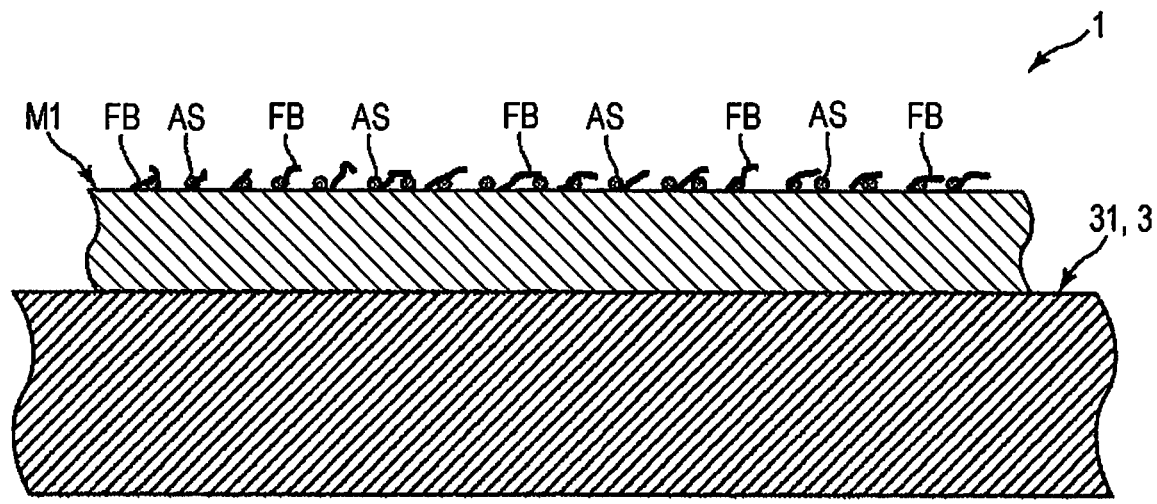
FIG. 31 is an image diagram sequentially showing a state of the sheet-like material processed by the processing device shown in FIG. 28 (enlarged view of a region [A] surrounded by a dot-and-dash line in FIG. 28).
Figure 32:
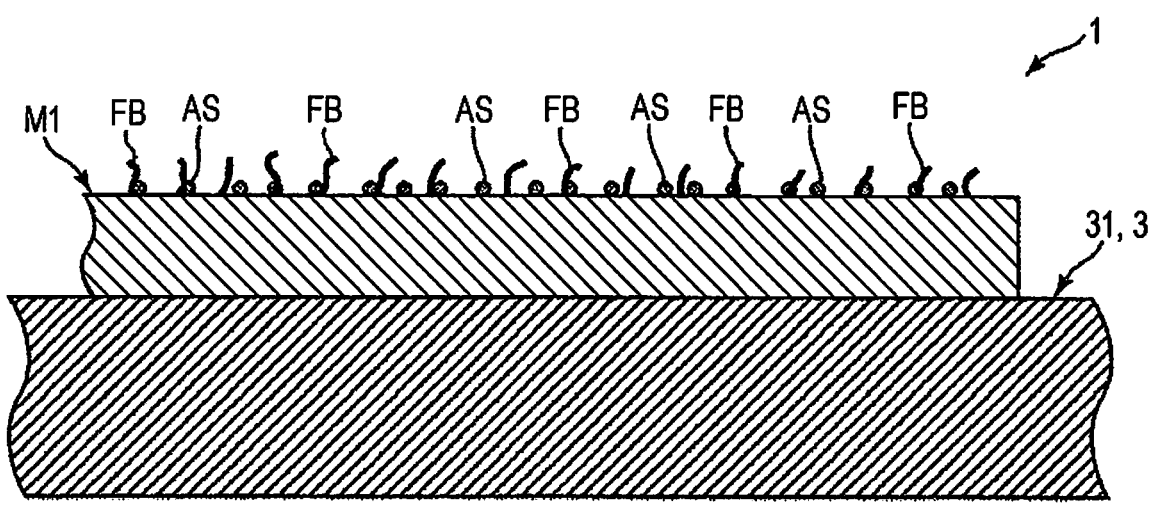
FIG. 32 is an image diagram sequentially showing a state of the sheet-like material processed by the processing device shown in FIG. 28 (enlarged view of a region [B] surrounded by a dot-and-dash line in FIG. 28).
Figure 33:
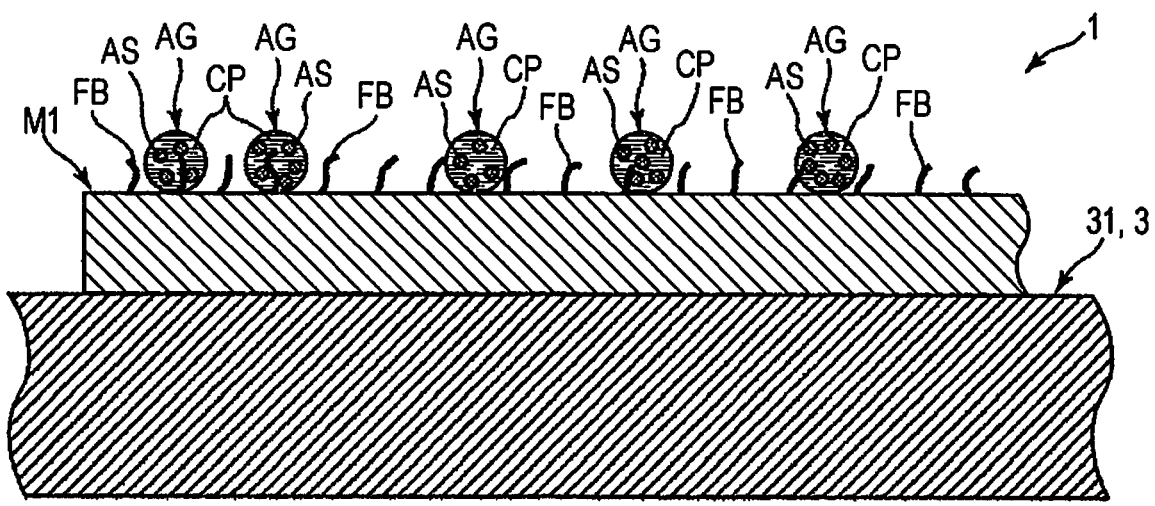
FIG. 33 is an image diagram sequentially showing a state of the sheet-like material processed by the processing device shown in FIG. 28 (enlarged view of a region [C] surrounded by a dot-and-dash line in FIG. 28).
Figure 34:
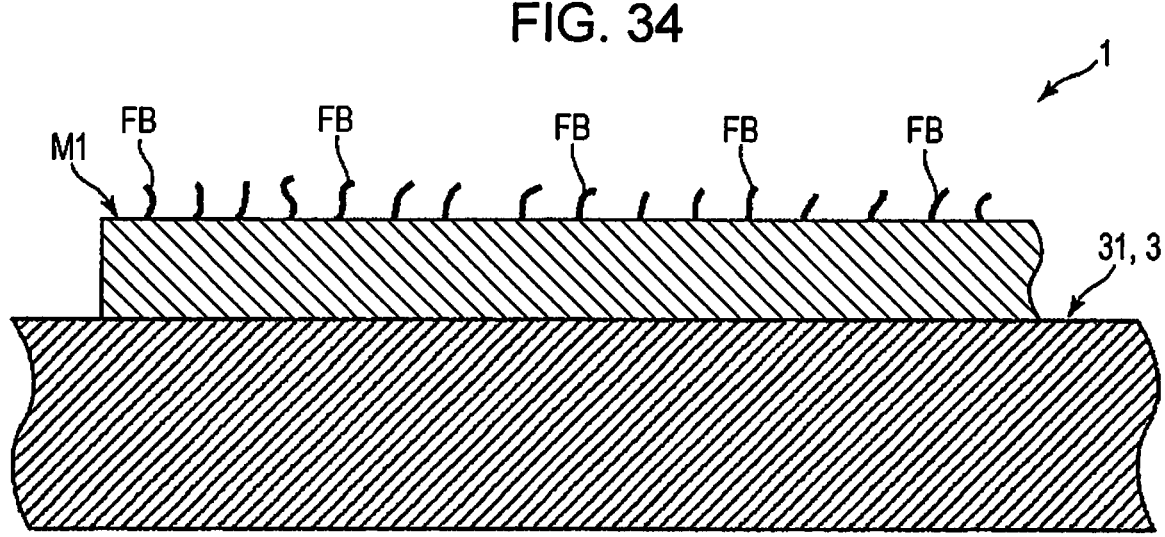
FIG. 34 is an image diagram sequentially showing a state of the sheet-like material processed by the processing device shown in FIG. 28 (enlarged view of a region [D] surrounded by a dot-and-dash line in FIG. 28).

FIG. 28 is a schematic side view showing a configuration of an upstream side (processing device of the invention) of the sheet manufacturing apparatus (tenth embodiment) of the invention. FIG. 29 is a schematic side view showing a configuration on a downstream side of the sheet manufacturing apparatus (tenth embodiment) of the invention. FIG. 30 is a diagram sequentially illustrating steps performed by the sheet manufacturing apparatus (tenth embodiment) of the invention. FIGS. 31 to 34 are image diagrams, each sequentially showing a state of the sheet-like material processed by the processing device shown in FIG. 28 (FIG. 31 is an enlarged view of a region [A] surrounded by a dot-and-dash line in FIG. 28; FIG. 32 is an enlarged view of a region [B] surrounded by a dot-and-dash line in FIG. 28; FIG. 33 is an enlarged view of a region [C] surrounded by a dot-and-dash line in FIG. 28; and FIG. 34 is an enlarged view of a region [D] surrounded by a dot-and-dash line in FIG. 28). Hereinafter, for convenience of description, in FIGS. 28, 29, and 31 to 34 (the same applies to FIGS. 35 and 37 to 40), an upper side may be referred to as "upper" or "upward"; a lower side may be referred to as "lower" or "downward"; a left side may be referred to as "left" or "upstream side"; and a right side may be referred to as "right" or "downstream side."

As shown in FIG. 28, the sheet manufacturing apparatus 100 includes the processing device 1 on an upstream side thereof. Such processing device 1 includes the transporting section 3, the surface area-increasing processing section (preprocessing section) 4, the aggregating section (alien substance-aggregating section) 6, and the removing section (alien substance-removing section) 5.

Further, as shown in FIG. 29, the sheet manufacturing apparatus 100 includes, on a downstream side thereof, the raw material-supplying section 11, the coarsely-crushing section 12, the defibrating section 13, the sorting section 14, the first web forming section 15, the subdividing section 16, the mixing section 17, the loosening section 18, the second web forming section 19, the sheet forming section 20, the cutting section 21, and the stocking section 22. In addition, the sheet manufacturing apparatus 100 includes the humidifying section 231, the humidifying section 232, the humidifying section 233, and the humidifying section 234.

Operation of each section of the sheet manufacturing apparatus 100 is controlled by a controlling section (not shown).

As shown in FIG. 30, in the present embodiment, the manufacturing method of a sheet includes a surface area-increasing step (preprocessing step), the aggregating step (alien substance-aggregating step), the removing step (alien substance-removing step), the raw material-supplying step, the coarsely-crushing step, the defibrating step, the sorting step, the first web forming step, the cutting step, the mixing step, the loosening step, the second web forming step, the sheet forming step, and the cutting step. The sheet manufacturing apparatus 100 can sequentially perform these steps. In addition, among these steps, steps performed by the processing device 1 are the surface area-increasing step (preprocessing step), the aggregating step (alien substance-aggregating step), and the removing step (alien substance-removing step).

Hereinafter, a configuration of each section included in the sheet manufacturing apparatus 100 will be described.

First, a configuration of the downstream side of the sheet manufacturing apparatus 100 will be described, and then a configuration of the upstream side of the sheet manufacturing apparatus 100, that is, the processing device 1 will be described.

The raw material-supplying section 11 is a section that performs the raw material-supplying step (see FIG. 30) of supplying the sheet-like material M1 to the coarsely-crushing section 12. Such sheet-like material M1 is a sheet-like material containing fibers FB (cellulose fibers) (see FIGS. 31 to 34). Such sheet-like material M1, that is, the sheet-like material is one to be subjected to an alien substance-removing process that removes the alien substances AS by the processing device 1. The cellulose fiber may be a fibrous type having, as its main component, cellulose (cellulose in a narrow sense) which is a compound and may contain hemicellulose and lignin, in addition to cellulose (cellulose in a narrow sense).

The coarsely-crushing section 12 is a section that performs the coarsely-crushing step (see FIG. 30) of coarsely crushing the sheet-like material M1, which is supplied from the raw material-supplying section 11, in an aerial manner (in the air). The coarsely-crushing section 12 has the pair of coarsely-crushing blades 121 and the chute (hopper) 122.

The pair of coarsely-crushing blades 121 can be rotated in a direction opposite to each other so that the sheet-like material M1 is coarsely crushed therebetween, that is, cut into coarsely-crushed pieces M2. The coarsely-crushed pieces M2 preferably have a shape and size suitable for a defibrating process in the defibrating section 13, for example, they are preferably a small piece with a side length of 100 mm or less, and more preferably a small piece with a side length of 10 mm to 70 mm.

The chute 122 is disposed downward of the pair of coarsely-crushing blades 121, and has, for example, a funnel shape. Thus, the chute 122 can receive the coarsely-crushed pieces M2 that have been crushed by the coarsely-crushing blades 121 and dropped.

Further, upward of the chute 122, the humidifying section 231 is disposed adjacent to the pair of coarsely-crushing blades 121. The humidifying section 231 humidifies the coarsely-crushed pieces M2 in the chute 122. Such humidifying section 231 is configured as an evaporation type (or warm-air evaporation type) humidifier which has a filter (not shown) containing moisture, and supplies, to the coarsely-crushed pieces M2, humidified air having increased humidity due to passage of air through the filter. By supplying the humidified air to the coarsely-crushed pieces M2, it is possible to prevent the coarsely-crushed pieces M2 from adhering to the chute 122 or the like due to static electricity.

The chute 122 is connected to the defibrating section 13 via a pipe (flow path) 241. The coarsely-crushed pieces M2 collected in the chute 122 pass through the pipe 241 and are transported to the defibrating section 13.

The defibrating section 13 is a section that performs the defibration step (see FIG. 30) of defibrating the coarsely-crushed pieces M2 in an aerial manner (in the air). By the defibrating process in such defibrating section 13, it is possible to generate a defibrated material M3 from the coarsely-crushed pieces M2. Here, "defibrating" means to unravel the coarsely-crushed pieces M2, which are formed by bonding of a plurality of the fibers FB to one another, into each individual fiber. Such unraveled fibers become the defibrated material M3. A shape of the defibrated material M3 is linear or belt-like. In addition, the defibrated materials M3 may exist in a state where they are entangled with one another into a lump, that is, in a state where so-called a "dummy" is formed.

In the present embodiment, for example, the defibrating section 13 is configured as an impeller mill having a rotor that is rotated at high speed and a liner that is positioned on an outer periphery of the rotor. The coarsely-crushed pieces M2 flowing into the defibrating section 13 are interposed between the rotor and the liner, and defibrated.

Further, the defibrating section 13 can generate a flow of air (airflow) from the coarsely-crushing section 12 to the sorting section 14 due to rotation of the rotor. Thus, the coarsely-crushed pieces M2 can be sucked from the pipe 241 to the defibrating section 13. In addition, after the defibrating process, the defibrated material M3 can be delivered to the sorting section 14 via the pipe 242.

The blower 261 is installed midway in the pipe 242. The blower 261 is an airflow generating device that generates an airflow toward the sorting section 14. This promotes delivery of the defibrated material M3 to the sorting section 14.

The sorting section 14 is a section that performs the sorting step (see FIG. 30) of sorting the defibrated material M3 according to a length of the fiber FB. In the sorting section 14, the defibrated material M3 is sorted into a first sorted material M4-1 and a second sorted material M4-2 that is larger than the first sorted material M4-1. The first sorted material M4-1 has a size suitable for the subsequent manufacture of the sheet S. On the other hand, the second sorted material M 4-2 includes, for example, one in which defibration is insufficiently performed, one in which defibrated fibers FB are excessively aggregated, and the like.

The sorting section 14 has the drum portion 141 and the housing portion 142 that houses the drum portion 141.

The drum portion 141 is configured as a cylindrical mesh member and is a sieve that rotates about its central axis. The defibrated material M3 flows into such drum portion 141. As the drum portion 141 rotates, the defibrated material M3 having a size smaller than a mesh opening is selected as the first sorted material M4-1, and the defibrated material M3 having a size larger than the mesh opening is selected as the second sorted material M4-2.

The first sorted material M4-1 drops from the drum portion 141.

On the other hand, the second sorted material M4-2 is delivered to the pipe (flow path) 243 connected to the drum portion 141. The pipe 243 is connected to the pipe 241 on the opposite side (downstream side) to the drum portion 141. The second sorted material M4-2 having passed through such pipe 243 joins the coarsely-crushed pieces M2 in the pipe 241 and flows into the defibrating section 13 together with the coarsely-crushed pieces M2. Thus, the second sorted material M4-2 is returned to the defibrating section 13 and is subjected to the defibrating process together with the coarsely-crushed pieces M2.

Further, from the drum portion, the first sorted material M4-1 141 falls while dispersing in the air and heads toward the first web forming section (separating section) 15 positioned downward of the drum portion 141. The first web forming section 15 is a section that performs the first web forming step (see FIG. 30) of forming the first web M5 from the first sorted material M4-1. The first web forming section 15 has the mesh belt (separating belt) 151, three stretching rollers 152, and a suction portion (suction mechanism) 153.

The mesh belt 151 is an endless belt, and the first sorted material M4-1 is accumulated thereon. Such mesh belt 151 is looped around the three stretching rollers 152. Due to rotational drive of the stretching rollers 152, the first sorted material M4-1 on the mesh belt 151 is transported to a downstream side.

The first sorted material M4-1 has a size larger than the mesh opening of the mesh belt 151. Thus, passage of the first sorted material M4-1 through the mesh belt 151 is regulated, and therefore the first sorted material M4-1 can be accumulated on the mesh belt 151. In addition, since the first sorted material M4-1 is transported to the downstream side together with the mesh belt 151 while being accumulated on the mesh belt 151, it is formed as a first layered web M5.

Further, for example, dust, dirt, or the like may be mixed in the first sorted material M4-1. The dust or dirt may be incorporated together the sheet-like material M1, for example, in a case where the sheet-like material M1 is supplied from the raw material-supplying section 11 to the coarsely-crushing section 12. Such dust or dirt is smaller than the mesh opening of the mesh belt 151. Thus, the dust or dirt passes through the mesh belt 151 and further drops downward.

The suction portion 153 can suck air from downward of the mesh belt 151. Thus, the dust or dust having passed through the mesh belt 151 can be sucked together with air.

Further, the suction portion 153 is connected to the collecting portion 27 via the pipe (flow path) 244. The dust or dirt sucked by the suction portion 153 is collected in the collecting portion 27.

The pipe (flow path) 245 is further connected to the collecting portion 27. In addition, the blower 262 is installed midway in the pipe 245. Due to operation of such blower 262, a suction force can be generated in the suction portion 153. Thus, formation of the first web M5 on the mesh belt 151 is promoted. Such first web M5 is one in which the dust or dirt has been removed. In addition, the dust or dirt passes through the pipe 244 due to operation of the blower 262 to reach the collecting portion 27.

The housing portion 142 is connected to the humidifying section 232. The humidifying section 232 is configured as an evaporation type humidifier similar to the humidifying section 231. Thus, humidified air is supplied into the housing portion 142. Such humidified air can also humidify the first sorted material M4-1, and therefore it is possible to prevent the first sorted material M4-1 from adhering to an inner wall of the housing portion 142 due to an electrostatic force.

On a downstream side of the sorting section 14, the humidifying section 235 is disposed. The humidifying section 235 is configured as an ultrasonic type humidifier which sprays water. Thus, moisture can be supplied to the first web M5, and therefore a moisture content of the first web M5 is adjusted. Such adjustment can prevent the first web M5 from being adsorbed to the mesh belt 151 due to an electrostatic force. Accordingly, the first web M5 is easily peeled off from the mesh belt 151 at a position where the mesh belt 151 is folded back by the stretching roller 152.

On a downstream side of the humidifying section 235, the subdividing section 16 is disposed. The subdividing section 16 is a section that performs the dividing step (see FIG. 30) of dividing the first web M5 which has been peeled off from the mesh belt 151. The subdividing section 16 has a rotatably-supported propeller 161 and a housing portion 162 for housing the propeller 161. The first web M5 is caught by the rotating propeller 161, so that the first web M5 can be divided. The divided first web M5 becomes a subdivided body M6. In addition, the subdivided body M6 descends within the housing portion 162.

The housing portion 162 is connected to the humidifying portion 233. The humidifying section 233 is configured as an evaporation type humidifier similar to the humidifying section 231. Thus, humidified air is supplied into the housing portion 162. Such humidified air can also prevent the subdivided body M6 from adhering to inner walls of the propeller 161 and the housing portion 162 due to an electrostatic force.

On a downstream side of the subdividing section 16, the mixing section 17 is disposed. The mixing section 17 is a section that performs the mixing step (see FIG. 30) of mixing the subdivided body M6 and a resin P1. Such mixing section 17 includes the resin supplying portion 171, the pipe (flow path) 172, and the blower 173.

The pipe 172 connects the housing portion 162 of the subdividing section 16 with the housing portion 182 of the loosening section 18, and is a flow path through which the mixture M7 of the subdivided body M6 and the resin P1 passes.

The resin supplying portion 171 is connected midway to the pipe 172. The resin supplying portion 171 has the screw feeder 174. Due to rotational drive of such screw feeder 174, it is possible to supply the resin P1 as powders or particles to the pipe 172. The resin P1 supplied to the pipe 172 is mixed with the subdivided body M6 to form the mixture M7.

The resin P1 causes the fibers FB to be bonded to one another in a subsequent step. As the resin P1, for example, a thermoplastic resin, a curable resin, or the like can be used, and the thermoplastic resin is preferably used. Examples of the thermoplastic resin include polyolefins such as AS resin, ABS resin, polyethylene, polypropylene, and ethylene-vinyl acetate copolymer (EVA); modified polyolefins; acrylic resins such as polymethyl methacrylate; polyesters such as polyvinyl chloride, polystyrene, polyethylene terephthalate, and polybutylene terephthalate; polyamides (nylons) such as nylon 6, nylon 46, nylon 66, nylon 610, nylon 612, nylon 11, nylon 12, nylon 6-12, and nylon 6-66; polyphenylene ether; polyacetal; polyether; polyphenylene oxide; polyether ether ketone; polycarbonate; polyphenylene sulfide; thermoplastic polyimide; polyether imide; liquid crystal polymers such as aromatic polyester; and various thermoplastic elastomers based on styrene, polyolefin, polyvinyl chloride, polyurethane, polyester, polyamide, polybutadiene, trans-polyisoprene, fluoro rubber, chlorinated polyethylene, or the like, and one type or two or more types selected therefrom can be used in combination. Preferably, as the thermoplastic resin, a polyester or one containing the same is used.

In addition to the resin P1, those supplied from the resin supplying portion 171 may contain, for example, a coloring agent for coloring the fibers FB, an aggregation inhibitor for suppressing aggregation of the fibers FB and aggregation of the resin P1, a flame retardant for making the fibers FB or the like less susceptible to burning, and the like.

Further, the blower 173 is installed on a downstream side of the resin supplying portion 171 midway in the pipe 172. The blower 173 can generate an airflow towards the loosening section 18. Such airflow can agitate the subdivided body M6 and the resin P1 in the pipe 172. Thus, the mixture M7 can flow into the loosening section 18 in a state where the subdivided body M6 and the resin P1 are uniformly dispersed. In addition, the subdivided body M6 in the mixture M7 is loosened in the process of passing through an inside of the pipe 172, and becomes a finer fibrous type.

The loosening section 18 is a section that performs the loosening step (see FIG. 30) of loosening the mutually entangled fibers FB in the mixture M7. The loosening section 18 has the drum portion 181 and the housing portion 182 for housing the drum portion 181.

The drum portion 181 is configured as a cylindrical mesh member and is a sieve that rotates about its central axis. The mixture M7 flows into such drum portion 181. As the drum portion 181 rotates, the fibers FB or the like having a size smaller than the mesh opening in the mixture M7 can pass through the drum portion 181. At that time, the mixture M7 is loosened.

Further, the mixture M7 loosened in the drum portion 181 drops while dispersing in the air and heads toward the second web forming section 19 positioned downward of the drum portion 181. The second web forming section 19 is a section that performs the second web forming step (see FIG. 30) of forming the second web M8 from the mixture M7. The second web forming section 19 has the mesh belt (separating belt) 191, the stretching rollers 192, and the suction portion (suction mechanism) 193.

The mesh belt 191 is an endless belt, and the mixture M7 is accumulated thereon. Such mesh belt 191 is looped around the four stretching rollers 192. Due to rotational drive of the stretching rollers 192, the mixture M7 on the mesh belt 191 is transported to a downstream side.

Further, most of the mixture M7 on the mesh belt 191 has a size larger than the mesh opening of the mesh belt 191. Thus, passage of the mixture M7 through the mesh belt 191 is regulated, and therefore the mixture M7 can be accumulated on the mesh belt 191. In addition, since the mixture M7 is transported to the downstream side together with the mesh belt 191 while being accumulated on the mesh belt 191, it is formed as a second layered web M8.

The suction portion 193 can suck air from downward of the mesh belt 191. Thus, the mixture M7 can be sucked onto the mesh belt 191, and therefore accumulation of the mixture M7 on the mesh belt 191 is promoted.

The pipe (flow path) 246 is connected to the suction portion 193. In addition, the blower 263 is installed midway in such pipe 246. Due to operation of such blower 263, a suction force can be generated in the suction portion 193.

The housing portion 182 is connected to the humidifying section 234. The humidifying section 234 is configured as an evaporation type humidifier similar to the humidifying section 231. Thus, humidified air is supplied into the housing portion 182. Such humidified air can humidify an inside of the housing portion 182, and therefore can prevent the mixture M7 from adhering to an inner wall of the housing portion 182 due to an electrostatic force.

On a downstream side of the loosening portion 18, the humidifying section 236 is disposed. The humidifying section 236 is configured as an ultrasonic type humidifier similar to the humidifying section 235. Thus, moisture can be supplied to the second web M8, and therefore a moisture content of the second web M8 is adjusted. Such adjustment can prevent the second web M8 from being adsorbed to the mesh belt 191 due to an electrostatic force. Accordingly, the second web M8 is easily peeled off from the mesh belt 191 at a position where the mesh belt 191 is folded back by the stretching roller 192.

On a downstream side of the second web forming section 19, the sheet forming section 20 is disposed. The sheet forming section 20 is a section that performs the sheet forming step (see FIG. 30) of forming a sheet S from the second web M8. Such sheet forming section 20 includes the pressurizing portion 201 and the heating portion 202.

The pressurizing portion 201 has a pair of calender rollers 203, and the second web M8 can be pressurized therebetween without being heated. Thus, a density of the second web M8 is increased. Such second web M8 is transported toward the heating portion 202. One of the pair of calendar rollers 203 is a main driving roller driven by operation of a motor (not shown), and the other is a driven roller.

The heating portion 202 has a pair of heating rollers 204, and the second web M8 can be pressurized therebetween while being heated. By being heated and pressurized in such a manner, the resin P1 melts in the second web M8, and the fibers FB are bonded to one another through such molten resin P1. Thus, the sheet S is formed. Such sheet S is transported toward the cutting section 21. One of the pair of heating rollers 204 is a main driving roller driven by operation of a motor (not shown), and the other is a driven roller.

On a downstream side of the sheet forming section 20, the cutting section 21 is disposed. The cutting section 21 is a section that performs the cutting step (see FIG. 30) of cutting the sheet S. Such cutting section 21 includes the first cutter 211 and the second cutter 212.

The first cutter 211 cuts the sheet S in a direction intersecting with a transporting direction of the sheet S.

The second cutter 212 cuts the sheet S in a direction parallel to the transporting direction of the sheet S on a downstream side of the first cutter 211.

By cutting with the first cutter 211 and the second cutter 212 as described above, the sheet S having a desired size can be obtained. Such sheet S is further transported to the downstream side and stored in the stocking section 22.

Meanwhile, in the present embodiment, the sheet-like material M1 to be regenerated as the sheet S is a waste paper that has been printed and used. For this reason, the sheet-like material M1 (fibers FB) before being introduced into the raw material-supplying section 11 is a material to which coloring materials such as black or color toners, various types of inks, various type of dyes, or pigments, dust, dirt, and the like have been adhered. Hereinafter, these adhered substances are collectively referred to as "alien substances AS". In a case where the sheet S is regenerated, it is preferable that the alien substances AS be removed as much as possible. Thus, the sheet S becomes a high-quality sheet from which the alien substances AS, that can be impurities during regeneration, have been removed.

Therefore, the sheet manufacturing apparatus 100 is configured so that the alien substances AS can be removed from the sheet-like material M1 by the processing device 1 disposed on an upstream side of the sheet manufacturing apparatus 100. Hereinafter, the processing device 1 will be described. In particular, alien substances derived from ink (in particular, ink jet ink) easily penetrate into narrow interstices between the fibers and into interiors of the fibers, and it is generally said that such alien substances are difficult to remove. However, in the invention, it is possible to suitably remove the alien substances derived from such ink (in particular, ink jet ink). In other words, in a case where the alien substances AS are derived from ink (in particular, ink jet ink), effects according to the invention are more remarkably exerted.

As shown in FIG. 28, the processing device 1 includes the transporting section 3, the surface area-increasing processing section (preprocessing section) 4, the aggregating section (alien substance-aggregating section) 6, and the removing section (alien substance-removing section) 5.

The transporting section 3 transports the sheet-like material M1 toward the downstream side. The transporting section 3 has the glue belt 31, the two stretching rollers 32, and a multiplicity of the idle rollers 33.

The glue belt 31 is an endless belt of which a surface is adhesive. Due to such adhesive force, the sheet-like material M1 is fixed on the glue belt 31, and therefore the surface area-increasing processing step in the surface area-increasing processing section (preprocessing section) 4 and the alien substance-removing step in the removing section 5 are stably performed. In addition, a plurality of the sheet-like materials M1 can be mounted on the glue belt 31. Meanwhile, orientations (postures) of these sheet-like materials M1 on the glue belt 31 may or may not be aligned.

The two stretching rollers 32 are disposed apart from each other on the upstream side and the downstream side, and the glue belt 31 is looped therearound. One stretching roller 32 of the two stretching rollers 32 is a driving roller which is connected to a motor (not shown) and rotates in the direction of the arrow $\alpha_{32}$ by driving of such motor. In addition, the other stretching roller 32 is a driven roller which rotates in the direction of the arrow $\alpha_{32}$ in the same manner as the driving roller, as a rotational force from the driving roller is transmitted via the glue belt 31. Meanwhile, due to rotation of each stretching roller 32, the sheet-like material M1 on the glue belt 31 is transported in the transporting direction $\alpha_{31}$.

Further, in the transporting section 3, a transporting speed of the sheet-like material M1 can vary by adjusting a rotation number of the driving roller.

The multiplicity of idle rollers 33 are disposed apart between the two stretching rollers 32. Along with the driving of the glue belt 31, each of the idle rollers 33 can rotate in the direction of the arrow $\alpha_{33}$ which is the same direction as the rotation direction of the stretching roller 32. Due to such idle rollers 33, deflection of the glue belt 31 can be prevented, and therefore the sheet-like material M1 can be stably transported.

In the configuration shown in FIG. 28, the transporting section 3 is configured to have a belt-transported configuration. However, the invention is not limited thereto, and for example, the transporting section 3 may have a configuration where the sheet-like material M1 is transported while being held on a stage by adsorption due to a negative pressure, that is, a platen.

As shown in FIG. 28, the processing device 1 includes the surface area-increasing processing section (pre-processing section) 4 that performs a preprocessing for increasing a surface area of the sheet-like material M1 which is before the liquid CP containing a cationic polymer is applied in the aggregating section 6. More specifically, as shown in FIG. 28, at an upper side of the glue belt 31, the surface area-increasing processing section (preprocessing section) 4 is disposed.

Thus, the surface area of the sheet-like material M1 is increased, and the alien substances AS contained in the sheet-like material M1 and the liquid cationic polymer (CP) containing a cationic polymer can be more efficiently brought in contact with each other. In addition, in a state before the surface area-increasing step, the alien substances AS that exist in narrow interstices between the fibers FB at deep sites (sites at a lower side than the upper side surface in FIG. 28) in the sheet-like material M1, and the alien substances AS that have penetrated into interiors of the fibers FB can be more efficiently brought into contact with the liquid cationic polymer (CP) containing a cationic polymer in the aggregating section (alien substance-aggregating section) 6. In view of this, it is possible to more efficiently remove the alien substances AS in the sheet-like material M1.

The surface area-increasing processing section (preprocessing section) 4 may have any configuration as long as it can perform a preprocessing for increasing the surface area of the sheet-like material M1, and in the present embodiment, it is a fluffing section for fluffing the sheet-like material M1.

Thus, with respect to the sheet-like material M1, it is possible to efficiently perform a process for increasing the surface area of the sheet-like material M1 in a short time. In addition, by fluffing the sheet-like material M1, an efficiency of the defibrating step performed on a downstream side is also improved. In view of this, it is possible to improve a processing rate of the sheet-like material M1.

Here, "fluffing" will be described.

The fibers FB contained in the sheet-like material M1 are in a state of sleeping, that is, a lying-down state, as shown in FIG. 31, until the surface area-increasing step (fluffing step) is performed. In the state shown in FIG. 31, the fibers FB lye down in the same direction, that is, on the right side in FIG. 31, but some of the fibers FB may lye down in mutually different directions. By going through surface area-increasing step (fluffing step), the fibers FB that are at least near the surface are raised, that is, made to stand, as shown in FIG. 32, as compared with the state shown in FIG. 31. This is called "fluffing". A standing state of the fibers FB is maintained until the liquid CP containing a cationic polymer is applied to the sheet-like material M1 in the aggregating step.

As shown in FIG. 28, the surface area-increasing processing section (fluffing section) 4 has the brush 41. Such brush 41 has the rotatably-supported cylindrical or columnar core portion 411, and the brush bristles 412 provided on an outer peripheral portion of the core portion 411.

The core portion 411 is connected to a motor (not shown) and can be rotated together with the brush bristles 412 in the direction of the arrow $\alpha_{41}$ by driving of such motor.

The brush bristles 412 are implanted over the entire periphery of the outer peripheral portion of the core portion 411. The brush bristles 412 are, for example, formed of a flexible resin material such as polyamide or polyester.

In addition, the tips of the brush bristles 412 may be sharp or may be rounded.

As the brush 41 rotates in the direction of the arrow $\alpha_{41}$, in the sheet-like material M1 passing right thereunder, the fibers FB come into contact with the brush bristles 412 of the brush 41 and are forcefully pushed back to a direction opposite to the transporting direction $\alpha_{31}$, that is, the upstream side. Thus, in the sheet-like material M1, the fibers FB becomes a fluffed state, that is, the fibers FB change from the state shown in FIG. 31 to the state shown in FIG. 32. Due to such a state, the alien substances AS contained in the raw material M1 can be lifted up as much as possible from the fibers FB, and therefore the fibers FB are easily removed in the removing section 5.

The brush 41 is configured to rotate in the direction of the arrow $\alpha_{41}$ in the present embodiment. However, the invention is not limited thereto, and, for example, the brush 41 may be configured to rotate in a direction opposite to the direction of the arrow $\alpha_{41}$, or it may be configured to alternately perform the rotation in the ma direction and in a direction opposite to the $\alpha_{41}$ direction in a periodic manner.

Further, although the brush 41 is configured to rotate in the present embodiment, the invention is not limited thereto, and the brush 41 may, for example, be configured to move in a direction opposite to the transporting direction $\alpha_{31}$ or in the same direction as the transporting direction $\alpha_{31}$.

Further, downward of the brush 41, one of the idle rollers 33 is positioned along the glue belt 31 (such idle roller 33 is hereinafter referred to as "idle roller 33a"). Due to such idle roller 33a, the brush 41 can be more reliably pressed against the sheet-like material M1 from an upper side, and therefore the brush bristles 412 and the fibers FB sufficiently come into contact with each other. Thus, the fibers FB can be fluffed without excess or deficiency.

Further, the processing device 1 includes, on a downstream side of the surface area-increasing processing section (fluffing section) 4 (between the surface area-increasing processing section 4 and the removing section 5), the aggregating section (alien substance-aggregating section) 6 that aggregates the alien substances AS, which are contained in the sheet-like material (raw material) M1, by applying the liquid CP containing a cationic polymer to the sheet-like material M1. The aggregating step (alien substance-aggregating step) performed by such aggregating section 6 is performed between the surface area-increasing step and the removing step (alien substance-removing step).

The aggregating section 6 is disposed at an upper side of the glue belt 31 and is capable of supplying the liquid CP containing a cationic polymer from upward to the sheet-like material M1. Thus, the alien substances AS can be aggregated on the sheet-like material M1 to form aggregates AG (see FIG. 33). More specifically, by applying the liquid CP containing a cationic polymer, relatively large aggregates AG can be efficiently formed by an electrical action between the cationic polymer and the alien substances AS. In addition, even in a case where the alien substances AS are firmly bonded to the fibers FB, by using the liquid CP containing a cationic polymer, a bonding force between the fibers FB and the alien substances AS can be weakened to efficiently form relatively large aggregates AG. Further, by using the liquid CP, the cationic polymer can suitably penetrate into narrow interstices between the fibers FB and into interiors of the fibers FB. Therefore, it is possible to efficiently remove the alien substances AS existing in such sites.

The aggregated alien substances AS have a size that can be easily removed in the removing step (alien substance-removing step).

Therefore, the aggregated alien substances AS are easily removed from the sheet-like material M1 by operation of the removing section (alien substance-removing section) 5.

Such an effect is more remarkably exerted in a case where the alien substances AS are those having an electric charge (in particular, anionic alien substances AS).

The liquid CP containing a cationic polymer may be, for example, a melt of the cationic polymer, a dispersion in which the cationic polymer is dispersed, or the like, and is preferably a solution of the cationic polymer.

Thus, it is possible to effectively suppress inadvertent compositional variations in the liquid CP, and to more precisely control the amount applied of the cationic polymer. In addition, in a case where the liquid CP containing a cationic polymer is a solution, formation of aggregates AG is promoted at the time of being brought into contact with the alien substances AS. Further, in a case where the liquid CP containing a cationic polymer is a solution, the cationic polymer can more suitably penetrate into narrow interstices between the fibers FB and into interiors of the fibers FB, and can efficiently remove the alien substances AS existing in such sites.

In a case where the liquid CP is a dispersion containing the cationic polymer as a dispersoid, an average particle diameter of the cationic polymers in the liquid CP is preferably from 0.1 µm to 100 µm, more preferably from 0.5 µm to 50 µm, and still more preferably 1.0 µm to 30 µm.

Thus, it is possible to more effectively prevent aggregation of the cationic polymer (dispersoid) in the liquid CP, and to effectively suppress inadvertent compositional variations in the liquid CP, thereby improving a storage stability of the liquid CP. In addition, in view of this, it is possible to more precisely control the amount applied of the cationic polymer. Further, in a case where the average particle diameter of the cationic polymers is within the above-mentioned range, the cationic polymer can more suitably penetrate into narrow interstices between the fibers FB and into interiors of the fibers FB, and can efficiently remove the alien substances AS existing in such sites.

In the invention, the average particle diameter means an average particle diameter on a volume basis.

A content of the cationic polymer in the liquid CP is not particularly limited, and is preferably 0.0001% by mass to 50% by mass, more preferably 0.001% by mass to 40% by mass, and still more preferably 0.01% by mass to 30% by mass.

Thus, it is possible to more effectively remove the alien substances AS while suppressing the amount used of the cationic polymer.

A method of applying the liquid CP containing a cationic polymer to the sheet-like material M1 is not particularly limited. Examples thereof include a spraying method, a coating method, a printing method, and a dipping method, and among these, at least one of the spraying method and the coating method is preferably used to apply the liquid CP containing a cationic polymer to the sheet-like material M1.

Thus, for example, the liquid CP containing a desired amount of a cationic polymer can be efficiently applied to desired sites of the sheet-like material M1. Therefore, it is possible to more efficiently remove the alien substances AS while suppressing the amount used of the liquid cationic polymer (CP) containing a cationic polymer.

A weight per unit area of the liquid CP containing a cationic polymer to be applied to the sheet-like material M1 is not particularly limited, and is preferably 1 μg/m² to 50 g/m², more preferably 5 μg/m² to 40 g/m², and still more preferably 10 μg/m² to 30 g/m².

Thus, it is possible to more efficiently remove the alien substances AS while suppressing the amount used of the liquid cationic polymer (CP) containing a cationic polymer.

In a case where the liquid CP containing a cationic polymer is applied to specific sites (for example, sites on which printing had been performed) of the sheet-like material M1 in a selective manner, the weight per unit area of the liquid CP containing a cationic polymer in the specific sites preferably satisfies the above-mentioned conditions.

Further, by applying the liquid CP containing a cationic polymer to such specific sites in a selective manner, the amount used of the liquid cationic polymer (CP) containing a cationic polymer can be more effectively suppressed. In addition, since it is possible to shorten the time required for removal of the aggregates AG and removal of an excess of the cationic polymer, it is possible to improve a processing rate of the sheet-like material M1.

By using a detection means, which is not shown, in advance (for example, in an optical manner) to specify sites (to obtain coordinates of the sites) containing the alien substances AS on the sheet-like material M1, it is possible to suitably perform an application of the liquid CP containing a cationic polymer on specific sites in a selective manner. In addition, the content (absolute content or relative content) of the alien substances AS at each site of the sheet-like material M1 may be measured (for example, in an optical manner) by a detection means which is not shown, and based on the measurement results, the amount applied of the liquid CP containing a cationic polymer may be adjusted.

The cationic polymer contained in the liquid CP is not particularly limited as long as it is a cationic polymeric material, and it is preferable that the cationic polymer contain an amine in a repeating structure thereof.

Thus, it is possible to more efficiently remove the alien substances AS contained in the sheet-like material M1.

The amine is a concept including an amino group (—NH₂), a monoalkylamino group (—NHR), a dialkylamino group (—NRR'), a trialkylammonium group (—N⁺RR'R''), and the like.

In particular, the cationic polymer is preferably represented by Formula (1).

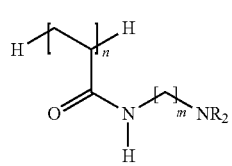

(1)

(In Formula (1), n is an integer of 2 or more, m is an integer of 1 to 5, and R is a hydrogen atom or an alkyl group having 1 to 4 carbon atoms.)

Thus, it is possible to more efficiently remove the alien substances AS contained in the sheet-like material M1. In addition, such cationic polymer can be relatively easily synthesized and can be produced at relatively low cost.

Among these, the cationic polymer preferably has Formula (1) in which m is 3 and R is a methyl group.

Thus, the above-mentioned effects are more remarkably exerted.

In addition, the cationic polymer may be represented by Formula (2).

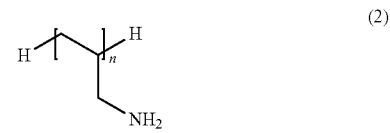

(2)

(In Formula (2), n is an integer of 2 or more.)

In a case where the liquid CP containing the cationic polymer is a solution in which the cationic polymer is dissolved or a dispersion in which the cationic polymer is dispersed, examples of a solvent constituting the solution and a dispersion medium constituting the dispersion include water; (poly)alkylene glycol monoalkyl ethers such as ethylene glycol monomethyl ether, ethylene glycol monoethyl ether, propylene glycol monomethyl ether, and propylene glycol monoethyl ether; carbitols such as carbitol and ester compounds thereof (for example, carbitol acetate); cellosolbs such as cellosolve and ester compounds thereof (for example, cellosolve acetate); ketones such as methyl ethyl ketone, acetone, methyl isobutyl ketone, ethyl n-butyl ketone, diisopropyl ketone, and acetyl acetone; alcohols, for example, a monohydric alcohol such as methanol, ethanol, propanol, or butanol, and a polyhydric alcohol such as ethylene glycol, propylene glycol, dipropylene glycol, butanediol, glycerin, or 1,3-butylene glycol; ionic liquids such as tetraalkylammonium acetate (for example, tetrabutylammonium acetate); and one type or two or more types selected therefrom can be used in combination, and one containing water is preferable. In addition, for example, even in a case where removal of the liquid component (solvent or dispersion medium) in the processing device 1 is insufficient, the manufacturing method of the sheet S and a quality of the manufactured sheet S are hardly adversely affected.

Thus, in the liquid CP containing the cationic polymer, the cationic polymer can be more suitably ionized.

The pH (pH at 25° C.) of the liquid CP containing the cationic polymer is preferably 5.8 to 7.8, more preferably 6.0 to 7.5, and still more preferably 6.5 to 7.3.

Thus, it is possible to more efficiently remove the alien substances AS while suppressing damages to the sheet-like material M1 during the process in the processing device 1. In addition, even in a case where the cationic polymer remains in the sheet-like material M1, which has been processed by the processing device 1, occurrence of adverse effects (such as deterioration of the sheet-like material M1) due to the remaining cationic polymer is more effectively suppressed.

Further, the alien substances AS may be anything, and are preferably components of an ink jet ink.

In general, the components of an ink jet ink easily penetrate not only into interstices between the fibers but also into interiors of the fibers, and, in general, it is not easy to remove the component after being applied to a recording medium containing fibers. On the other hand, in the invention, by using the liquid CP containing the cationic polymer, even the component of an ink jet ink can be suitably removed from the sheet-like material M1 containing the fibers FB. Therefore, in a case where the alien substances AS are the components of an ink jet ink, effects according to the invention are more remarkably exerted.

Examples of the component of an ink jet ink include coloring agents such as various dyes or various pigments, dispersants, penetrants, dissolution aids, and pH adjusters.

Further, the alien substances AS may be nonionic substances or cationic substances, and are preferably anionic substances.

Among various substances, the anionic substances particularly strongly interact with the cationic polymer. Therefore, in a case where the alien substances AS are the anionic substances, they can interact with the cationic polymer to more suitably form aggregates AG, and they can be more suitably removed in the removing section 5.

Examples of the anionic substances include negatively chargeable coloring agents such as carbon black; negatively chargeable charge controlling agents or external additives, for example, trimethylethane-based dyes, metal complex salts of salicylic acid, metal complex salts of benzilic acid, copper phthalocyanine, perylene, quinacridone, azo-based pigments, metal-complexed azo-based dyes, heavy metal-containing acidic dyes such as an azo chromium complex, phenolic condensates of calixarene type, cyclic polysaccharides, resins containing a carboxyl group or sulfonyl group, inorganic particulates, for example, metal oxides or hydroxides such as alumina, silica, titania, zinc oxide, zirconium oxide, cerium oxide, talc, and hydrotalcite, metal titanates such as calcium titanate, strontium titanate, and barium titanate, nitrides such as titanium nitride and silicon nitride, carbides such as titanium carbide and silicon carbide, and negatively chargeable organic fine particulates such as acrylic acid-based resins of which main components are an acrylic acid and a derivative thereof, methacrylic acid-based resins of which main components are a methacrylic acid and a derivative thereof, tetrafluoroethylene resins, trifluoroethylene resins, polyvinyl chloride, polyethylene, and polyacrylonitrile; and negatively chargeable binders such as polyester (in particular, binders used for toner).

As shown in FIG. 28, at an upper side of the glue belt 31, the removing section (alien substance-removing section) 5 is disposed on a downstream side of the aggregating section 6.

The removing section 5 is a section that performs the removing step (see FIG. 30) of removing the aggregates AG generated by the aggregating section 6 from the sheet-like material M1.

In the removing section 5, an excess of the cationic polymer may be removed together with the aggregates AG.

Thus, it is possible to more effectively prevent the cationic polymer from inadvertently remaining in the material processed in the processing device 1. In addition, it is also conceivable to provide a removing section (second removing section) for removing the cationic polymer on a downstream side of the removing section 5. However, by removing the excess of the cationic polymer in the removing section 5 (first removing section), the process in the second removing section can be performed in a shorter time, and a structure of the second removing section can be simplified. Further, it is also advantageous in reducing a size of the entire apparatus. Further, by removing the excess of the cationic polymer together with the aggregates AG in the removing section 5, even in a case where the second removing section is not provided, the content of the cationic polymer contained in the processed sheet-like material M1 can be sufficiently decreased, a reliability of the processed sheet-like material M1 can be made sufficiently excellent, and a reliability of the sheet S manufactured by using the sheet manufacturing apparatus 100 can be made excellent.

In a case where the excess of the cationic polymer is removed in the removing section 5, at least a part of the cationic polymer may be removed.

In the present embodiment, the removing section 5 is configured to bring the sheet-like material M1 containing the aggregates AG into contact with the fabric material 51 formed of a nonwoven fabric or a woven fabric, and to cause the aggregates AG to migrate (transferred) to the fabric material 51. The removing section 5 has the fabric material 51, two stretching rollers 52, a multiplicity of idle rollers 53, and a cleaning portion 54.

Thus, it is possible to more efficiently remove the aggregates AG. In addition, in a case where an excess of the cationic polymer remains, the excess of the cationic polymer can be efficiently removed together with the aggregates AG in the removing section 5. Further, in a case where the liquid CP containing the cationic polymer is a solution containing a solvent or a dispersion containing a dispersion medium, the fabric material 51 can also suitably remove the solvent and the dispersion medium by absorption. As a result, a liquid content (for example, moisture content) of the sheet-like material M1 having passed through the removing section 5 can be made lower.

Further, since the fabric material 51 is formed of a nonwoven fabric or a woven fabric, the fabric material 51 can entangle with the aggregates AG and take them out of the sheet-like material M1 in an efficient manner. In addition, in the removing section 5, the fabric material 51 is an endless belt. Thus, for example, in a case where the fabric material 51 is cleaned by the cleaning portion 54, the fabric material 51 can be continuously used as it is to remove the aggregates AG.

The two stretching rollers 52 are disposed apart from each other on the upstream side and the downstream side, and the fabric material 51 is looped therearound. One stretching roller 52 of the two stretching rollers 52 is a driving roller which is connected to a motor (not shown) and rotates in a direction of the arrow $\alpha_{52}$ by driving of such motor. In addition, the other stretching roller 52 is a driven roller which rotates in the direction of the arrow $\alpha_{52}$ similarly to the driving roller as a rotational force from the driving roller is transmitted via the fabric material 51. By the rotation of each stretching roller 52, the fabric material 51 is driven on the glue belt 31 in a direction of an arrow $\alpha_{51}$ which is a direction opposite to the transporting direction $\alpha_{31}$. Thus, the fabric material 51 can cause the aggregates AG to migrate from the sheet-like material M1, that is, adhere to and wipe off them. As a result, the aggregates AG are sufficiently removed, and a state as shown in FIG. 34 is obtained.

Further, in the removing section 5, a driving speed of the fabric material 51 in the direction of the arrow $\alpha_{51}$ can vary by adjusting a rotation number of the driving roller.

A multiplicity of the idle rollers 53 are disposed at equal intervals between the two stretching rollers 52. Along with driving of the fabric material 51, each of the idle rollers 53 can rotate in the direction of the arrow $\alpha_{53}$ which is the same direction as the rotation direction of the stretching roller 52.

Further, downward of the fabric material 51, a plurality of the idle rollers 33 are positioned along the glue belt 31 (hereinafter these idle rollers 33 will be referred to as "idle rollers 33b"). The fabric material 51 can be pressed against the sheet-like material M1 between these idle rollers 33b and the idle rollers 53. Thus, the fabric material 51 and the aggregates AG sufficiently come into contact with each other, and therefore the aggregates AG are sufficiently removed.

In addition, in a configuration shown in FIG. 28, the fabric material 51 is driven in the direction of the arrow $\alpha_{51}$ which is a direction opposite to the transporting direction $\alpha_{31}$. However, the invention is not limited thereto, and the fabric material 51 may, for example, be driven in the same direction as the transporting direction $\alpha_{31}$. In this case, it is preferable that there be a difference between a driving speed of the fabric material 51 and a transporting speed of the sheet-like material M1.

The removing section 5 has the cleaning portion 54 for cleaning the fabric material 51 to which the aggregates AG have migrated. The cleaning portion 54 is disposed upward of the fabric material 51 and is configured to suck the aggregates AG which are adhered to the fabric material 51. Thus, the aggregates AG (alien substances AS) are removed from the fabric material 51, and therefore the fabric material 51 is cleaned. The cleaned fabric material 51 is again used to remove the aggregates AG (alien substances AS).

Eleventh Embodiment

Figure 35:
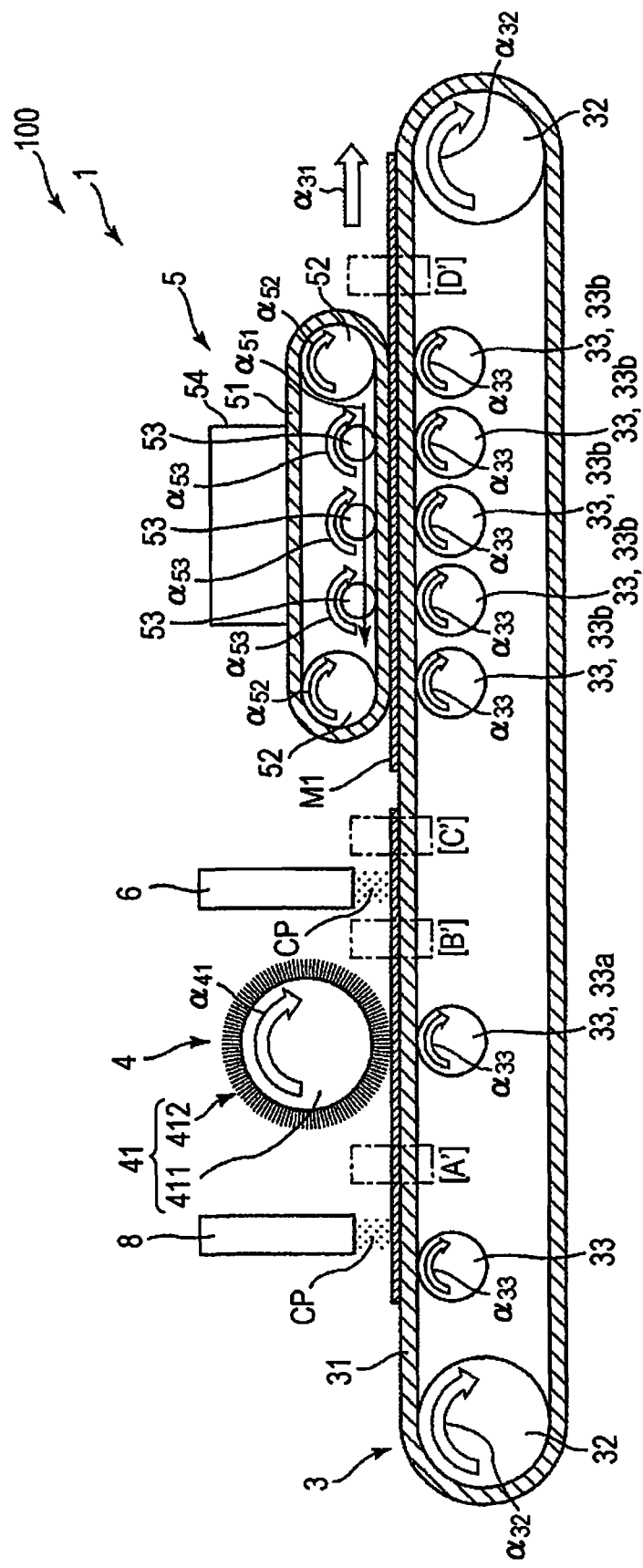
FIG. 35 is a schematic side view showing a configuration of an upstream side (processing device of the invention) of the sheet manufacturing apparatus (eleventh embodiment) of the invention.
Figure 36:
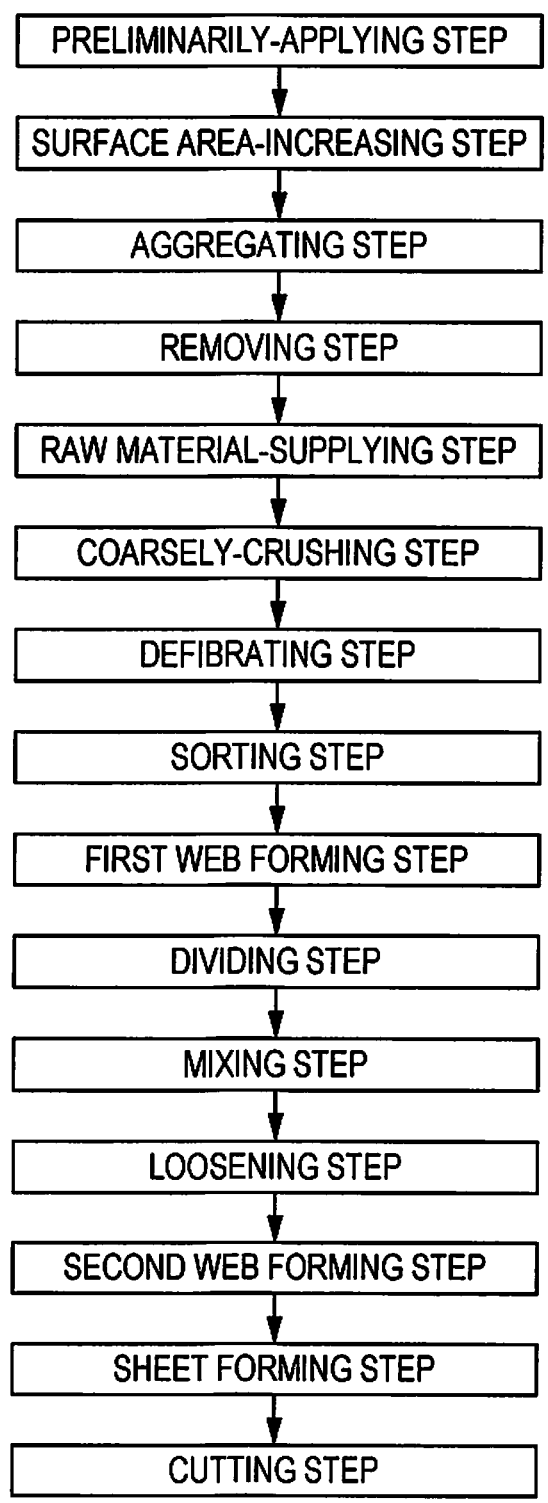
FIG. 36 is a diagram sequentially illustrating steps performed by the sheet manufacturing apparatus (eleventh embodiment) of the invention.
Figure 37:
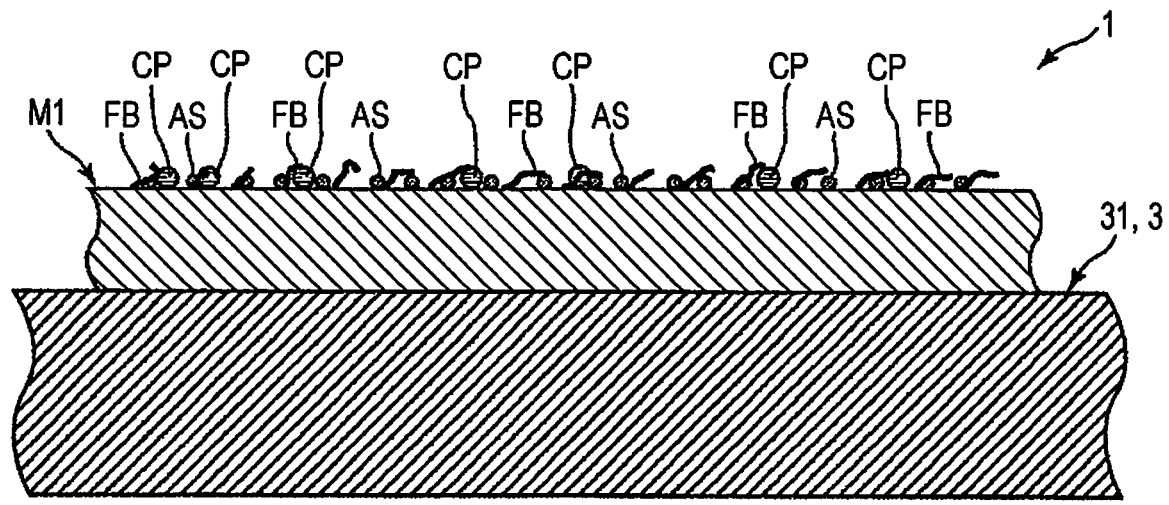
FIG. 37 is an image diagram sequentially showing a state of the sheet-like material processed by the processing device shown in FIG. 35 (enlarged view of a region [A'] surrounded by a dot-and-dash line in FIG. 35).
Figure 38:
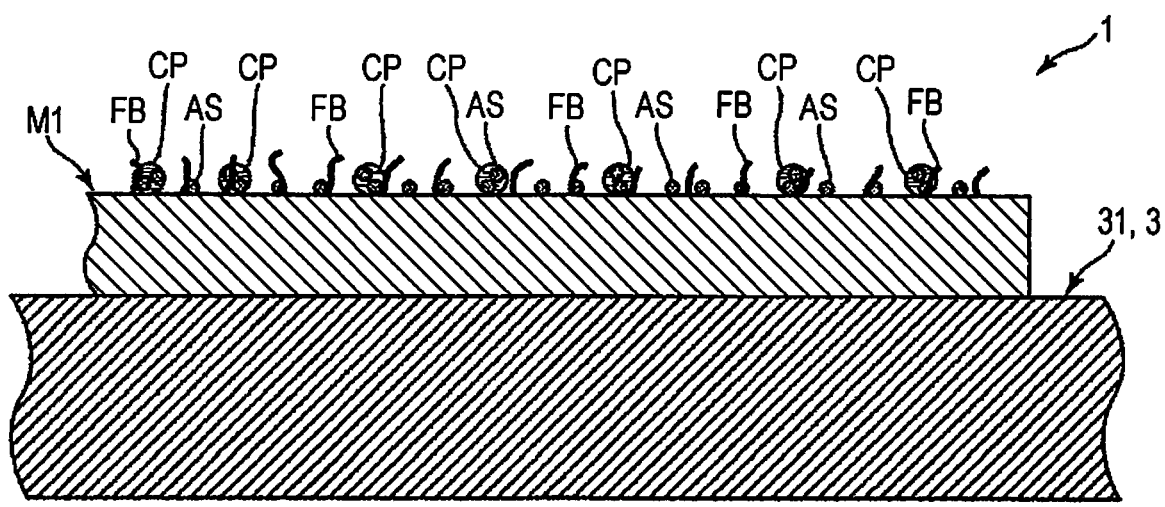
FIG. 38 is an image diagram sequentially showing a state of the sheet-like material processed by the processing device shown in FIG. 35 (enlarged view of a region [B'] surrounded by a dot-and-dash line in FIG. 35).
Figure 39:
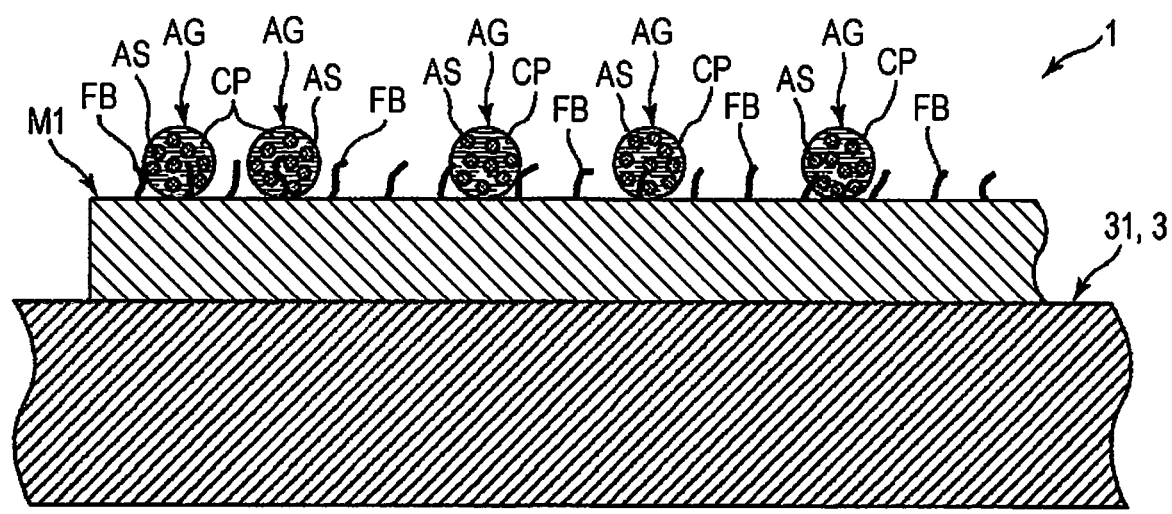
FIG. 39 is an image diagram sequentially showing a state of the sheet-like material processed by the processing device shown in FIG. 35 (enlarged view of a region [C'] surrounded by a dot-and-dash line in FIG. 35).
Figure 40:
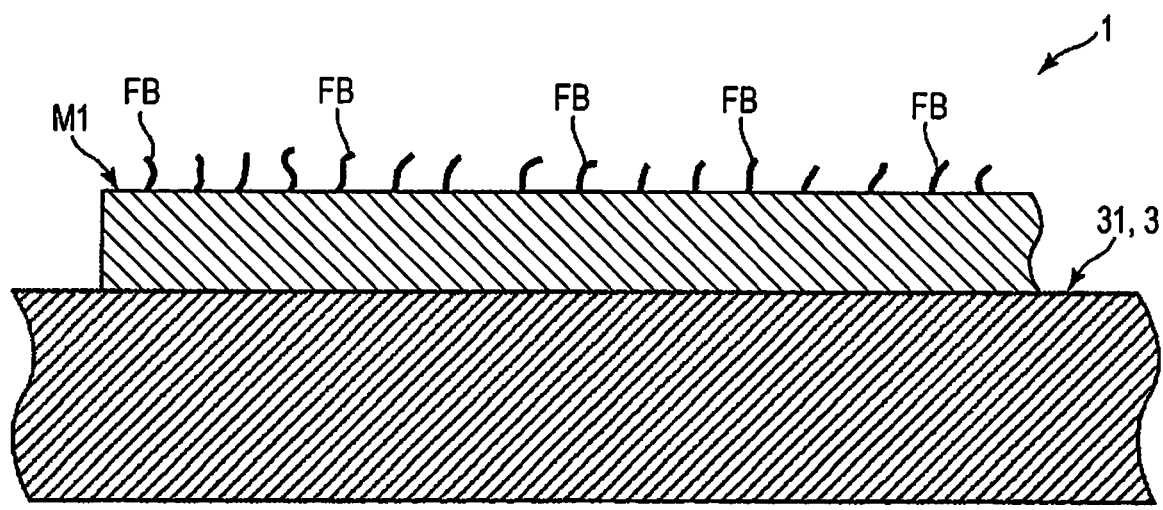
FIG. 40 is an image diagram sequentially showing a state of the sheet-like material processed by the processing device shown in FIG. 35 (enlarged view of a region [D'] surrounded by a dot-and-dash line in FIG. 35).

FIG. 35 is a schematic side view showing a configuration of an upstream side (processing device of the invention) of the sheet manufacturing apparatus (eleventh embodiment) of the invention. FIG. 36 is a diagram sequentially illustrating steps performed by the sheet manufacturing apparatus (eleventh embodiment) of the invention. FIGS. 37 to 40 are image diagrams, each sequentially showing a state of the sheet-like material processed by the processing device shown in FIG. 35 (FIG. 37 is an enlarged view of a region [A'] surrounded by a dot-and-dash line in FIG. 35; FIG. 38 is an enlarged view of a region [B'] surrounded by a dot-and-dash line in FIG. 35; FIG. 39 is an enlarged view of a region [C'] surrounded by a dot-and-dash line in FIG. 35; and FIG. 40 is an enlarged view of a region (D'] surrounded by a dot-and-dash line in FIG. 35).

Hereinafter, the eleventh embodiment of the processing device, the sheet manufacturing apparatus, the processing method, and the manufacturing method of a sheet of the invention will be described with reference to these drawings. However, descriptions will be made on the differences from the above-described embodiment and descriptions will be omitted for the similar matters.

The present embodiment is the same as the above-described tenth embodiment except that the preliminarily-applying section is provided.

As shown in FIG. 35, in the present embodiment, the preliminarily-applying section (first liquid applying section) 8 is configured to apply the liquid CP containing a cationic polymer to the sheet-like material M1, so that in the surface area-increasing processing section (preprocessing section) 4 provided on a downstream side thereof, a preprocessing for increasing the surface area of the sheet-like material M1 is performed, and in the aggregating section 6 (liquid applying section or second liquid applying section) provided on a downstream side thereof, the liquid CP containing a cationic polymer is applied to the sheet-like material M1. In other words, the processing device 1 of the present embodiment further includes the preliminarily-applying section 8 for preliminarily applying the liquid CP containing a cationic polymer to the sheet-like material M1 on an upstream side of the surface area-increasing processing section 4. The preliminarily-applying step performed by such preliminarily-applying section 8 is performed before the surface area-increasing step.

With such a configuration, it is possible to more efficiently form the aggregates AG. More specifically, by applying, in advance, the liquid CP containing a relatively small amount of the cationic polymer to the sheet-like material M1, which is supplied to the surface area-increasing processing section 4, in the preliminarily-applying section 8, in a case where a process for increasing the surface area of the sheet-like material M1 is performed in the surface area-increasing processing section 4, it is possible to cause the liquid CP containing the cationic polymer, which is applied in the preliminarily-applying section 8, to efficiently penetrate into interstices between the fibers FB or to efficiently penetrate into interiors of the fibers FB while effectively preventing a large amount of the liquid CP from adhering to the surface area-increasing processing section 4. As a result, alien substances AS contained in these sites can be efficiently brought into contact with the cationic polymer. By further adding the liquid CP containing the cationic polymer to the sheet-like material M1 in the aggregating section 6 (second liquid applying section) on a downstream side of the surface area-increasing processing section 4, the newly added liquid CP containing the cationic polymer comes into contact with the cationic polymer which was in contact with the alien substances AS on an upstream side thereof, and aggregates AG having a form which is larger and easier to remove are formed. In view of this, it is possible to more efficiently form the aggregates AG. In addition, even in a case where the amount used of the cationic polymer (liquid CP) as a whole is suppressed, the alien substances AS can be sufficiently removed.

A state of the sheet-like material M1 in each step is as shown in FIGS. 37 to 40.

That is, in the preliminarily-applying step, in a state where the liquid CP containing a relatively small amount of the cationic polymer is preliminarily applied, growth (coarsening) of the aggregates AG hardly progresses (see FIG. 37).

In the surface area-increasing step, an external force is applied by the surface area-increasing processing section (fluffing section) 4 to increase the surface area of the sheet-like material and to promote the contact between the cationic polymer and the alien substances AS, thereby causing the growth of the aggregates AG to progress (See FIG. 38).

In a case where the liquid CP containing the cationic polymer is further added in the aggregating step, the growth of the aggregates AG further progresses (see FIG. 39).

In a subsequent removing step, the aggregates AG are sufficiently removed, and a state as shown in FIG. 40 is obtained.

A weight per unit area of the liquid CP containing the cationic polymer to be applied to the sheet-like material M1 in the preliminarily-applying section 8 is usually smaller than the weight per unit area of the liquid CP containing the cationic polymer to be applied to the sheet-like material M1 in the aggregating section 6.

Specifically, the weight per unit area of the liquid CP containing the cationic polymer to be applied to the sheet-like material M1 in the preliminarily-applying section 8 is not particularly limited, and is preferably 0.01 µg/m$^2$ to 10 g/m², more preferably 0.10 μg/m² to 5 g/m², and still more preferably 0.30 μg/m² to 1 g/m².

Thus, it is possible to more efficiently remove the alien substances AS while suppressing the amount used of the liquid CP containing the cationic polymer.

Further, the amount of the cationic polymer to be applied to the sheet-like material M1 in the preliminarily-applying section 8 is preferably 0.1 parts by mass to 30 parts by mass, more preferably 0.2 parts by mass to 25 parts by mass, and still more preferably 0.3 parts by mass to 20 parts by mass, with respect to 100 parts by mass of the cationic polymer to be applied to the sheet-like material M1 in the aggregating section 6.

Thus, it is possible to more effectively remove the alien substances AS while suppressing the amount used of the cationic polymer.

By using a detection means, which is not shown, in advance (for example, in an optical manner) to specify sites (to obtain coordinates of the sites) containing the alien substances AS on the sheet-like material M1, it is possible to perform an application of the liquid CP containing a cationic polymer by the preliminarily-applying section 8 on specific sites in a selective manner. In addition, the content (absolute content or relative content) of the alien substances AS at each site of the sheet-like material M1 may be measured (for example, in an optical manner) by a detection means which is not shown, and based on the measurement results, the amount applied of the liquid CP containing the cationic polymer by the preliminarily-applying section 8 may be adjusted.

Further, the content (absolute content or relative content) of the alien substances AS in the sheet-like material M1 may be measured (for example, in an optical manner) in advance by a detection means which is not shown, and based on the measurement results, operation of the preliminarily-applying section 8 and the aggregating section 6 may be controlled. For example, in a case where the content of the alien substances AS is large, the preliminarily-applying section 8 and the aggregating section 6 may be operated, and in a case where the content of the alien substances AS is small, the aggregating section 6 may be operated and operation of the preliminarily-applying section 8 may be stopped.

The liquid CP containing the cationic polymer to be applied to the sheet-like material M1 in the preliminarily-applying section 8 and the liquid CP containing the cationic polymer to be applied to the sheet-like material M1 in the aggregating section 6 may be the same as or different from each other, for example, in terms of conditions such as a composition of the liquid CP containing the cationic polymer (for example, composition of the cationic polymer, content of the cationic polymer, content or composition of components other than the cationic polymer such as solvent or dispersion medium).

In particular, by setting the content of the cationic polymer in the liquid CP containing the cationic polymer to be applied to the sheet-like material M1 in the preliminarily-applying section 8 to be lower than the liquid CP containing the cationic polymer to be applied to the sheet-like material M1 in the aggregating section 6, the amount applied of the cationic polymer in each step can be easily controlled.

Twelfth Embodiment

The processing device 1 of the invention includes the aggregating section (alien substance-aggregating section) 6 that aggregates the alien substances AS contained in the sheet-like material (raw material) M1 containing the fibers FB by applying the ionic substance (aggregating material) IS of a polyvalent metal ion to the sheet-like material M1, and the removing section (alien substance-removing section) 5 that removes the aggregates AG generated by the aggregating section 6 from the sheet-like material M1.

Further, the processing method of the invention includes the aggregating step of aggregating the alien substances AS contained in the sheet-like material M1 (raw material) containing the fibers FB by applying the ionic substance IS of a polyvalent metal ion to the sheet-like material M1, and the removing step of removing the aggregates AG generated by the aggregating step from the sheet-like material M1. Such method is executed by the processing device 1.

According to the invention as described above, as described later, prior to removing the alien substances AS contained in the sheet-like material M1, the alien substances AS contained in the sheet-like material M1 are brought into contact with the ionic substance IS to form the aggregates AG. Such aggregates AG are relatively large and are easily removed. Therefore, this makes it easy to remove the alien substances AS from the sheet-like material M1, and the alien substances AS can be sufficiently removed from the sheet-like material M1. In particular, it is possible to suitably remove the alien substances AS which have penetrated into narrow interstices between the fibers FB and into interiors of the fibers FB.

That is, the process according to the invention is said to be a de-inking process of a waste paper. A de-inking process in the related art is, in general, a process which includes dispersing a waste paper in water, releasing a coloring agent in a mechanical and chemical manner (with surfactants, alkaline chemicals, and the like), and removing a coloring material by a floating method, a screen washing method, or the like. However, in the invention, it is possible to perform de-inking without having to soak a waste paper in water. This is said to be a dry de-inking technique.

The sheet manufacturing apparatus 100 of the invention includes the processing device 1.

In addition, the manufacturing method of a sheet of the invention includes the aggregating step of aggregating the alien substances AS contained in the sheet-like material (raw material) M1 containing the fibers FB by applying the ionic substance (aggregating material) IS of a polyvalent metal ion to the sheet-like material M1, and the removing step of removing the aggregates AG generated by the aggregating step from the sheet-like material M1, in which the sheet S is manufactured from the sheet-like material M1 from which the alien substances AS have been removed. Such method is executed by the sheet manufacturing apparatus 100.

According to the invention as described above, it is possible to further manufacture (regenerate) the sheet S from the sheet-like material M1 from which the alien substances AS have been removed, while enjoying advantages of the above-described processing device 1 (processing method).

Figure 41:
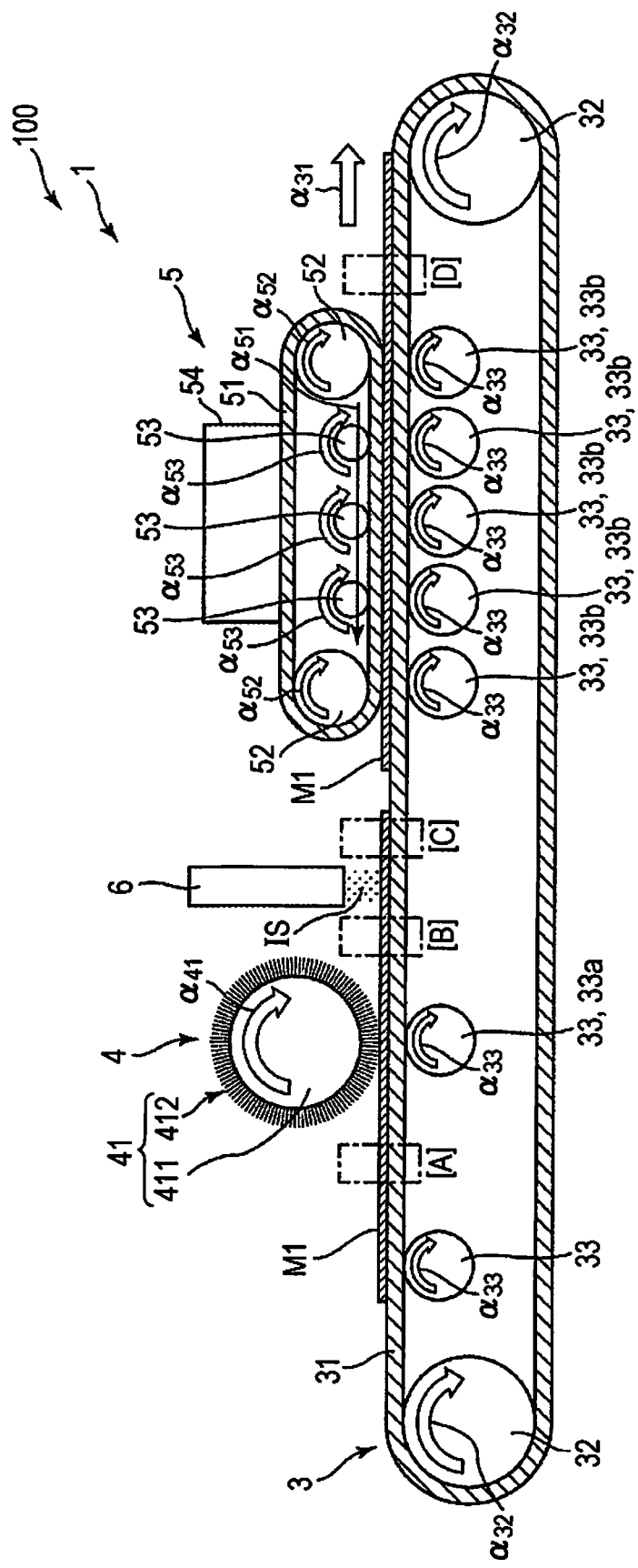
FIG. 41 is a schematic side view showing a configuration of an upstream side (processing device of the invention) of the sheet manufacturing apparatus (twelfth embodiment) of the invention.
Figure 42:
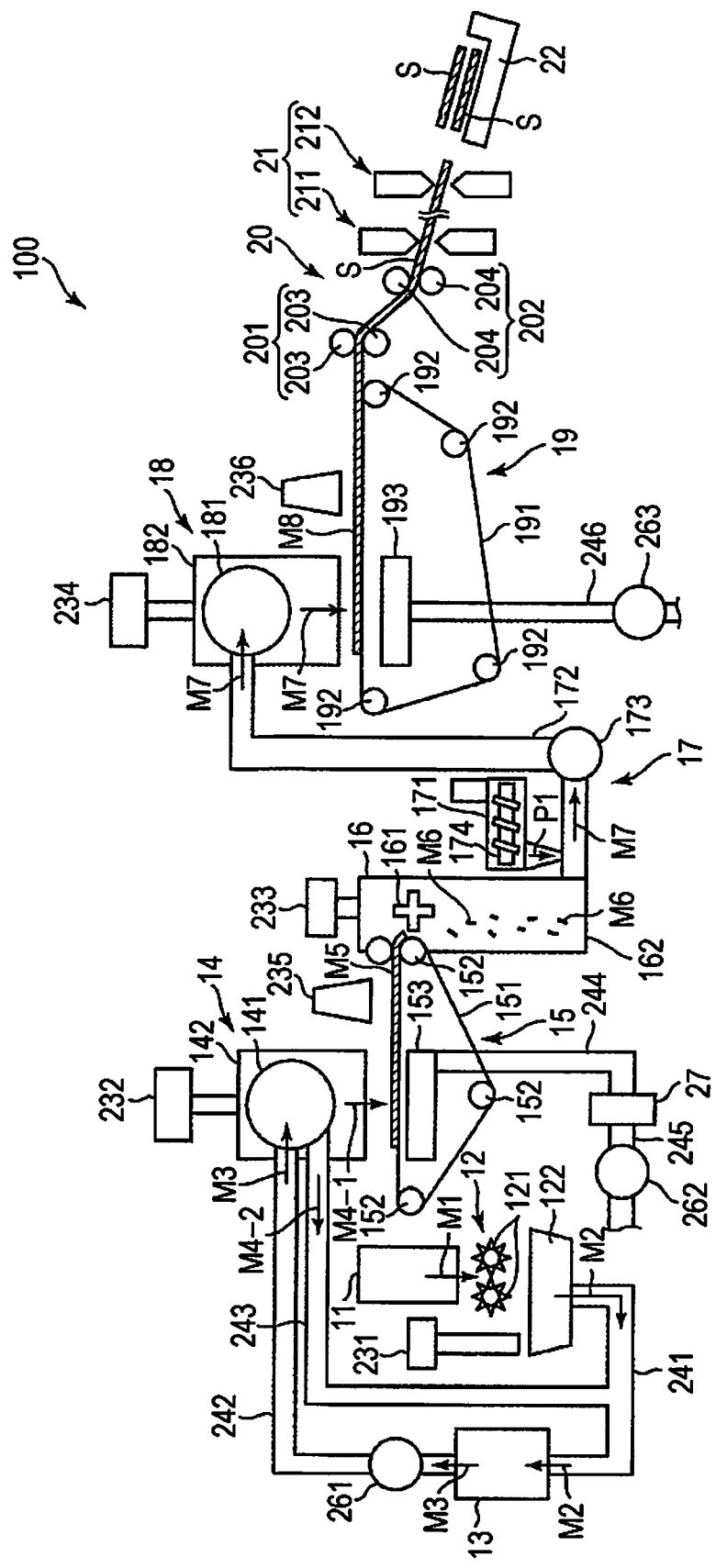
FIG. 42 is a schematic side view showing a configuration of a downstream side of the sheet manufacturing apparatus (twelfth embodiment) of the FIG. 43 is a diagram sequentially illustrating steps performed by the sheet manufacturing apparatus (twelfth embodiment) of the invention.
Figure 43:
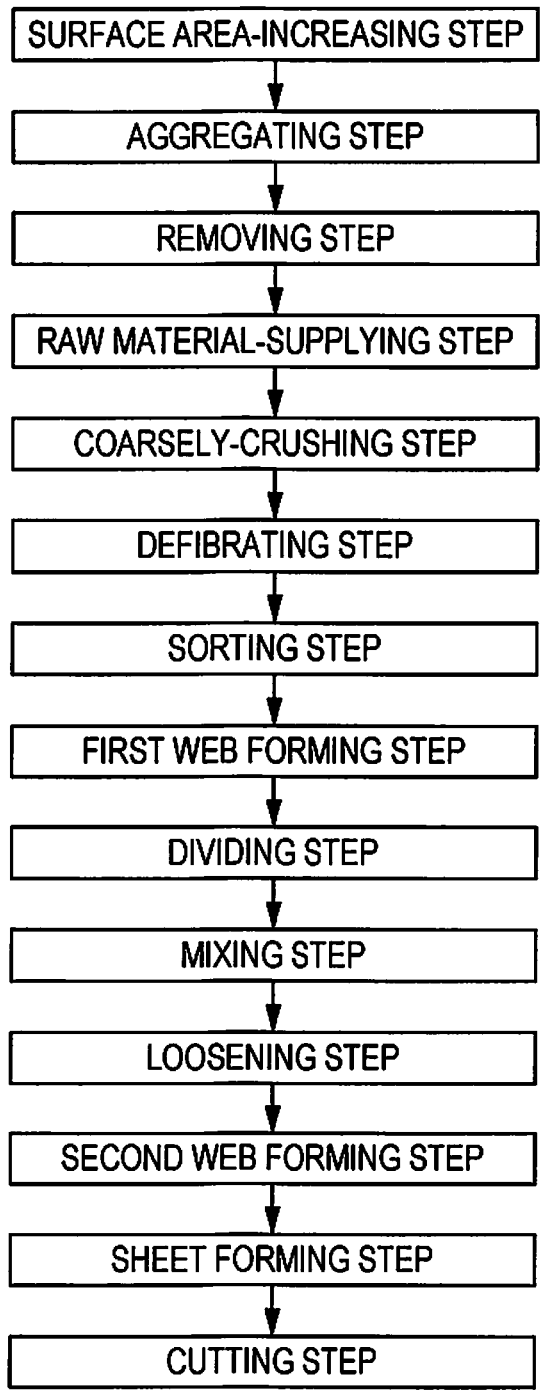
Figure 44:
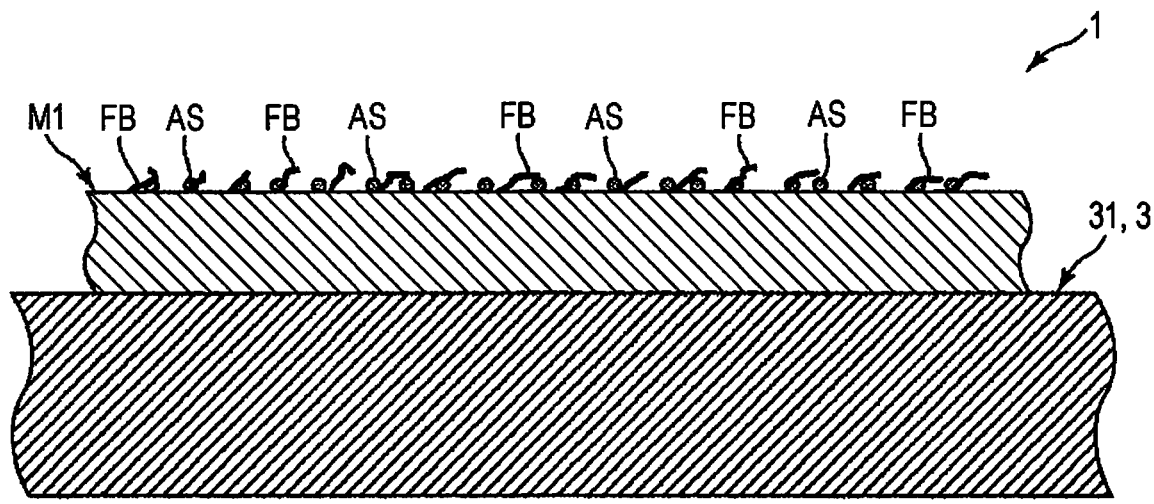
FIG. 44 is an image diagram sequentially showing a state of the sheet-like material processed by the processing device shown in FIG. 41 (enlarged view of a region [A] surrounded by a dot-and-dash line in FIG. 41).
Figure 45:
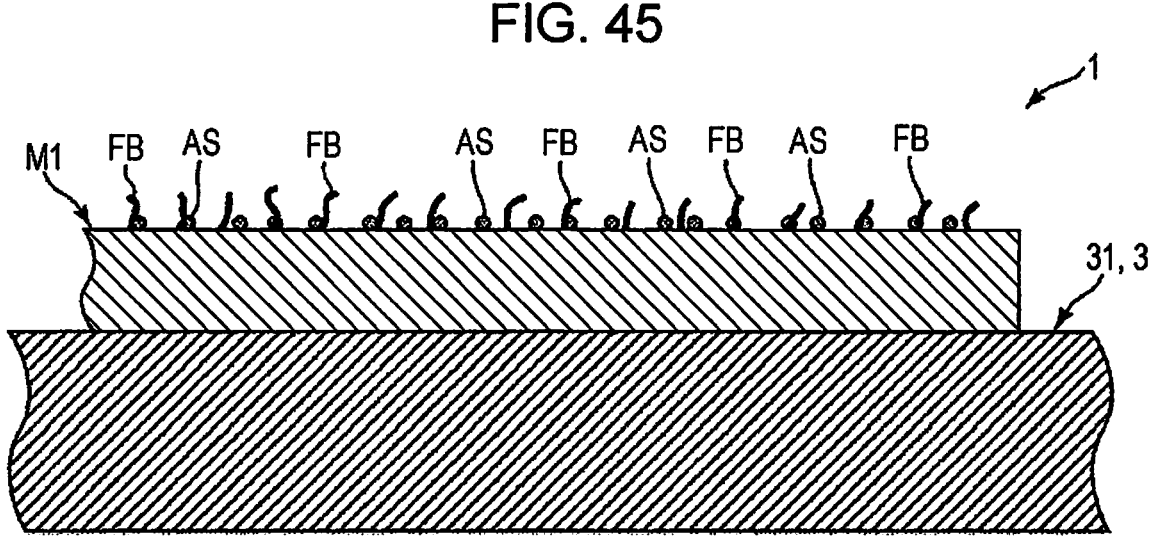
FIG. 45 is an image diagram sequentially showing a state of the sheet-like material processed by the processing device shown in FIG. 41 (enlarged view of a region [B] surrounded by a dot-and-dash line in FIG. 41).
Figure 46:
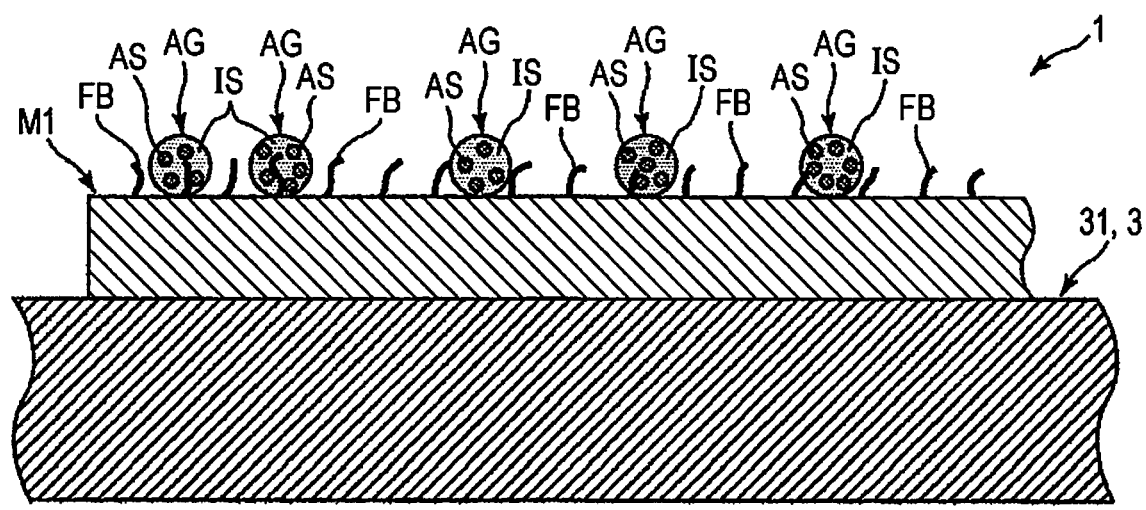
FIG. 46 is an image diagram sequentially showing a state of the sheet-like material processed by the processing device shown in FIG. 41 (enlarged view of a region [C] surrounded by a dot-and-dash line in FIG. 41).
Figure 47:
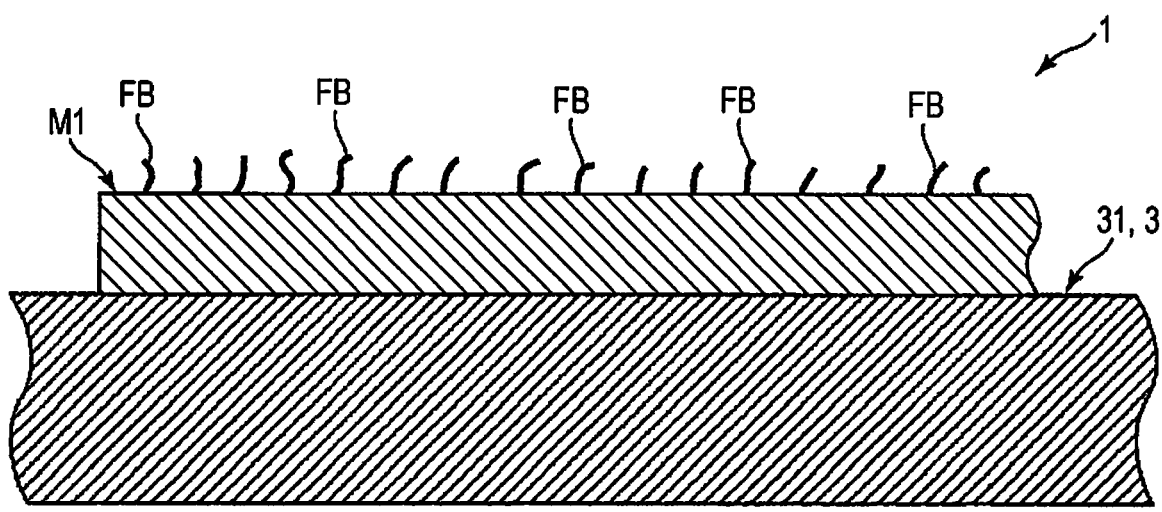
FIG. 47 is an image diagram sequentially showing a state of the sheet-like material processed by the processing device shown in FIG. 41 (enlarged view of a region [D] surrounded by a dot-and-dash line in FIG. 41).

FIG. 41 is a schematic side view showing a configuration of an upstream side (processing device of the invention) of the sheet manufacturing apparatus (twelfth embodiment) of the invention. FIG. 42 is a schematic side view showing a configuration of a downstream side of the sheet manufacturing apparatus (twelfth embodiment) of the invention. FIG. 43 is a diagram sequentially illustrating steps performed by the sheet manufacturing apparatus (twelfth embodiment) of the invention. FIGS. 44 to 47 are image diagrams, each sequentially showing a state of the sheet-like material processed by the processing device shown in FIG. 41 (FIG. 44 is an enlarged view of a region [A] surrounded by a dot-and-dash line in FIG. 41; FIG. 45 is an enlarged view of a region [B] surrounded by a dot-and-dash line in FIG. 41; FIG. 46 is an enlarged view of a region [C] surrounded by a dot-and-dash line in FIG. 41; and FIG. 47 is an enlarged view of a region [D] surrounded by a dot-and-dash line in FIG. 41). Hereinafter, for convenience of description, in FIGS. 41, 42, and 44 to 47 (the same applies to FIGS. 48 and 50 to 53), an upper side may be referred to as "upper" or "upward"; a lower side may be referred to as "lower" or "downward"; a left side may be referred to as "left" or "upstream side"; and a right side may be referred to as "right" or "downstream side."

As shown in FIG. 41, the sheet manufacturing apparatus 100 includes the processing device 1 on an upstream side thereof. Such processing device 1 includes the transporting section 3, the surface area-increasing processing section (preprocessing section) 4, the aggregating section (alien substance-aggregating section) 6, and the removing section (alien substance-removing section) 5.

Further, as shown in FIG. 42, the sheet manufacturing apparatus 100 includes, on a downstream side thereof, the raw material-supplying section 11, the coarsely-crushing section 12, the defibrating section 13, the sorting section 14, the first web forming section 15, the subdividing section 16, the mixing section 17, the loosening section 18, the second web forming section 19, the sheet forming section 20, the cutting section 21, and the stocking section 22. In addition, the sheet manufacturing apparatus 100 includes the humidifying section 231, the humidifying section 232, the humidifying section 233, and the humidifying section 234.

Operation of each section of the sheet manufacturing apparatus 100 is controlled by a controlling section (not shown).

As shown in FIG. 43, in the present embodiment, the manufacturing method of a sheet includes a surface area-increasing step (preprocessing step), the aggregating step (alien substance-aggregating step), the removing step (alien substance-removing step), the raw material-supplying step, the coarsely-crushing step, the defibrating step, the sorting step, the first web forming step, the cutting step, the mixing step, the loosening step, the second web forming step, the sheet forming step, and the cutting step. The sheet manufacturing apparatus 100 can sequentially perform these steps. In addition, among these steps, steps performed by the processing device 1 are the surface area-increasing step (preprocessing step), the aggregating step (alien substance-aggregating step), and the removing step (alien substance-removing step).

Hereinafter, a configuration of each section included in the sheet manufacturing apparatus 100 will be described.

First, a configuration of the downstream side of the sheet manufacturing apparatus 100 will be described, and then a configuration of the upstream side of the sheet manufacturing apparatus 100, that is, the processing device 1 will be described.

The raw material-supplying section 11 is a section that performs the raw material-supplying step (see FIG. 43) of supplying the sheet-like material M1 to the coarsely-crushing section 12. Such sheet-like material M1 is a sheet-like material containing fibers FB (cellulose fibers) (see FIGS. 44 to 47). Such sheet-like material M1, that is, the sheet-like material is one to be subjected to an alien substance-removing process that removes the alien substances AS by the processing device 1. The cellulose fiber may be a fibrous type having, as its main component, cellulose (cellulose in a narrow sense) which is a compound and may contain hemicellulose and lignin, in addition to cellulose (cellulose in a narrow sense).

The coarsely-crushing section 12 is a section that performs the coarsely-crushing step (see FIG. 43) of coarsely crushing the sheet-like material M1, which is supplied from the raw material-supplying section 11, in an aerial manner (in the air). The coarsely-crushing section 12 has the pair of coarsely-crushing blades 121 and the chute (hopper) 122.

The pair of coarsely-crushing blades 121 can be rotated in a direction opposite to each other so that the sheet-like material M1 is coarsely crushed therebetween, that is, cut into coarsely-crushed pieces M2. The coarsely-crushed pieces M2 preferably have a shape and size suitable for a defibrating process in the defibrating section 13, for example, they are preferably a small piece with a side length of 100 mm or less, and more preferably a small piece with a side length of 10 mm to 70 mm.

The chute 122 is disposed downward of the pair of coarsely-crushing blades 121, and has, for example, a funnel shape. Thus, the chute 122 can receive the coarsely-crushed pieces M2 that have been crushed by the coarsely-crushing blades 121 and dropped.

Further, upward of the chute 122, the humidifying section 231 is disposed adjacent to the pair of coarsely-crushing blades 121. The humidifying section 231 humidifies the coarsely-crushed pieces M2 in the chute 122. Such humidifying section 231 is configured as an evaporation type (or warm-air evaporation type) humidifier which has a filter (not shown) containing moisture, and supplies, to the coarsely-crushed pieces M2, humidified air having increased humidity due to passage of air through the filter. By supplying the humidified air to the coarsely-crushed pieces M2, it is possible to prevent the coarsely-crushed pieces M2 from adhering to the chute 122 or the like due to static electricity.

The chute 122 is connected to the defibrating section 13 via a pipe (flow path) 241. The coarsely-crushed pieces M2 collected in the chute 122 pass through the pipe 241 and are transported to the defibrating section 13.

The defibrating section 13 is a section that performs the defibration step (see FIG. 43) of defibrating the coarsely-crushed pieces M2 in an aerial manner (in the air). By the defibrating process in such defibrating section 13, it is possible to generate a defibrated material M3 from the coarsely-crushed pieces M2. Here, "defibrating" means to unravel the coarsely-crushed pieces M2, which are formed by bonding of a plurality of the fibers FB to one another, into each individual fiber. Such unraveled fibers become the defibrated material M3. A shape of the defibrated material M3 is linear or belt-like. In addition, the defibrated materials M3 may exist in a state where they are entangled with one another into a lump, that is, in a state where so-called a "dummy" is formed.

In the present embodiment, for example, the defibrating section 13 is configured as an impeller mill having a rotor that is rotated at high speed and a liner that is positioned on an outer periphery of the rotor. The coarsely-crushed pieces M2 flowing into the defibrating section 13 are interposed between the rotor and the liner, and defibrated.

Further, the defibrating section 13 can generate a flow of air (airflow) from the coarsely-crushing section 12 to the sorting section 14 due to rotation of the rotor. Thus, the coarsely-crushed pieces M2 can be sucked from the pipe 241 to the defibrating section 13. In addition, after the defibrating process, the defibrated material M3 can be delivered to the sorting section 14 via the pipe 242.

The blower 261 is installed midway in the pipe 242. The blower 261 is an airflow generating device that generates an airflow toward the sorting section 14. This promotes delivery of the defibrated material M3 to the sorting section 14.

The sorting section 14 is a section that performs the sorting step (see FIG. 43) of sorting the defibrated material M3 according to a length of the fiber FB. In the sorting section 14, the defibrated material M3 is sorted into a first sorted material M4-1 and a second sorted material M4-2 that is larger than the first sorted material M4-1. The first sorted material M4-1 has a size suitable for the subsequent manufacture of the sheet S. On the other hand, the second sorted material M 4-2 includes, for example, one in which defibration is insufficiently performed, one in which defibrated fibers FB are excessively aggregated, and the like.

The sorting section 14 has the drum portion 141 and the housing portion 142 that houses the drum portion 141.

The drum portion 141 is configured as a cylindrical mesh member and is a sieve that rotates about its central axis. The defibrated material M3 flows into such drum portion 141. As the drum portion 141 rotates, the defibrated material M3 having a size smaller than a mesh opening is selected as the first sorted material M4-1, and the defibrated material M3 having a size larger than the mesh opening is selected as the second sorted material M4-2.

The first sorted material M4-1 drops from the drum portion 141.

On the other hand, the second sorted material M4-2 is delivered to the pipe (flow path) 243 connected to the drum portion 141. The pipe 243 is connected to the pipe 241 on the opposite side (downstream side) to the drum portion 141. The second sorted material M4-2 having passed through such pipe 243 joins the coarsely-crushed pieces M2 in the pipe 241 and flows into the defibrating section 13 together with the coarsely-crushed pieces M2. Thus, the second sorted material M4-2 is returned to the defibrating section 13 and is subjected to the defibrating process together with the coarsely-crushed pieces M2.

Further, from the drum portion, the first sorted material M4-1 141 falls while dispersing in the air and heads toward the first web forming section (separating section) 15 positioned downward of the drum portion 141. The first web forming section 15 is a section that performs the first web forming step (see FIG. 43) of forming the first web M5 from the first sorted material M4-1. The first web forming section 15 has the mesh belt (separating belt) 151, three stretching rollers 152, and a suction portion (suction mechanism) 153.

The mesh belt 151 is an endless belt, and the first sorted material M4-1 is accumulated thereon. Such mesh belt 151 is looped around the three stretching rollers 152. Due to rotational drive of the stretching rollers 152, the first sorted material M4-1 on the mesh belt 151 is transported to a downstream side.

The first sorted material M4-1 has a size larger than the mesh opening of the mesh belt 151. Thus, passage of the first sorted material M4-1 through the mesh belt 151 is regulated, and therefore the first sorted material M4-1 can be accumulated on the mesh belt 151. In addition, since the first sorted material M4-1 is transported to the downstream side together with the mesh belt 151 while being accumulated on the mesh belt 151, it is formed as a first layered web M5.

Further, for example, dust, dirt, or the like may be mixed in the first sorted material M4-1. The dust or dirt may be incorporated together the sheet-like material M1, for example, in a case where the sheet-like material M1 is supplied from the raw material-supplying section 11 to the coarsely-crushing section 12. Such dust or dirt is smaller than the mesh opening of the mesh belt 151. Thus, the dust or dirt passes through the mesh belt 151 and further drops downward.

The suction portion 153 can suck air from downward of the mesh belt 151. Thus, the dust or dust having passed through the mesh belt 151 can be sucked together with air.

Further, the suction portion 153 is connected to the collecting portion 27 via the pipe (flow path) 244. The dust or dirt sucked by the suction portion 153 is collected in the collecting portion 27.

The pipe (flow path) 245 is further connected to the collecting portion 27. In addition, the blower 262 is installed midway in the pipe 245. Due to operation of such blower 262, a suction force can be generated in the suction portion 153. Thus, formation of the first web M5 on the mesh belt 151 is promoted. Such first web M5 is one in which the dust or dirt has been removed. In addition, the dust or dirt passes through the pipe 244 due to operation of the blower 262 to reach the collecting portion 27.

The housing portion 142 is connected to the humidifying section 232. The humidifying section 232 is configured as an evaporation type humidifier similar to the humidifying section 231. Thus, humidified air is supplied into the housing portion 142. Such humidified air can also humidify the first sorted material M4-1, and therefore it is possible to prevent the first sorted material M4-1 from adhering to an inner wall of the housing portion 142 due to an electrostatic force.

On a downstream side of the sorting section 14, the humidifying section 235 is disposed. The humidifying section 235 is configured as an ultrasonic type humidifier which sprays water. Thus, moisture can be supplied to the first web M5, and therefore a moisture content of the first web M5 is adjusted. Such adjustment can prevent the first web M5 from being adsorbed to the mesh belt 151 due to an electrostatic force. Accordingly, the first web M5 is easily peeled off from the mesh belt 151 at a position where the mesh belt 151 is folded back by the stretching roller 152.

On a downstream side of the humidifying section 235, the subdividing section 16 is disposed. The subdividing section 16 is a section that performs the dividing step (see FIG. 43) of dividing the first web M5 which has been peeled off from the mesh belt 151. The subdividing section 16 has a rotatably-supported propeller 161 and a housing portion 162 for housing the propeller 161. The first web M5 is caught by the rotating propeller 161, so that the first web M5 can be divided. The divided first web M5 becomes a subdivided body M6. In addition, the subdivided body M6 descends within the housing portion 162.

The housing portion 162 is connected to the humidifying portion 233. The humidifying section 233 is configured as an evaporation type humidifier similar to the humidifying section 231. Thus, humidified air is supplied into the housing portion 162. Such humidified air can also prevent the subdivided body M6 from adhering to inner walls of the propeller 161 and the housing portion 162 due to an electrostatic force.

On a downstream side of the subdividing section 16, the mixing section 17 is disposed. The mixing section 17 is a section that performs the mixing step (see FIG. 43) of mixing the subdivided body M6 and a resin P1. Such mixing section 17 includes the resin supplying portion 171, the pipe (flow path) 172, and the blower 173.

The pipe 172 connects the housing portion 162 of the subdividing section 16 with the housing portion 182 of the loosening section 18, and is a flow path through which the mixture M7 of the subdivided body M6 and the resin P1 passes.

The resin supplying portion 171 is connected midway to the pipe 172. The resin supplying portion 171 has the screw feeder 174. Due to rotational drive of such screw feeder 174, it is possible to supply the resin P1 as powders or particles to the pipe 172. The resin P1 supplied to the pipe 172 is mixed with the subdivided body M6 to form the mixture M7.

The resin P1 causes the fibers FB to be bonded to one another in a subsequent step. As the resin P1, for example, a thermoplastic resin, a curable resin, or the like can be used, and the thermoplastic resin is preferably used. Examples of the thermoplastic resin include polyolefins such as AS resin, ABS resin, polyethylene, polypropylene, and ethylene-vinyl acetate copolymer (EVA); modified polyolefins; acrylic resins such as polymethyl methacrylate; polyesters such as polyvinyl chloride, polystyrene, polyethylene terephthalate, and polybutylene terephthalate; polyamides (nylons) such as nylon 6, nylon 46, nylon 66, nylon 610, nylon 612, nylon 11, nylon 12, nylon 6-12, and nylon 6-66; polyphenylene ether; polyacetal; polyether; polyphenylene oxide; polyether ether ketone; polycarbonate; polyphenylene sulfide; thermoplastic polyimide; polyether imide; liquid crystal polymers such as aromatic polyester; and various thermoplastic elastomers based on styrene, polyolefin, polyvinyl chloride, polyurethane, polyester, polyamide, polybutadiene, trans-polyisoprene, fluoro rubber, chlorinated polyethylene, or the like, and one type or two or more types selected therefrom can be used in combination. Preferably, as the thermoplastic resin, a polyester or one containing the same is used.

In addition to the resin P1, those supplied from the resin supplying portion 171 may contain, for example, a coloring agent for coloring the fibers FB, an aggregation inhibitor for suppressing aggregation of the fibers FB and aggregation of the resin P1, a flame retardant for making the fibers FB or the like less susceptible to burning, and the like.

Further, the blower 173 is installed on a downstream side of the resin supplying portion 171 midway in the pipe 172. The blower 173 can generate an airflow towards the loosening section 18. Such airflow can agitate the subdivided body M6 and the resin P1 in the pipe 172. Thus, the mixture M7 can flow into the loosening section 18 in a state where the subdivided body M6 and the resin P1 are uniformly dispersed. In addition, the subdivided body M6 in the mixture M7 is loosened in the process of passing through an inside of the pipe 172, and becomes a finer fibrous type.

The loosening section 18 is a section that performs the loosening step (see FIG. 43) of loosening the mutually entangled fibers FB in the mixture M7. The loosening section 18 has the drum portion 181 and the housing portion 182 for housing the drum portion 181.

The drum portion 181 is configured as a cylindrical mesh member and is a sieve that rotates about its central axis. The mixture M7 flows into such drum portion 181. As the drum portion 181 rotates, the fibers FB or the like having a size smaller than the mesh opening in the mixture M7 can pass through the drum portion 181. At that time, the mixture M7 is loosened.

Further, the mixture M7 loosened in the drum portion 181 drops while dispersing in the air and heads toward the second web forming section 19 positioned downward of the drum portion 181. The second web forming section 19 is a section that performs the second web forming step (see FIG. 43) of forming the second web M8 from the mixture M7. The second web forming section 19 has the mesh belt (separating belt) 191, the stretching rollers 192, and the suction portion (suction mechanism) 193.

The mesh belt 191 is an endless belt, and the mixture M7 is accumulated thereon. Such mesh belt 191 is looped around the four stretching rollers 192. Due to rotational drive of the stretching rollers 192, the mixture M7 on the mesh belt 191 is transported to a downstream side.

Further, most of the mixture M7 on the mesh belt 191 has a size larger than the mesh opening of the mesh belt 191. Thus, passage of the mixture M7 through the mesh belt 191 is regulated, and therefore the mixture M7 can be accumulated on the mesh belt 191. In addition, since the mixture M7 is transported to the downstream side together with the mesh belt 191 while being accumulated on the mesh belt 191, it is formed as a second layered web M8.

The suction portion 193 can suck air from downward of the mesh belt 191. Thus, the mixture M7 can be sucked onto the mesh belt 191, and therefore accumulation of the mixture M7 on the mesh belt 191 is promoted.

The pipe (flow path) 246 is connected to the suction portion 193. In addition, the blower 263 is installed midway in such pipe 246. Due to operation of such blower 263, a suction force can be generated in the suction portion 193.

The housing portion 182 is connected to the humidifying section 234. The humidifying section 234 is configured as an evaporation type humidifier similar to the humidifying section 231. Thus, humidified air is supplied into the housing portion 182. Such humidified air can humidify an inside of the housing portion 182, and therefore can prevent the mixture M7 from adhering to an inner wall of the housing portion 182 due to an electrostatic force.

On a downstream side of the loosening portion 18, the humidifying section 236 is disposed. The humidifying section 236 is configured as an ultrasonic type humidifier similar to the humidifying section 235. Thus, moisture can be supplied to the second web M8, and therefore a moisture content of the second web M8 is adjusted. Such adjustment can prevent the second web M8 from being adsorbed to the mesh belt 191 due to an electrostatic force. Accordingly, the second web M8 is easily peeled off from the mesh belt 191 at a position where the mesh belt 191 is folded back by the stretching roller 192.

On a downstream side of the second web forming section 19, the sheet forming section 20 is disposed. The sheet forming section 20 is a section that performs the sheet forming step (see FIG. 43) of forming a sheet S from the second web M8. Such sheet forming section 20 includes the pressurizing portion 201 and the heating portion 202.

The pressurizing portion 201 has a pair of calender rollers 203, and the second web M8 can be pressurized therebetween without being heated. Thus, a density of the second web M8 is increased. Such second web M8 is transported toward the heating portion 202. One of the pair of calendar rollers 203 is a main driving roller driven by operation of a motor (not shown), and the other is a driven roller.

The heating portion 202 has a pair of heating rollers 204, and the second web M8 can be pressurized therebetween while being heated. By being heated and pressurized in such a manner, the resin P1 melts in the second web M8, and the fibers FB are bonded to one another through such molten resin P1. Thus, the sheet S is formed. Such sheet S is transported toward the cutting section 21. One of the pair of heating rollers 204 is a main driving roller driven by operation of a motor (not shown), and the other is a driven roller.

On a downstream side of the sheet forming section 20, the cutting section 21 is disposed. The cutting section 21 is a section that performs the cutting step (see FIG. 43) of cutting the sheet S. Such cutting section 21 includes the first cutter 211 and the second cutter 212.

The first cutter 211 cuts the sheet S in a direction intersecting with a transporting direction of the sheet S.

The second cutter 212 cuts the sheet S in a direction parallel to the transporting direction of the sheet S on a downstream side of the first cutter 211.

By cutting with the first cutter 211 and the second cutter 212 as described above, the sheet S having a desired size can be obtained. Such sheet S is further transported to the downstream side and stored in the stocking section 22.

Meanwhile, in the present embodiment, the sheet-like material M1 to be regenerated as the sheet S is a waste paper that has been printed and used. For this reason, the sheet-like material M1 (fibers FB) before being introduced into the raw material-supplying section 11 is a material to which coloring materials such as black or color toners, various types of inks, various type of dyes, or pigments, dust, dirt, and the like have been adhered. Hereinafter, these adhered substances are collectively referred to as "alien substances AS". In a case where the sheet S is regenerated, it is preferable that the alien substances AS be removed as much as possible. Thus, the sheet S becomes a high-quality sheet from which the alien substances AS, that can be impurities during regeneration, have been removed.

Therefore, the sheet manufacturing apparatus 100 is configured so that the alien substances AS can be removed from the sheet-like material M1 by the processing device 1 disposed on an upstream side of the sheet manufacturing apparatus 100. Hereinafter, the processing device 1 will be described. In particular, alien substances derived from ink (in particular, ink jet ink) easily penetrate into narrow interstices between the fibers and into interiors of the fibers, and it is generally said that such alien substances are difficult to remove. However, in the invention, it is possible to suitably remove the alien substances derived from such ink (in particular, ink jet ink). In other words, in a case where the alien substances AS are derived from ink (in particular, ink jet ink), effects according to the invention are more remarkably exerted.

As shown in FIG. 41, the processing device 1 includes the transporting section 3, the surface area-increasing processing section (preprocessing section) 4, the aggregating section (alien substance-aggregating section) 6, and the removing section (alien substance-removing section) 5.

The transporting section 3 transports the sheet-like material M1 toward the downstream side. The transporting section 3 has the glue belt 31, the two stretching rollers 32, and a multiplicity of the idle rollers 33.

The glue belt 31 is an endless belt of which a surface is adhesive. Due to such adhesive force, the sheet-like material M1 is fixed on the glue belt 31, and therefore the surface area-increasing processing step in the surface area-increasing processing section (preprocessing section) 4 and the alien substance-removing step in the removing section 5 are stably performed. In addition, a plurality of the sheet-like materials M1 can be mounted on the glue belt 31. Meanwhile, orientations (postures) of these sheet-like materials M1 on the glue belt 31 may or may not be aligned.

The two stretching rollers 32 are disposed apart from each other on the upstream side and the downstream side, and the glue belt 31 is looped therearound. One stretching roller 32 of the two stretching rollers 32 is a driving roller which is connected to a motor (not shown) and rotates in the direction of the arrow $\alpha_{32}$ by driving of such motor. In addition, the other stretching roller 32 is a driven roller which rotates in the direction of the arrow $\alpha_{32}$ in the same manner as the driving roller, as a rotational force from the driving roller is transmitted via the glue belt 31. Meanwhile, due to rotation of each stretching roller 32, the sheet-like material M1 on the glue belt 31 is transported in the transporting direction $\alpha_{31}$.

Further, in the transporting section 3, a transporting speed of the sheet-like material M1 can vary by adjusting a rotation number of the driving roller.

The multiplicity of idle rollers 33 are disposed apart between the two stretching rollers 32. Along with the driving of the glue belt 31, each of the idle rollers 33 can rotate in the direction of the arrow $\alpha_{33}$ which is the same direction as the rotation direction of the stretching roller 32. Due to such idle rollers 33, deflection of the glue belt 31 can be prevented, and therefore the sheet-like material M1 can be stably transported.

In the configuration shown in FIG. 41, the transporting section 3 is configured to have a belt-transported configuration. However, the invention is not limited thereto, and for example, the transporting section 3 may have a configuration where the sheet-like material M1 is transported while being held on a stage by adsorption due to a negative pressure, that is, a platen.

As shown in FIG. 41, the processing device 1 includes the surface area-increasing processing section (pre-processing section) 4 that performs a preprocessing for increasing a surface area of the sheet-like material M1 which is before the ionic substance IS is applied in the aggregating section 6. More specifically, as shown in FIG. 41, at an upper side of the glue belt 31, the surface area-increasing processing section (preprocessing section) 4 is disposed.

Thus, the surface area of the sheet-like material M1 is increased, and the alien substances AS contained in the sheet-like material M1 and the ionic substance IS can be more efficiently brought in contact with each other. In addition, in a state before the surface area-increasing step, the alien substances AS that exist in narrow interstices between the fibers FB at deep sites (sites at a lower side than the upper side surface in FIG. 41) in the sheet-like material M1, and the alien substances AS that have penetrated into interiors of the fibers FB can be more efficiently brought into contact with ionic substance IS in the aggregating section (alien substance-aggregating section) 6. In view of this, it is possible to more efficiently remove the alien substances AS in the sheet-like material M1.

The surface area-increasing processing section (preprocessing section) 4 may have any configuration as long as it can perform a preprocessing for increasing the surface area of the sheet-like material M1, and in the present embodiment, it is a fluffing section for fluffing the sheet-like material M1.

Thus, with respect to the sheet-like material M1, it is possible to efficiently perform a process for increasing the surface area of the sheet-like material M1 in a short time. In addition, by fluffing the sheet-like material M1, an efficiency of the defibrating step performed on a downstream side is also improved. In view of this, it is possible to improve a processing rate of the sheet-like material M1.

Here, "fluffing" will be described.

The fibers FB contained in the sheet-like material M1 are in a state of sleeping, that is, a lying-down state, as shown in FIG. 44, until the surface area-increasing step (fluffing step) is performed. In the state shown in FIG. 44, the fibers FB lye down in the same direction, that is, on the right side in FIG. 44, but some of the fibers FB may lye down in mutually different directions. By going through surface area-increasing step (fluffing step), the fibers FB that are at least near the surface are raised, that is, made to stand, as shown in FIG. 45, as compared with the state shown in FIG.

44. This is called "fluffing". A standing state of the fibers FB is maintained until the ionic substance IS is applied to the sheet-like material M1 in the aggregating step.

As shown in FIG. 41, the surface area-increasing processing section (fluffing section) 4 has the brush 41. Such brush 41 has the rotatably-supported cylindrical or columnar core portion 411, and the brush bristles 412 provided on an outer peripheral portion of the core portion 411.

The core portion 411 is connected to a motor (not shown) and can be rotated together with the brush bristles 412 in the direction of the arrow $\alpha_{41}$ by driving of such motor.

The brush bristles 412 are implanted over the entire periphery of the outer peripheral portion of the core portion 411. The brush bristles 412 are, for example, formed of a flexible resin material such as polyamide or polyester.

In addition, the tips of the brush bristles 412 may be sharp or may be rounded.

As the brush 41 rotates in the direction of the arrow $\alpha_{41}$, in the sheet-like material M1 passing right thereunder, the fibers FB come into contact with the brush bristles 412 of the brush 41 and are forcefully pushed back to a direction opposite to the transporting direction $\alpha_{31}$, that is, the upstream side. Thus, in the sheet-like material M1, the fibers FB becomes a fluffed state, that is, the fibers FB change from the state shown in FIG. 44 to the state shown in FIG. 45. Due to such a state, the alien substances AS contained in the raw material M1 can be lifted up as much as possible from the fibers FB, and therefore the fibers FB are easily removed in the removing section 5.

The brush 41 is configured to rotate in the direction of the arrow $\alpha_{41}$ in the present embodiment. However, the invention is not limited thereto, and, for example, the brush 41 may be configured to rotate in a direction opposite to the direction of the arrow $\alpha_{41}$, or it may be configured to alternately perform the rotation in the $\alpha_{41}$ direction and in a direction opposite to the $\alpha_{41}$ direction in a periodic manner.

Further, although the brush 41 is configured to rotate in the present embodiment, the invention is not limited thereto, and the brush 41 may, for example, be configured to move in a direction opposite to the transporting direction $\alpha_{31}$ or in the same direction as the transporting direction $\alpha_{31}$.

Further, downward of the brush 41, one of the idle rollers 33 is positioned along the glue belt 31 (such idle roller 33 is hereinafter referred to as "idle roller 33a"). Due to such idle roller 33a, the brush 41 can be more reliably pressed against the sheet-like material M1 from an upper side, and therefore the brush bristles 412 and the fibers FB sufficiently come into contact with each other. Thus, the fibers FB can be fluffed without excess or deficiency.

In the processing device 1, on a downstream side (between the surface area-increasing processing section 4 and the removing section 5) of the surface area-increasing processing section (fluffing section) 4, the aggregating section (alien substance-aggregating section) 6 that aggregates the alien substances AS contained in the sheet-like material M1 by applying the ionic substance IS of a polyvalent metal ion to the sheet-like material M1 is provided. The aggregating step (alien substance-aggregating step) performed by such aggregating section 6 is performed between the surface area-increasing step and the removing step (alien substance-removing step).

The aggregating section 6 is disposed at an upper side of the glue belt 31 and is capable of supplying the ionic substance IS from upward to the sheet-like material M1. Thus, the alien substances AS can be aggregated on the sheet-like material M1 to form aggregates AG (see FIG. 46). More specifically, by applying the ionic substance IS of a polyvalent metal ion, relatively large aggregates AG can be efficiently formed by an electrical action between the cationic polymer and the alien substances AS. In addition, even in a case where the alien substances AS are firmly bonded to the fibers FB, by using the ionic substance IS, a bonding force between the fibers FB and the alien substances AS can be weakened to efficiently form relatively large aggregates AG.

The aggregated alien substances AS have a size that can be easily removed in the removing step (alien substance-removing step).

Therefore, the aggregated alien substances AS are easily removed from the sheet-like material M1 by operation of the removing section (alien substance-removing section) 5.

Such an effect is more remarkably exerted in a case where the alien substances AS are those having an electric charge (in particular, anionic alien substances AS). In addition, even in a case where the ionic substance IS is applied to the sheet-like material M1, for example, in a dry state (for example, powder state) which is not a solution or a dispersion, the alien substances AS can be easily and efficiently removed as the aggregates AG. For this reason, postprocessing after removal of the aggregates AG can be omitted or simplified, and the above-described effects can be obtained while preventing a configuration of the processing device 1 from being complicated.

In the aggregating section 6, the ionic substance IS may be solely applied to the sheet-like material M1 or may be applied in a state of a mixture containing the ionic substance IS and other components.

In the aggregating section 6, the ionic substance IS may be applied to the sheet-like material M1 in any form, and may be, for example, in a solution state in which the ionic substance IS is dissolved in another liquid component (solvent) or a dispersion state in which the ionic substance is dispersed in another liquid component (dispersion medium). The ionic substance IS is preferably applied in a powder state.

In this configuration, it is easy to remove the aggregates AG and an excess of the ionic substance IS after applying the ionic substance IS to the sheet-like material M1. In addition, it is possible to omit or simplify a postprocessing (for example, drying process) after applying the ionic substance IS, and it is possible to further improve a processing rate of the sheet-like material M1. In addition, the dry state in the processing device 1 can be thoroughly maintained, thereby making it advantageous to simplify a configuration of the processing device 1 and to reduce a size thereof.

In a case where the ionic substance IS is applied in a powder state, an average particle diameter of the powder is preferably 10 µm to 2,000 µm, more preferably 20 µm to 1,000 µm, and still more preferably 30 µm to 500 µm.

Thus, it is possible to more effectively prevent powders of the ionic substance IS from inadvertently scattering (diffusing) in the processing device 1, thereby further improving removal efficiency of the alien substances AS while making the ionic substance IS superior in terms of ease of handleability.

In the invention, the average particle diameter means an average particle diameter on a volume basis.

A method of applying the ionic substance IS to the sheet-like material M1 is not particularly limited. Examples thereof include a spraying method, a coating method, a printing method, and a dipping method, and among these, at least one of the spraying method and the coating method is preferably used to apply the ionic substance IS to the sheet-like material M1.

Thus, for example, a desired amount of the ionic substance IS can be efficiently applied to a desired site of the sheet-like material M1. Therefore, it is possible to more efficiently remove the alien substances AS while suppressing the amount used of the ionic substance IS. In addition, in the method as described above, the ionic substance IS in a dry state (ionic substance IS which is not in a solution state or dispersion state) can also be suitably used.

A weight per unit area of the ionic substance IS to be applied to the sheet-like material M1 is not particularly limited, and is preferably 1 µg/m$^2$ to 50 g/m$^2$, more preferably 5 µg/m$^2$ to 40 g/m$^2$, and still more preferably 10 µg/m$^2$ to 30 g/m$^2$.

Thus, it is possible to more efficiently remove the alien substances AS while suppressing the amount used of the ionic substance IS.

In a case where the ionic substance IS is applied to specific sites (for example, sites on which printing had been performed) of the sheet-like material M1 in a selective manner, the weight per unit area of the ionic substance IS in the specific sites preferably satisfies the above-mentioned conditions.

Further, by applying the ionic substance IS to such specific sites in a selective manner, the amount used of the ionic substance IS can be more effectively suppressed. In addition, since it is possible to shorten the time required for removal of the aggregates AG and removal of an excess of the ionic substance IS, it is possible to improve a processing rate of the sheet-like material M1.

By using a detection means, which is not shown, in advance (for example, in an optical manner) to specify sites (to obtain coordinates of the sites) containing the alien substances AS on the sheet-like material M1, it is possible to suitably perform an application of the ionic substance IS on specific sites in a selective manner. In addition, the content (absolute content or relative content) of the alien substances AS at each site of the sheet-like material M1 may be measured (for example, in an optical manner) by a detection means which is not shown, and based on the measurement results, the amount applied of the ionic substance IS may be adjusted.

The ionic substance IS may be an ionic substance containing a polyvalent metal ion (a divalent or more metal ion), and it preferably has a deliquescence property.

Thus, for example, even in a case where the ionic substance IS is applied to the sheet-like material M1 in a state where the ionic substance IS is not mixed with other liquid components (for example, in a state which is not a solution state or dispersion state), due to moisture contained in the atmosphere, the ionic substance IS spontaneously is capable of becoming an aqueous solution state and coming in contact with the sheet-like material M1 in a wet state. As a result, the ionic substance IS is capable of more efficiently coming into contact with the alien substances AS and capable of more efficiently weakening binding forces between the fibers FB and the alien substances AS, thereby improving an efficiency of forming the aggregates AG. In particular, the aggregates AG can be effectively formed not only between the alien substances AS that exist in interstices between the fibers FB, but also between the alien substances AS that have penetrated into interiors of the fibers FB, thereby making it possible to more effectively remove the alien substances AS. In addition, by making it unnecessary to positively prepare liquid components and by using the ionic substance IS having a deliquescence property in a state of being not mixed with other liquid components, a dry state in the processing device 1 can be thoroughly maintained, thereby making it advantageous to simplify a configuration of the apparatus and to reduce a size thereof. By using the ionic substance IS having a deliquescence property in a state of being not mixed with other liquid components, it is possible to omit or simplify a drying process as a postprocessing, and to improve a processing rate of the sheet-like material M1. Further, the ionic substance IS having a deliquescence property can absorb moisture contained in the atmosphere, so that humidity of the atmosphere in the processing device 1 can be decreased.

Examples of the ionic substance IS include a halide salt (chloride salt, bromide salt, fluoride salt, or iodide salt) of a polyvalent metal (a divalent or more metal (for example, a metal element of Group 2 to Group 16)), nitrate, nitrite, hyponitrite, pernitrate, sulfate, sulfite, hyposulfite, persulfate, carbonate, chlorate, chlorite, hypochlorite, perchlorate, bromate, bromite, hypobromite, perbromate, iodate, iodite, hypoiodite, periodate, borate, perborate, silicate, carboxylate, sulfonate, sulfinate, phosphate, phosphite, hypophosphite, and arsenate, and one type or two or more types selected therefrom can be used in combination.

Preferred materials for the ionic substance IS include salts (halide salts, nitrates, or the like) of alkaline earth metals (Ca, Sr, Ba, or Ra), salts (halide salts, nitrates, or the like) of magnesium group (Group 12 elements such as Be, Mg, or zinc), salts (halide salts, nitrates, sulftates, or the like) of manganese group (Group 7 elements such as Mn), salts (halide salts, nitrates, or the like) of iron group (Fe, Co, or Ni), and salts (halide salts, nitrates, or the like) of rare earths (Group 3 elements from the fourth period to the sixth period excluding actinides).

A molecular weight of the ionic substance IS is preferably 47 to 300, more preferably 60 to 250, and still more preferably 80 to 200.

Thus, it is possible to more efficiently remove the alien substances AS while suppressing the amount used of the ionic substance IS.

In a case where the ionic substance IS is dissolved in water to make a 1.0% by mass aqueous solution, the pH (pH at 25° C.) of the aqueous solution is preferably 5.8 to 7.8, more preferably 6.0 to 7.5, and still more preferably 6.5 to 7.3.

Thus, it is possible to more efficiently remove the alien substances AS while suppressing damages to the sheet-like material M1 during the process in the processing device 1. In addition, even in a case where the ionic substance IS remains in the sheet-like material M1, which has been processed by the processing device 1, occurrence of adverse effects (such as deterioration of the sheet-like material M1) due to the remaining ionic substance IS is more effectively suppressed.

In particular, the ionic substance IS preferably contains at least one of calcium chloride and magnesium chloride.

These ionic substances IS exhibit a more preferable deliquescence property, and thus the effects as described above are more effectively exhibited. In addition, these ionic substances IS are relatively inexpensive, and are advantageous in terms of cost.

Further, the alien substances AS may be anything, and are preferably components of an ink jet ink.

In general, the components of an ink jet ink easily penetrate not only into interstices between the fibers but also into interiors of the fibers, and, in general, it is not easy to remove the component after being applied to a recording medium containing fibers. On the other hand, in the invention, by using the ionic substance IS of a polyvalent metal ion, even the component of an ink jet ink can be suitably removed from the sheet-like material M1 containing the fibers FB. Therefore, in a case where the alien substances AS are the components of an ink jet ink, effects according to the invention are more remarkably exerted.

Examples of the component of an ink jet ink include coloring agents such as various dyes or various pigments, dispersants, penetrants, dissolution aids, and pH adjusters.

Further, the alien substances AS may be nonionic substances or cationic substances, and are preferably anionic substances.

Among various substances, the anionic substances particularly strongly interact with the ionic substance IS of a polyvalent metal ion. Therefore, in a case where the alien substances AS are the anionic substances, they can interact with the ionic substance IS of a polyvalent metal ion to more suitably form aggregates AG, and they can be more suitably removed in the removing section 5.

Examples of the anionic substances include negatively chargeable coloring agents such as carbon black; negatively chargeable charge controlling agents or external additives, for example, trimethylethane-based dyes, metal complex salts of salicylic acid, metal complex salts of benzilic acid, copper phthalocyanine, perylene, quinacridone, azo-based pigments, metal-complexed azo-based dyes, heavy metal-containing acidic dyes such as an azo chromium complex, phenolic condensates of calixarene type, cyclic polysaccharides, resins containing a carboxyl group or sulfonyl group, inorganic particulates, for example, metal oxides or hydroxides such as alumina, silica, titania, zinc oxide, zirconium oxide, cerium oxide, talc, and hydrotalcite, metal titanates such as calcium titanate, strontium titanate, and barium titanate, nitrides such as titanium nitride and silicon nitride, carbides such as titanium carbide and silicon carbide, and negatively chargeable organic fine particulates such as acrylic acid-based resins of which main components are an acrylic acid and a derivative thereof, methacrylic acid-based resins of which main components are a methacrylic acid and a derivative thereof, tetrafluoroethylene resins, trifluoroethylene resins, polyvinyl chloride, polyethylene, and polyacrylonitrile; and negatively chargeable binders such as polyester (in particular, binders used for toner).

As shown in FIG. 41, at an upper side of the glue belt 31, the removing section (alien substance-removing section) 5 is disposed on a downstream side of the aggregating section 6.

The removing section 5 is a section that performs the removing step (see FIG. 43) of removing the aggregates AG generated by the aggregating section 6 from the sheet-like material M1.

In the removing section 5, an excess of the ionic substance IS may be removed together with the aggregates AG.

Thus, it is possible to more effectively prevent the ionic substance IS from inadvertently remaining in the material processed by the processing device 1. In addition, it is also conceivable to provide a removing section (second removing section) for removing the ionic substance IS on a downstream side of the removing section 5. However, by removing the excess of the ionic substance IS in the removing section 5 (first removing section), the process in the second removing section can be performed in a shorter time, and a structure of the second removing section can be simplified. Further, it is also advantageous in reducing a size of the entire apparatus. Further, by removing the excess of the ionic substance IS together with the aggregates AG in the removing section 5, even in a case where the second removing section is not provided, the content of the ionic substance IS contained in the processed sheet-like material M1 can be sufficiently decreased, a reliability of the processed sheet-like material M1 can be made sufficiently excellent, and a reliability of the sheet S manufactured by using the sheet manufacturing apparatus 100 can be made excellent.

In the case of removing an excess of the ionic substance IS in the removing section 5, at least a part of the ionic substance IS may be removed.

In the present embodiment, the removing section 5 is configured to bring the sheet-like material M1 containing the aggregates AG into contact with the fabric material 51 formed of a nonwoven fabric or a woven fabric, and to cause the aggregates AG to migrate (transferred) to the fabric material 51. The removing section 5 has the fabric material 51, two stretching rollers 52, a multiplicity of idle rollers 53, and a cleaning portion 54.

Thus, it is possible to more efficiently remove the aggregates AG. In addition, in a case where an excess of the ionic substance IS remains, the excess of the ionic substance IS can be efficiently removed together with the aggregates AG in the removing section 5.

Further, since the fabric material 51 is formed of a nonwoven fabric or a woven fabric, the fabric material 51 can entangle with the aggregates AG and take them out of the sheet-like material M1 in an efficient manner. In addition, in the removing section 5, the fabric material 51 is an endless belt. Thus, for example, in a case where the fabric material 51 is cleaned by the cleaning portion 54, the fabric material 51 can be continuously used as it is to remove the aggregates AG.

The two stretching rollers 52 are disposed apart from each other on the upstream side and the downstream side, and the fabric material 51 is looped therearound. One stretching roller 52 of the two stretching rollers 52 is a driving roller which is connected to a motor (not shown) and rotates in a direction of the arrow $\alpha_{52}$ by driving of such motor. In addition, the other stretching roller 52 is a driven roller which rotates in the direction of the arrow $\alpha_{52}$ similarly to the driving roller as a rotational force from the driving roller is transmitted via the fabric material 51. By the rotation of each stretching roller 52, the fabric material 51 is driven on the glue belt 31 in a direction of an arrow $\alpha_{51}$ which is a direction opposite to the transporting direction $\alpha_{31}$. Thus, the fabric material 51 can cause the aggregates AG to migrate from the sheet-like material M1, that is, adhere to and wipe off them. As a result, the aggregates AG are sufficiently removed, and a state as shown in FIG. 47 is obtained.

Further, in the removing section 5, a driving speed of the fabric material 51 in the direction of the arrow $\alpha_{51}$ can vary by adjusting a rotation number of the driving roller.

A multiplicity of the idle rollers 53 are disposed at equal intervals between the two stretching rollers 52. Along with driving of the fabric material 51, each of the idle rollers 53 can rotate in the direction of the arrow $\alpha_{53}$ which is the same direction as the rotation direction of the stretching roller 52.

Further, downward of the fabric material 51, a plurality of the idle rollers 33 are positioned along the glue belt 31 (hereinafter these idle rollers 33 will be referred to as "idle rollers 33b"). The fabric material 51 can be pressed against the sheet-like material M1 between these idle rollers 33b and the idle rollers 53. Thus, the fabric material 51 and the aggregates AG sufficiently come into contact with each other, and therefore the aggregates AG are sufficiently removed.

In addition, in a configuration shown in FIG. 41, the fabric material 51 is driven in the direction of the arrow $\alpha_{51}$ which is a direction opposite to the transporting direction $\alpha_{31}$.

However, the invention is not limited thereto, and the fabric material 51 may, for example, be driven in the same direction as the transporting direction $\alpha_{31}$. In this case, it is preferable that there be a difference between a driving speed of the fabric material 51 and a transporting speed of the sheet-like material M1.

The removing section 5 has the cleaning portion 54 for cleaning the fabric material 51 to which the aggregates AG have migrated. The cleaning portion 54 is disposed upward of the fabric material 51 and is configured to suck the aggregates AG which are adhered to the fabric material 51. Thus, the aggregates AG (alien substances AS) are removed from the fabric material 51, and therefore the fabric material 51 is cleaned. The cleaned fabric material 51 is again used to remove the aggregates AG (alien substances AS).

Thirteenth Embodiment

Figure 48:
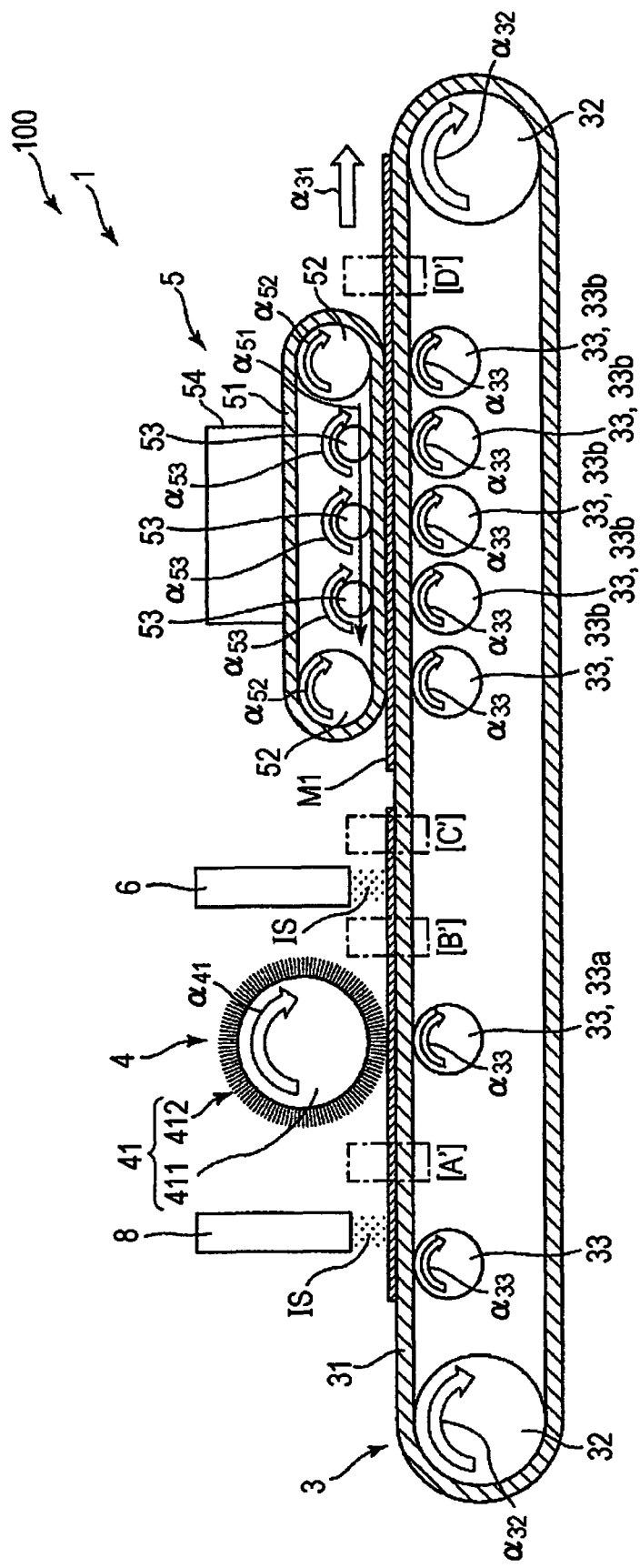
FIG. 48 is a schematic side view showing a configuration of an upstream side (processing device of the invention) of the sheet manufacturing apparatus (thirteenth embodiment) of the invention.
Figure 49:
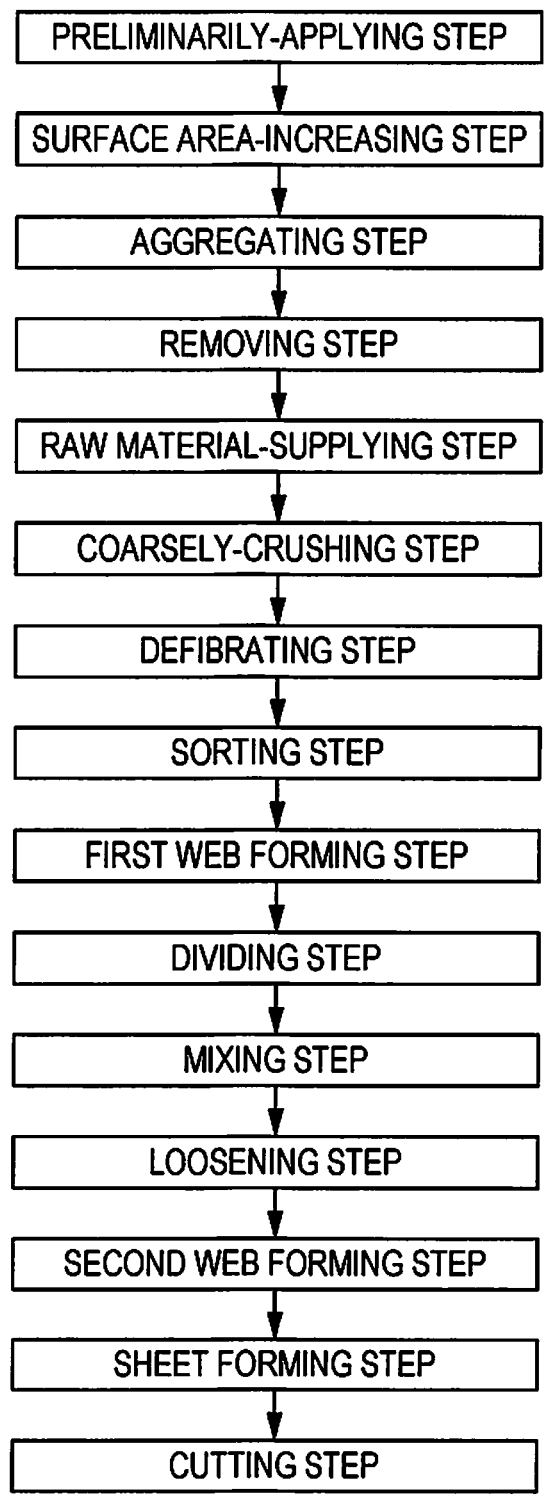
FIG. 49 is a diagram sequentially illustrating steps performed by the sheet manufacturing apparatus (thirteenth embodiment) of the invention.
Figure 50:
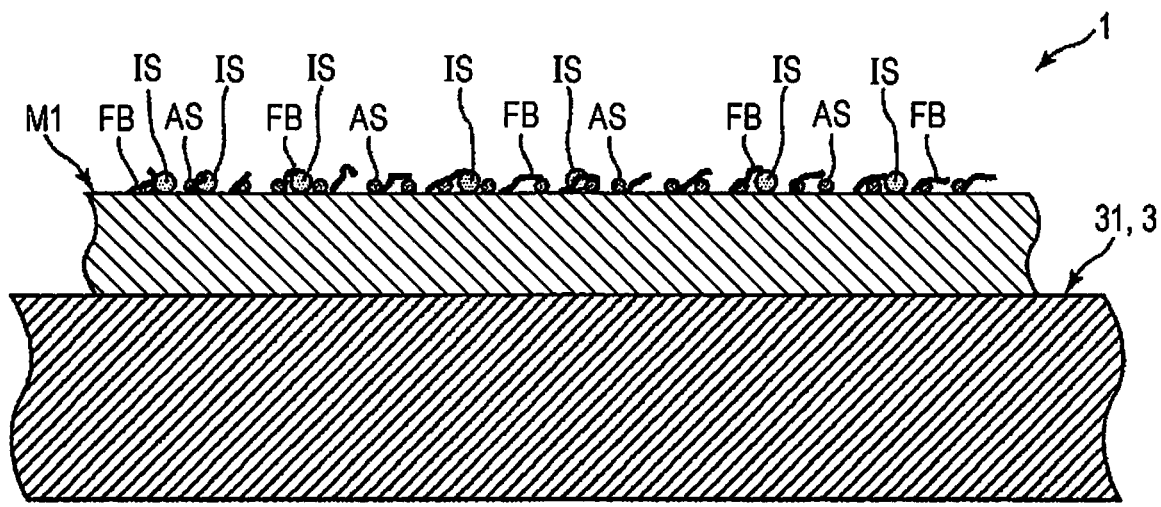
FIG. 50 is an image diagram sequentially showing a state of sheet-like material processed by the processing device shown in FIG. 48 (enlarged view of a region [A'] surrounded by a dot-and-dash line in FIG. 48).
Figure 51:
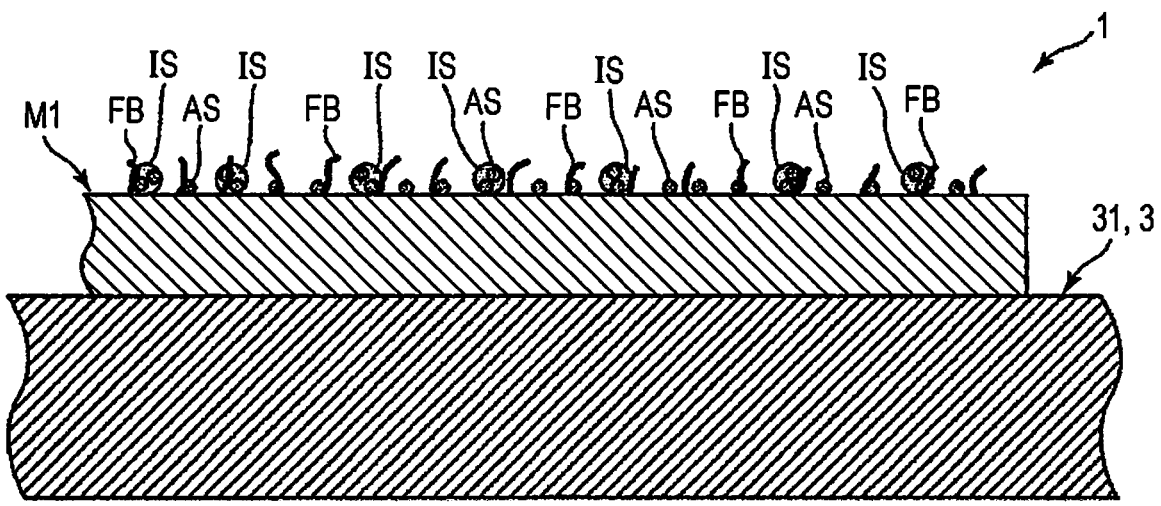
FIG. 51 is an image diagram sequentially showing a state of sheet-like material processed by the processing device shown in FIG. 48 (enlarged view of a region [B'] surrounded by a dot-and-dash line in FIG. 48).
Figure 52:
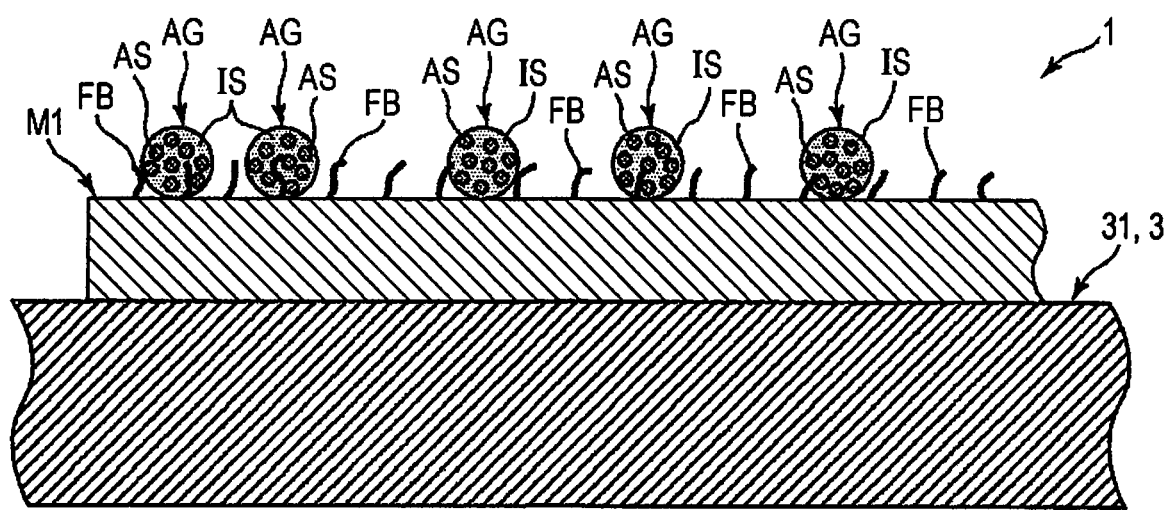
FIG. 52 is an image diagram sequentially showing a state of sheet-like material processed by the processing device shown in FIG. 48 (enlarged view of a region [C'] surrounded by a dot-and-dash line in FIG. 48).
Figure 53:
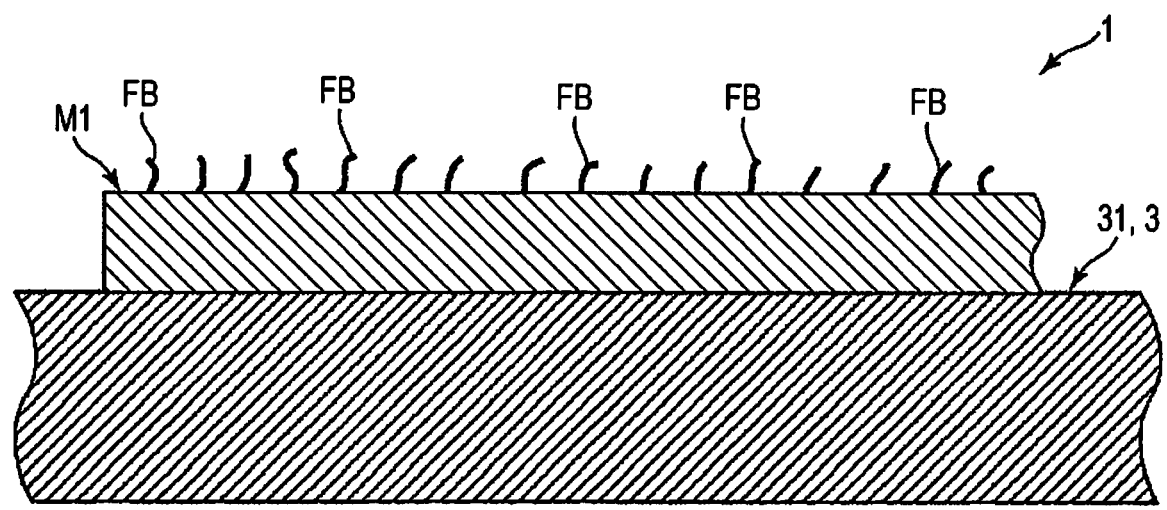
FIG. 53 is an image diagram sequentially showing a state of sheet-like material processed by the processing device shown in FIG. 48 (enlarged view of a region [D'] surrounded by a dot-and-dash line in FIG. 48).

FIG. 48 is a schematic side view showing a configuration of an upstream side (processing device of the invention) of the sheet manufacturing apparatus (thirteenth embodiment) of the invention. FIG. 49 is a diagram sequentially illustrating steps performed by the sheet manufacturing apparatus (thirteenth embodiment) of the invention. FIGS. 50 to 53 are image diagrams, each sequentially showing a state of the sheet-like material processed by the processing device shown in FIG. 48 (FIG. 50 is an enlarged view of a region [A'] surrounded by a dot-and-dash line in FIG. 48; FIG. 51 is an enlarged view of a region [B'] surrounded by a dot-and-dash line in FIG. 48; FIG. 52 is an enlarged view of a region [C'] surrounded by a dot-and-dash line in FIG. 48; and FIG. 53 is an enlarged view of a region [D'] surrounded by a dot-and-dash line in FIG. 48).

Hereinafter, the thirteenth embodiment of the processing device, the sheet manufacturing apparatus, the processing method, and the manufacturing method of a sheet of the invention will be described with reference to these drawings. However, descriptions will be made on the differences from the above-described embodiment and descriptions will be omitted for the similar matters. The present embodiment is the same as the above-described twelfth embodiment except that the preliminarily-applying section is provided.

As shown in FIG. 48, in the present embodiment, the preliminarily-applying section (first ionic substance-applying section) 8 is configured to apply the ionic substance IS to the sheet-like material M1, so that in the surface area-increasing processing section (preprocessing section) 4 provided on a downstream thereof, a preprocessing for increasing the surface area of the sheet-like material M1 is performed, and in the aggregating section 6 (ionic substance-applying section or second ionic substance-applying section) provided on a downstream side thereof, the ionic substance IS is applied to the sheet-like material M1. In other words, the processing device 1 of the present embodiment further includes the preliminarily-applying section 8 for preliminarily applying the ionic substance IS to the sheet-like material M1 on an upstream side of the surface area-increasing processing section 4. The preliminarily-applying step performed by such preliminarily-applying section 8 is performed before the surface area-increasing step.

With such a configuration, it is possible to more efficiently form the aggregates AG. More specifically, by applying, in advance, a relatively small amount of the ionic substance IS to the sheet-like material M1, which is supplied to the surface area-increasing processing section 4, in the preliminarily-applying section 8, in a case where a process for increasing the surface area of the sheet-like material M1 is performed in the surface area-increasing processing section 4, it is possible to cause the ionic substance IS, which is applied in the preliminarily-applying section 8, to efficiently penetrate into interstices between the fibers FB or to efficiently penetrate into interiors of the fibers FB while effectively preventing a large amount of the ionic substance IS from adhering to the surface area-increasing processing section 4. As a result, alien substances AS contained in these sites can be efficiently brought into contact with the ionic substance IS. By further adding the ionic substance IS to the sheet-like material M1 in the aggregating section 6 (second ionic substance-applying section) on a downstream side of the surface area-increasing processing section 4, the newly added ionic substance IS comes into contact with the ionic substance IS which was in contact with the alien substances AS on an upstream side thereof, and aggregates AG having a form which is larger and easier to remove are formed. In view of this, it is possible to more efficiently form the aggregates AG. In addition, even in a case where the amount used of the ionic substance IS as a whole is suppressed, the alien substances AS can be sufficiently removed.

A state of the sheet-like material M1 in each step is as shown in FIGS. 50 to 53.

That is, in the preliminarily-applying step, in a state where a relatively small amount of the ionic substance IS is preliminarily applied, growth (coarsening) of the aggregates AG hardly progresses (see FIG. 50).

In the surface area-increasing step, an external force is applied by the surface area-increasing processing section (fluffing section) 4 to increase the surface area of the sheet-like material and to promote the contact between the ionic substance IS and the alien substances AS, thereby causing the growth of the aggregates AG to progress (see FIG. 51).

In a case where the ionic substance IS is further added in the aggregating step, the growth of the aggregates AG further progresses (see FIG. 52).

In a subsequent removing step, the aggregates AG are sufficiently removed, and a state as shown in FIG. 53 is obtained.

The weight per unit area of the ionic substance IS to be applied to the sheet-like material M1 in the preliminarily-applying section 8 is usually smaller than the weight per unit area of the ionic substance IS to be applied to the sheet-like material M1 in the aggregating section 6.

Specifically, the weight per unit area of the ionic substance IS to be applied to the sheet-like material M1 in the preliminarily-applying section 8 is not particularly limited, and is preferably 0.01 µg/m$^2$ to 10 g/m$^2$, more preferably 0.10 µg/m$^2$ to 5 g/m$^2$, more preferably 0.30 µg/m$^2$ to 1 g/m$^2$.

Thus, it is possible to more efficiently remove the alien substances AS while suppressing the amount used of the ionic substance IS.

Further, the amount of the ionic substance IS to be applied to the sheet-like material M1 in the preliminarily-applying section 8 is 0.1 parts by mass to 30 parts by mass, more preferably 0.2 parts by mass to 25 parts by mass, and still more preferably 0.3 parts by mass to 20 parts by mass, with respect to 100 parts by mass of the ionic substance IS to be applied to the sheet-like material M1 in the aggregating section 6.

Thus, it is possible to more efficiently remove the alien substances AS while suppressing the amount used of the ionic substance IS.

By using a detection means, which is not shown, in advance (for example, in an optical manner) to specify sites (to obtain coordinates of the sites) containing the alien substances AS on the sheet-like material M1, it is possible to perform an application of the ionic substance IS by the preliminarily-applying section 8 on specific sites in a selective manner. In addition, the content (absolute content or relative content) of the alien substances AS at each site of the sheet-like material M1 may be measured (for example, in an optical manner) by a detection means which is not shown, and based on the measurement results, the amount applied of the ionic substance IS by the preliminarily-applying section 8 may be adjusted.

Further, the content (absolute content or relative content) of the alien substances AS in the sheet-like material M1 may be measured (for example, in an optical manner) in advance by a detection means which is not shown, and based on the measurement results, operation of the preliminarily-applying section 8 and the aggregating section 6 may be controlled. For example, in a case where the content of the alien substances AS is large, the preliminarily-applying section 8 and the aggregating section 6 may be operated, and in a case where the content of the alien substances AS is small, the aggregating section 6 may be operated and operation of the preliminarily-applying section 8 may be stopped.

The ionic substance IS to be applied to the sheet-like material M1 in the preliminarily-applying section 8 and the ionic substance IS to be applied to the sheet-like material M1 in the aggregating section 6 may be the same as or different from each other, for example, in terms of conditions such as a composition of the ionic substance IS or a state of the ionic substance IS (for example, whether or not the ioninc substance is mixed with other components; and a dilution ratio with such other components, a composition of such other components, and the like in a case of being mixed with such other components).

Hereinbefore, the processing device, the sheet manufacturing apparatus, the processing method, and the manufacturing method of a sheet of the invention have been described with reference to the illustrated embodiments. However, the invention is not limited thereto. In addition, each of the sections constituting the processing device and the sheet manufacturing apparatus can be remounted with one having a predetermined configuration capable of exerting a similar function. Further, a predetermined component may be added thereto.

Further, the processing device, the sheet manufacturing apparatus, the processing method, and the manufacturing method of a sheet of the invention may be any combination of two or more configurations (features) of the above respective embodiments.

Further, in the above-described embodiment, the fluffing section has one brush. However, the invention is not limited thereto, and for example, the fluffing section may have a plurality of brushes disposed along a transporting direction of the raw material.

Further, the fluffing section may have a plurality of hook-shape claw portions and rotary supporting portions that rotatably support the claw portions.

In addition, the surface area-increasing processing section may have any configuration as long as it is a section that performs a preprocessing for increasing the surface area of the sheet-like material, and the surface area-increasing processing section may not fluff the sheet-like material. In addition, the surface area-increasing processing section (surface area-increasing step) may be omitted.

Further, in the above-described embodiments, the removing section has one fabric material forming an endless belt. However, the invention is not limited thereto, and for example, the removing section may have a plurality of fabric materials disposed along a transporting direction of the raw material.

Further, in the invention, the removing section may have any configuration as long as it can remove the aggregates from the material.

The entire disclosure of Japanese Patent Application No. 2017-085115, filed Apr. 24, 2017, 2017-085116, filed Apr. 24, 2017, 2017-085117, filed Apr. 24, 2017 and 2017-085120, filed Apr. 24, 2017 are expressly incorporated by reference herein.

What is claimed is:

1. A processing device comprising:
a fluffing section that fluffs fibers contained in a sheet-like material, the fibers being at least near a surface of the sheet-like material; and
a particle supplying section that supplies particles having Mohs hardness of 2 to 5 to the fluffed fibers.

2. The processing device according to claim 1,
wherein the particle supplying section has an ejecting portion that ejects the particles.

3. The processing device according to claim 1,
wherein the particles have a function of adsorbing alien substances contained in the sheet-like material.

4. The processing device according to claim 1,
wherein the particles have a function of colliding with alien substances contained in the sheet-like material to peel the alien substances off from the fibers.

5. The processing device according to claim 3, further comprising an alien substance-removing section that removes the alien substances together with the particles from the sheet-like material.

6. The processing device according to claim 5, further comprising a defibrating section that defibrates the sheet-like material in an aerial manner after the particles are supplied,
wherein the alien substance-removing section removes the alien substances and the particles before the defibration.

7. The processing device according to claim 5, further comprising a defibrating section that defibrates the sheet-like material in an aerial manner after the particles are supplied,
wherein the alien substance-removing section removes the alien substances and the particles after the defibration.

8. The processing device according to claim 5, further comprising an alien substance-aggregating section that is disposed between the particle supplying section and the alien substance-removing section and aggregates the alien substances.

9. The processing device according to claim 1,
wherein the particles are formed of a resin-based material.

10. The processing device according to claim 1,
wherein the particles are formed of a plant-based material.

11. The processing device according to claim 1,
wherein the fluffing section has a brush.

12. The processing device according to claim 11,
wherein the brush has a rotatably-supported cylindrical or columnar core portion, and brush bristles provided on an outer periphery of the core portion.

13. The processing device according to claim 1,
wherein the fluffing section has a plurality of claw portions.

14. A sheet manufacturing apparatus comprising the processing device according to claim 1.

15. A processing method comprising:
fluffing fibers contained in a sheet-like material, the fibers being at least near a surface of the sheet-like material; and
supplying particles having Mohs hardness of 2 to 5 to the fluffed fibers.

16. A manufacturing method of a sheet, comprising:
fluffing fibers contained in a sheet-like material, the fibers being at least near a surface of the sheet-like material; and
supplying particles having Mohs hardness of 2 to 5 to the fluffed fibers,
wherein the sheet is manufactured from the sheet-like material after the particles are supplied.

* * * * *